United States Patent
Haisty et al.

(10) Patent No.: US 9,332,251 B2
(45) Date of Patent: *May 3, 2016

(54) SYSTEMS AND METHODS FOR OPTICALLY PROJECTING THREE-DIMENSIONAL TEXT, IMAGES AND/OR SYMBOLS ONTO THREE-DIMENSIONAL OBJECTS

(71) Applicant: Delta Sigma Company, Kennesaw, GA (US)

(72) Inventors: Brett Stanton Haisty, Powder Springs, GA (US); Roger Curtis Richardson, Acworth, GA (US)

(73) Assignee: DELTA SIGMA COMPANY, Kennesaw, GA (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/109,137

(22) Filed: Dec. 17, 2013

(65) Prior Publication Data

US 2014/0184757 A1   Jul. 3, 2014

Related U.S. Application Data

(63) Continuation of application No. 12/590,500, filed on Nov. 9, 2009, now Pat. No. 8,610,761.

(51) Int. Cl.
*H04N 15/00* (2006.01)
*H04N 13/04* (2006.01)
*H04N 9/31* (2006.01)

(52) U.S. Cl.
CPC ......... *H04N 13/0425* (2013.01); *H04N 9/3147* (2013.01); *H04N 9/3185* (2013.01)

(58) Field of Classification Search
CPC ........................... H04N 9/3147; H04N 9/3185
USPC ........................................... 382/285; 348/745
See application file for complete search history.

(56) References Cited

U.S. PATENT DOCUMENTS

| | | |
|---|---|---|
| 6,269,284 B1 | 7/2001 | Lau et al. |
| 6,456,340 B1 * | 9/2002 | Margulis ........................ 348/745 |
| 6,843,564 B2 | 1/2005 | Putilin et al. |
| 7,184,049 B2 | 2/2007 | Ballin et al. |
| 7,268,893 B2 | 9/2007 | Palmateer |
| 7,399,086 B2 | 7/2008 | Huewel |
| 7,433,796 B2 | 10/2008 | Behan et al. |

(Continued)

*Primary Examiner* — Dustin Nguyen
(74) *Attorney, Agent, or Firm* — Thomas | Horstemeyer, LLP

(57) ABSTRACT

The present invention provides a method whereby the spatial relationship and orientations of one or more three-dimensional objects being illuminated by an optical projector, and the optical projector itself, can be very accurately defined both quickly and easily. The present invention also provides a novel computerized optical projection system whereby three-dimensional data when viewed by the human eye projected onto three-dimensional objects is not deformed as a result of the non-planar projection surface. In one embodiment, the invention provides computerized optical assembly or manufacturing guidance systems, and related methods, that provide step-by-step assembly or manufacturing instructions for instructing technicians how to assemble or manufacture three-dimensional objects or systems. The assembly instructions are in the form of calibrated three-dimensional text, images and/or symbols, and are projected by one or a plurality of optical projectors that are in operable communication with one or a plurality of computers onto the three-dimensional objects or systems, or component parts or skins thereof.

20 Claims, 23 Drawing Sheets

(56) References Cited

U.S. PATENT DOCUMENTS

| | | |
|---|---|---|
| 7,477,252 B2 | 1/2009 | Chun |
| 7,843,449 B2 | 11/2010 | Krah |
| 8,265,376 B2 | 9/2012 | Tsuk et al. |
| 2002/0024640 A1 | 2/2002 | Ioka |
| 2003/0100998 A2 * | 5/2003 | Brunner et al. ............ 702/19 |
| 2005/0043837 A1 | 2/2005 | Rubbert et al. |
| 2005/0064936 A1 | 3/2005 | Pryor |
| 2007/0038939 A1 | 2/2007 | Challen et al. |
| 2007/0190495 A1 | 8/2007 | Kendir et al. |
| 2007/0247640 A1 * | 10/2007 | Magome et al. ............ 356/609 |
| 2008/0095468 A1 * | 4/2008 | Klemmer et al. ............ 382/285 |
| 2008/0246943 A1 | 10/2008 | Kaufman et al. |
| 2009/0268095 A1 | 10/2009 | Hoshino et al. |
| 2011/0169924 A1 | 7/2011 | Haisty et al. |

* cited by examiner

Authoring Assembly Software Tool Flow Chart

Operator Assembly Software Tool Flow Chart

SYSTEMS AND METHODS FOR OPTICALLY PROJECTING THREE-DIMENSIONAL TEXT, IMAGES AND/OR SYMBOLS ONTO THREE-DIMENSIONAL OBJECTS

CROSS-REFERENCE TO RELATED APPLICATION

This application is a continuation of copending U.S. utility application entitled, "Systems and Methods for Optically Projecting Three-Dimensional Text, Images And/Or Symbols Onto Three-Dimensional Objects," having Ser. No. 12/590,500, filed Nov. 9, 2009, which is entirely incorporated herein by reference.

COMPUTER PROGRAM LISTING APPENDIX

All of the information, material and source code that is present in the accompanying two compact discs, which are identical, and labeled as Copy 1 of 2, and Copy 2 of 2, is hereby incorporated herein by reference in its entirety.

Each compact disk contains the files that are listed below, which are two types of files (.txt and .cs. files). A few of the file names appearing below appear on two lines, rather than on one line, as is indicated if there is no file size or creation date on the second line. The files that end in .txt are identical to the corresponding files (those that have the same file name) that end in .cs, which are true C# source code files. The files that end in .cs can be used by Microsoft Visual Studio, or by a similar software development tool that supports C#, and can be compiled. The creation dates of the C# files are listed hereinbelow. The files that end in .txt are text files that can be opened by Word, Notepad, Wordpad, or any other word processing program that supports the .txt format. For the purposes of viewing the information in the files, the .txt files should be used. Any of the text files on the compact discs can be converted to a source code file by changing its name from XXX.txt to XXX.cs. This may be performed in Windows Explorer by right clicking on the file and selecting rename, then typing the new name of the file in the highlighted area. All of the text files were created on Nov. 6, 2009.

| Authoring Assembly Software Tool Files | | | |
| --- | --- | --- | --- |
| Size (Bytes) | File Name (C#) | File Name (.TXT) | Creation Date (C#) |
| 2,728 | AddDrawingSurface.cs | AddDrawingSurface.txt | Oct. 28, 2008 |
| 11,022 | AddDrawingSurface.Designer.cs | AddDrawingSurface.Designer.txt | Oct. 28, 2008 |
| 744 | AddPart.cs | AddPart.txt | Aug. 07, 2008 |
| 29,034 | AddPart.Designer.cs | AddPart.Designer.txt | Oct. 28, 2008 |
| 990 | CalFrame.cs | CalFrame.txt | Dec. 06, 2008 |
| 595 | CalibrationFrame.cs | CalibrationFrame.txt | Dec. 20, 2008 |
| 4,274 | CalPoint.cs | CalPoint.txt | Sep. 02, 2009 |
| 5,854 | Circle.cs | Circle.txt | Sep. 02, 2009 |
| 140 | Class1.cs | Class1.txt | Feb. 12, 2008 |
| 661 | ColumnDefinition.cs | ColumnDefinition.txt | Nov. 07, 2008 |
| 5,272 | Complex.cs | Complex.txt | Aug. 15, 2008 |
| 33,606 | Data Import Form.cs | Data Import Form.txt | Sep. 02, 2009 |
| 99,998 | Data Import Form.Designer.cs | Data Import Form.Designer.txt | Sep. 02, 2009 |
| 528 | DataHeader.cs | DataHeader.txt | Nov. 07, 2008 |
| 4,288 | Diamond.cs | Diamond.txt | Sep. 02, 2009 |
| 1,715 | DocumentDisplay.cs | DocumentDisplay.txt | Aug. 28, 2009 |
| 343 | Doublet.cs | Doublet.txt | Dec. 15, 2008 |
| 24,519 | Drawing.cs | Drawing.txt | Aug. 20, 2009 |
| 1,154 | DrawingSurface.cs | DrawingSurface.txt | Nov. 25, 2008 |
| 2,670 | DrawingSurface.Designer.cs | DrawingSurface.Designer.txt | Aug. 18, 2008 |
| 6,462 | Feature.cs | Feature.txt | Sep. 02, 2009 |
| 148,340 | Form1.cs | Form1.txt | Sep. 14, 2009 |
| 164,576 | Form1.Designer.cs | Form1.Designer.txt | Aug. 28, 2009 |
| 343 | Form2.cs | Form2.txt | Aug. 21, 2008 |
| 2,527 | Form2.Designer.cs | Form2.Designer.txt | Nov. 05, 2009 |
| 951 | FOVForm.cs | FOVForm.txt | Nov. 05, 2009 |
| 4,389 | FOVForm.Designer.cs | FOVForm.Designer.txt | Feb. 03, 2009 |
| 1,375 | FrameMatrixForm.cs | FrameMatrixForm.txt | Aug. 25, 2008 |
| 3,728 | FrameMatrixForm.Designer.cs | FrameMatrixForm.Designer.txt | Nov. 05, 2009 |
| 6,377 | Gage.cs | Gage.txt | Apr. 23, 2009 |
| 1,831 | GeometryDisplay.cs | GeometryDisplay.txt | Aug. 28, 2009 |
| 691 | GetInputForm.cs | GetInputForm.txt | Nov. 16, 2008 |
| 4,619 | GetInputForm.Designer.cs | GetInputForm.Designer.txt | Nov. 05, 2009 |
| 681 | GetLabelForm.cs | GetLabelForm.txt | Nov. 16, 2008 |
| 3,199 | GetLabelForm.Designer.cs | GetLabelForm.Designer.txt | Nov. 16, 2008 |
| 921 | GetProcessGroupName.cs | GetProcessGroupName.txt | Jul. 08, 2009 |
| 4,076 | GetProcessGroupName.Designer.cs | GetProcessGroupName.Designer.txt | Jul. 08, 2009 |
| 6,182 | GLMatrix.cs | GLMatrix.txt | Nov. 14, 2008 |
| 1,433 | GLPoint.cs | GLPoint.txt | Nov. 05, 2009 |
| 4,094 | HMatrix2D.cs | HMatrix2D.txt | Dec. 15, 2008 |
| 10,445 | HMatrix2DMap.cs | HMatrix2DMap.txt | Nov. 05, 2009 |
| 12,134 | HMatrix3D.cs | HMatrix3D.txt | Aug. 24, 2009 |
| 974 | HVector2D.cs | HVector2D.txt | Dec. 15, 2008 |
| 1,448 | HVector3D.cs | HVector3D.txt | Aug. 18, 2009 |
| 542 | IDScreen.cs | IDScreen.txt | Nov. 17, 2008 |
| 2,514 | IDScreen.Designer.cs | IDScreen.Designer.txt | Nov. 17, 2008 |
| 2,486 | ImageBrowser.cs | ImageBrowser.txt | Sep. 14, 2009 |
| 5,200 | ImageBrowser.Designer.cs | ImageBrowser.Designer.txt | Sep. 02, 2009 |
| 2,059 | ImageChooser.cs | ImageChooser.txt | Sep. 14, 2009 |
| 4,646 | ImageChooser.Designer.cs | ImageChooser.Designer.txt | Jan. 10, 2009 |

-continued

| Authoring Assembly Software Tool Files | | | |
|---|---|---|---|
| Size (Bytes) | File Name (C#) | File Name (.TXT) | Creation Date (C#) |
| 6,264 | ImageDef.cs | ImageDef.txt | Nov. 05, 2009 |
| 457 | ImageII.cs | ImageII.txt | Dec. 07, 2008 |
| 893 | ImageViewer.cs | ImageViewer.txt | Dec. 07, 2008 |
| 5,050 | ImageViewer.Designer.cs | ImageViewer.Designer.txt | Dec. 07, 2008 |
| 1,636 | InfoFrame.cs | InfoFrame.txt | Dec. 04, 2008 |
| 2,036 | InstallFrame.cs | InstallFrame.txt | Jan. 28, 2009 |
| 14,682 | KLT.cs | KLT.txt | Apr. 24, 2009 |
| 3,857 | Line.cs | Line.txt | Sep. 02, 2009 |
| 2,722 | Matrix.cs | Matrix.txt | Nov. 05, 2009 |
| 2,221 | MeasureFrame.cs | MeasureFrame.txt | Jan. 28, 2009 |
| 6,393 | Part.cs | Part.txt | Sep. 14, 2009 |
| 297 | Pipeline.cs | Pipeline.txt | Dec. 22, 2008 |
| 10,986 | Plane.cs | Plane.txt | Aug. 28, 2009 |
| 3,867 | Point.cs | Point.txt | Sep. 02, 2009 |
| 647 | PointNormal.cs | PointNormal.txt | Feb. 10, 2009 |
| 1,835 | PointPair.cs | PointPair.txt | Nov. 10, 2008 |
| 3,129 | PointSet.cs | PointSet.txt | Nov. 10, 2008 |
| 4,762 | Polygon.cs | Polygon.txt | Aug. 28, 2009 |
| 4,582 | Polyhedron.cs | Polyhedron.txt | Sep. 02, 2009 |
| 1,385 | Process.cs | Process.txt | Aug. 28, 2009 |
| 3,890 | ProcessFrame.cs | ProcessFrame.txt | Sep. 01, 2009 |
| 485 | Program.cs | Program.txt | Feb. 12, 2008 |
| 9,097 | Project.cs | Project.txt | Sep. 02, 2009 |
| 4,546 | Rectangle.cs | Rectangle.txt | Nov. 05, 2009 |
| 424 | RefreshingListBox.cs | RefreshingListBox.txt | Sep. 01, 2009 |
| 611 | Results.cs | Results.txt | Feb. 03, 2009 |
| 2,828 | Results.Designer.cs | Results.Designer.txt | Feb. 03, 2009 |
| 9,777 | RTFEdit.cs | RTFEdit.txt | Jan. 08, 2009 |
| 17,936 | RTFEdit.Designer.cs | RTFEdit.Designer.txt | Jan. 08, 2009 |
| 3,799 | SegmentedLine.cs | SegmentedLine.txt | Mar. 06, 2009 |
| 1,762 | Sim.cs | Sim.txt | Dec. 18, 2008 |
| 18,845 | Solutions.cs | Solutions.txt | Dec. 22, 2008 |
| 574 | Splash Screen.cs | Splash Screen.txt | May 04, 2009 |
| 3,819 | Splash Screen.Designer.cs | Splash Screen.Designer.txt | May 04, 2009 |
| 2,886 | Spline.cs | Spline.txt | Nov. 05, 1999 |
| 14,009 | Test Projector Screen.cs | Test Projector Screen.txt | Aug. 28, 2009 |
| 13,326 | Test Projector Screen.Designer.cs | Test Projector Screen.Designer.txt | Feb. 03, 2009 |
| 4,557 | Text.cs | Text.txt | Aug. 28, 2009 |
| 3,948 | Texture.cs | Texture.txt | Sep. 14, 2009 |
| 149 | TextureListItem.cs | TextureListItem.txt | Jan. 10, 2009 |
| 347 | Toolbox.cs | Toolbox.txt | Jan. 13, 2009 |
| 1,179 | Toolbox.Designer.cs | Toolbox.Designer.txt | Jan. 13, 2009 |
| 183 | TreeNode2.cs | TreeNode2.txt | Feb. 12, 2008 |
| 7,837 | TreeNode3.cs | TreeNode3.txt | Aug. 28, 2009 |
| 1,648 | TreeNode4.cs | TreeNode4.txt | Aug. 28, 2009 |
| 4,223 | Triangle.cs | Triangle.txt | Sep. 02, 2009 |
| 602 | Triplet.cs | Triplet.txt | Dec. 15, 2008 |
| 2,209 | Tweaker.cs | Tweaker.txt | Aug. 17, 2008 |
| 16,819 | Tweaker.Designer.cs | Tweaker.Designer.txt | Aug. 17, 2008 |
| 1,000 | TweakFrame.cs | TweakFrame.txt | Dec. 02, 2008 |
| 17,926 | Type1Solution.cs | Type1Solution.txt | Dec. 15, 2008 |
| 165 | TypeList.cs | TypeList.txt | Aug. 28, 2009 |
| 397 | UIInput.cs | UIInput.txt | Dec. 04, 2008 |
| 403 | UILabel.cs | UILabel.txt | Dec. 04, 2008 |
| 900 | UniqueIDClass.cs | UniqueIDClass.txt | Nov. 16, 2008 |
| 1,437 | UserInterfaceDisplay.cs | UserInterfaceDisplay.txt | Aug. 28, 2009 |
| 2,732 | Vector.cs | Vector.txt | Oct. 22, 2008 |
| 1,713 | VideoDisplay.cs | VideoDisplay.txt | Aug. 28, 2009 |
| 3,103 | View.cs | View.txt | Oct. 05, 2008 |
| 3,234 | ViewInfo.cs | ViewInfo.txt | Aug. 17, 2008 |
| 627 | ViewportInfo.cs | ViewportInfo.txt | Dec. 16, 2008 |
| 4,733 | ViewportInfo.Designer.cs | ViewportInfo.Designer.txt | Dec. 16, 2008 |
| 2,344 | VirtualGage.cs | VirtualGage.txt | Dec. 07, 2008 |
| 6,879 | VirtualGage.Designer.cs | VirtualGage.Designer.txt | Dec. 07, 2008 |
| 24,226 | VoxelSpace.cs | VoxelSpace.txt | Sep. 14, 2009 |
| 0 | ZPR.cs | ZPR.txt | Feb. 12, 2008 |

116 File(s) 941,213 bytes

| \multicolumn{4}{c}{Configurator Assembly Software Tool Files} |
|---|---|---|---|
| Size (Bytes) | File Name (C#) | File Name (.TXT) | Creation Date (C#) |
| 1,174 | DSCSerialGage.cs | DSCSerialGage.txt | Apr. 20, 2009 |
| 2,619 | DSCUSBGage.cs | DSCUSBGage.txt | Apr. 21, 2009 |
| 39,507 | Form1.cs | Form1.txt | Aug. 28, 2009 |
| 42,148 | Form1.Designer.cs | Form1.Designer.txt | Aug. 18, 2009 |
| 850 | GageDefinition.cs | GageDefinition.txt | Apr. 21, 2009 |
| 707 | GageSelectionForm.cs | GageSelectionForm.txt | Apr. 20, 2009 |
| 3,899 | GageSelectionForm.Designer.cs | GageSelectionForm.Designer.txt | Apr. 20, 2009 |
| 878 | getFilename.cs | getFilename.txt | Jul. 08, 2009 |
| 4,130 | getFilename.Designer.cs | getFilename.Designer.txt | Jul. 08, 2009 |
| 365 | HelpForm.cs | HelpForm.txt | Jul. 03, 2009 |
| 2,106 | HelpForm.Designer.cs | HelpForm.Designer.txt | Jul. 03, 2009 |
| 2,578 | ProcessSelector.cs | ProcessSelector.txt | Aug. 17, 2009 |
| 8,056 | ProcessSelector.Designer.cs | ProcessSelector.Designer.txt | Aug. 17, 2009 |
| 275 | ProcessStep.cs | ProcessStep.txt | Aug. 28, 2009 |
| 496 | Program.cs | Program.txt | Nov. 13, 2008 |
| 1,091 | SelectProcessGroup.cs | SelectProcessGroup.txt | Aug. 17, 2009 |
| 5,205 | SelectProcessGroup.Designer.cs | SelectProcessGroup.Designer.txt | Aug. 17, 2009 |

17 File(s) 116,084 bytes

| \multicolumn{4}{c}{Operator Assembly Software Tool Files} |
|---|---|---|---|
| Size (Bytes) | File Name (C#) | File Name (.TXT) | Creation Date (C#) |
| 20,149 | CalibrateControl.cs | CalibrateControl.txt | Sep. 14, 2009 |
| 4,022 | CalibrateControl.Designer.cs | CalibrateControl.Designer.txt | Nov. 20, 2008 |
| 183 | CalibrationRuntimeProcess.cs | CalibrationRuntimeProcess.txt | Nov. 20, 2008 |
| 447 | CountingString.cs | CountingString.txt | Sep. 01, 2009 |
| 314 | DisplayOutput.cs | DisplayOutput.txt | Dec. 02, 2008 |
| 145 | Gage.cs | Gage.txt | Dec. 24, 2008 |
| 6,335 | InfoControl.cs | InfoControl.txt | Jan. 09, 2009 |
| 16,941 | InfoControl.Designer.cs | InfoControl.Designer.txt | Jan. 09, 2009 |
| 176 | InfoRuntimeProcess.cs | InfoRuntimeProcess.txt | Nov. 20, 2008 |
| 7,352 | InstallControl.cs | InstallControl.txt | Sep. 02, 2009 |
| 3,668 | InstallControl.Designer.cs | InstallControl.Designer.txt | Sep. 02, 2009 |
| 179 | InstallRuntimeProcess.cs | InstallRuntimeProcess.txt | Nov. 20, 2008 |
| 8,654 | MeasureControl.cs | MeasureControl.txt | Sep. 02, 2009 |
| 4,053 | MeasureControl.Designer.cs | MeasureControl.Designer.txt | Dec. 08, 2008 |
| 179 | MeasureRuntimeProcess.cs | MeasureRuntimeProcess.txt | Nov. 20, 2008 |
| 589 | oglControl.cs | oglControl.txt | Sep. 14, 2009 |
| 30,850 | Operator Main Form.cs | Operator Main Form.txt | Sep. 08, 2009 |
| 11,524 | Operator Main Form.Designer.cs | Operator Main Form.Designer.txt | Jun. 23, 2009 |
| 9,527 | ProcessControl.cs | ProcessControl.txt | Sep. 02, 2009 |
| 13,520 | ProcessControl.Designer.cs | ProcessControl.Designer.txt | Sep. 01, 2009 |
| 492 | Program.cs | Program.txt | Nov. 13, 2008 |
| 23,154 | Projector Screen.cs | Projector Screen.txt | Sep. 14, 2009 |
| 4,720 | Projector Screen.designer.cs | Projector Screen.designer.txt | Sep. 14, 2009 |
| 818 | RequestCalibrationForm.cs | RequestCalibrationForm.txt | Jul. 07, 2009 |
| 2,943 | RequestCalibrationForm.Designer.cs | RequestCalibrationForm.Designer.txt | Jul. 07, 2009 |
| 155 | RuntimeProcess.cs | RuntimeProcess.txt | Nov. 20, 2008 |
| 860 | SelectProcess.cs | SelectProcess.txt | Jul. 09, 2009 |
| 4,949 | SelectProcess.Designer.cs | SelectProcess.Designer.txt | Jul. 09, 2009 |
| 1,745 | TweakControl.cs | TweakControl.txt | Dec. 03, 2008 |
| 8,387 | TweakControl.Designer.cs | TweakControl.Designer.txt | Dec. 02, 2008 |
| 177 | TweakRuntimeProcess.cs | TweakRuntimeProcess.txt | Nov. 20, 2008 |
| 28,428 | USB4.cs | USB4.txt | Jul. 08, 2009 |
| 5,019 | USBGage.cs | USBGage.txt | Jul. 08, 2009 |
| 468 | VideoWindow.cs | VideoWindow.txt | Sep. 01, 2009 |
| 2,724 | VideoWindow.Designer.cs | VideoWindow.Designer.txt | Sep. 01, 2009 |
| 346 | WMP.cs | WMP.txt | Nov. 18, 2008 |
| 2,522 | WMP.Designer.cs | WMP.Designer.txt | Nov. 18, 2008 |
| 533 | WorkInstructionsWindow.cs | WorkInstructionsWindow.txt | Sep. 01, 2009 |
| 2,269 | WorkInstructionsWindow.Designer.cs | WorkInstructionsWindow.Designer.txt | Sep. 01, 2009 |

39 File(s) 229,516 bytes

| STLModel - STLModel Software Tool File | | | |
|---|---|---|---|
| Size (Bytes) | File Name (C#) | File Name (.TXT) | Creation Date (C#) |
| 137 | Class1.cs | Class1.txt | Aug. 01, 2008 |

1 File(s) 137 bytes

| STLModel - STLTools Software Tool File | | | |
|---|---|---|---|
| Size (Bytes) | File Name (C#) | File Name (.TXT) | Creation Date (C#) |
| 1,114 | Facet.cs | Facet.txt | Sep. 14, 2009 |
| 8,771 | Model.cs | Model.txt | Aug. 18, 2009 |

2 File(s) 9,885 bytes

BACKGROUND OF THE INVENTION

1. Field of the Invention

The present invention is directed to pioneering and very advantageous computerized optical systems for the projection of three-dimensional text, images and/or symbols in a substantially or fully undistorted manner onto one or a plurality of surfaces of a variety of different three-dimensional objects, or parts thereof, regardless of their shape of size.

In one embodiment, the present invention is directed to computerized optical manufacturing guidance systems that can provide ordered step-by-step manufacturing instructions which instruct manufacturing personnel, assembly technicians and other system users how to manufacture, measure and/or assemble any three-dimensional objects or systems, which may be extremely complex, such as an aircraft, or a part thereof (a wing, a vertical stabilizer, or the like) in a very efficient, rapid and accurate manner, particularly in comparison with a manual manufacture or assembly of the same three-dimensional objects (or parts), which uses blueprints, plans, instruction manuals, other paper-based products and/or computer screens for teaching an assembly of the objects, and with laser-based assembly systems. The manufacturing or assembly instructions (or other optical projections) are in the form of calibrated three-dimensional text, symbols and/or images, and are projected by one or a plurality of optical projector that are operably connected with one or a plurality of computers onto the three-dimensional objects or systems, or components thereof. Uniquely, and very advantageously, the three-dimensional text, images and/or symbols, such as manufacturing instructions, have an ability to "wrap around" the three-dimensional objects or systems (or parts), and to appear thereon in a manner that is not distorted by the three-dimensional nature of the text, images and/or symbols, or of the objects or parts being manufactured, and/or by other potential distortions, such as curves or contours. The invention also provides methods for projecting three-dimensional text, images and/or symbols in a substantially or fully undistorted manner onto one or a plurality of surfaces of a variety of different three-dimensional objects, and methods for providing an ordered step-by-step assembly of three-dimensional objects, or parts thereof, which may be relatively or extremely complex, and which may be used, for example, on an assembly line, or in another manufacturing environment (or in some other environment).

2. Background

Current projection systems for manufacturing three-dimensional objects utilize laser projectors to project points or text onto a surface. The laser projectors emit highly amplified and coherent electromagnetic radiation of one or more specific frequencies in a form of an intense beam of nearly monochromatic visible or infrared light through a process of stimulated emission. The radiation emitted by the laser consists of a coherent beam of photons, all in phase and having the same polarization, and at any given time, a user will always see a moving dot. Very disadvantageously, laser systems, and their replacement parts, are extremely expensive (often prohibitively) and, thus, are not widely used in manufacturing processes and assembly lines.

Further, laser systems, very disadvantageously, are not capable of projecting images or symbols, such as graphics, pictures, illustrations or drawings, onto a surface, and cannot display large amounts of text or other drawn objects without severe flickering, blinking and/or other significant distortions, all of which generally are, at the least, annoying, and cause eye strain to the user. Further, when large amounts of text are projected by laser projectors, this causes the laser projectors to operate extremely slowly. In contrast with optical projections, laser projections work in the same manner in which one writes with a pen. The laser projections actually write out each letter of a word like one would using a pen. The laser itself is physically moving or has an internal mirror that moves. Consequently, the more text that is to be displayed by a laser projector, the longer it takes for the laser projector to make one complete projection. For example, if a user of a laser projector projects only the letter "A" onto a surface, the time between projection cycles would be very short. However, the time between "re-paints" (i.e. re-projecting the information) becomes significantly longer, and the laser projection very disadvantageously begins to flash, similar to how fluorescent lights start to flicker as they get older or are cold. The foregoing problems render laser projectors very difficult, and time consuming, to use in an assembly guidance system (in addition to being extremely costly).

Optical systems that can project three-dimensional text, images and/or symbols onto one or a plurality of surfaces of a variety of different three-dimensional objects, or parts thereof, in an undistorted manner currently do not exist. Laser systems are not capable of making such projections.

3. Description of Other Art

U.S. Pat. No. 5,111,406 describes a fixture that is prepared with fixture holes arranged in a pattern that corresponds with the locations of fiducial pads that are located on a multilayer board. The fixture has tooling pins that engage with tooling holes in the panel to hold the panel in an absolute position relative to the fixture. An x-ray inspection system views a superimposed image of a selected fixture hole and a corresponding fiducial pad that is visible within the boundary of the fixture hole. A software routine is then used to compute the offset between the fixture hole and the fiducial pad. The process is then repeated for the remaining sample of fixture holes and fiducial pads. The results are then fitted and sent to a drilling machine to determine a position for the drilled holes in the panel that compensates for the registration of the solder pads.

U.S. Pat. No. 5,195,451 describes a projection of an image of a stitch pattern onto a workpiece. A projector is stated to project a full-sized image of the stitch pattern on the basis of image data read from RAM on a workpiece held by an embroidery frame.

U.S. Pat. No. 5,757,950 describes a process for cutting or stamping individual parts from an animal skin in which the contours of the individual parts are stored in a computer, and can be assembled to form a cutting pattern. For optimizing the cutting, the cutting pattern is established individually as a function of the quality of the skin, and is projected by a projection device onto the skin.

U.S. Pat. No. 6,192,777 describes an apparatus and method for cutting pieces of material from a workpiece, such as a web of patterned fabric, which includes irregularities or which is misaligned with respect to a coordinate system of the cutting apparatus. The workpiece is spread on a cutting table where it is cut by a numerically controlled cutter in accord with an electronic marker stored in the cutter controller. The marker is matched to the workpiece and appropriate adjustments are made to the marker before the workpiece is cut. A laser, operatively connected to the controller, projects a match target onto the workpiece at a point corresponding to a selected point on the marker. The marker is then adjusted such that the selected point coincides with a desired location on the workpiece. Adjustment is achieved by electronically displacing the match target from a non preferred location to a preferred one. Software in a controller translates this displacement into appropriate adjustments to the marker.

U.S. Pat. No. 6,205,370 describes a production of a nest of cuts for cutting blanks out of flat, irregular workpieces, wherein the contour and the flaws of the spread workpieces together with a workpiece characteristic are detected by means of a digitizing unit, and the corresponding data are read into a computer, which on the basis of these data, and the data stored in the computer concerning number, shape and quality requirements of the blanks, calculates and stores a nest of cuts, and utilizes the detected workpiece characteristics of the workpieces as a workpiece code for allocating the nests of cuts to the respective workpieces.

U.S. Pat. No. 6,304,680 describes a method and system for monitoring a process which determines a location of a product in three dimensional space with respect to a process monitoring system.

U.S. Pat. No. 6,314,311 describes a registration system for use in connection with an image guided surgery system. It includes a medical diagnostic imaging apparatus for collecting image data from a subject. An image data processor is stated to reconstruct an image representation of the subject from the image data. An image projector depicts the image representation on the subject.

U.S. Pat. No. 6,600,476 describes a video aid to an assembly system and methods of using the system for providing production personnel access to manufacturing drawing information with minimum user intervention. The system scrolls manufacturing drawings automatically as a monitor is moved relative to a workpiece, so that the manufacturing drawing corresponds with the identical location on the workpiece. The system is stated to eliminate the need to store, retrieve and maintain individual hardcopy drawings.

U.S. Pat. No. 6,731,991 describes a method and system of projecting light on a planar surface to produce an image for tracing. The system includes a projector that has a light source and a signal conditioner that is operably connected to the projector. A computer is operably connected to the signal conditioner, and a scanner is connected to the projector. A test pattern from the computer is projected from the projector through the scanners to visually align an image to a sector on a work surface. A grid is operably aligned with the work surface, and a geometric pattern from the computer is then projected by the projector on the planar work surface for tracing. The method comprises the steps of creating a pattern, tracing lines along the pattern on the planar work surface, cutting the pattern along the traced lines, discarding pieces of the planar surface outside the pattern, and placing edging along an outer edge of the pattern.

U.S. Pat. No. 6,813,035 describes a formation of a two-dimensional color pattern consisting of colored pattern elements that is stated to enable a particularly compact and fault proof color pattern for a coding. The '035 patent states that three dimensional data of an object point can be calculated by subsequent triangulation at a known position of a projector and a camera. Also described is a method for determining three-dimensional surface coordinates comprising an illumination of an object with a color pattern of known structure by a projector and recording an object image by a camera.

Other art includes published U.S Patent Applications Nos. 2003/0207742, 2005/0121422, 2006/0007411, 2006/0176156, 2006/0290890, 2007/0206371, 2007/0127015 and 2008/0018740, and foreign patent documents numbers GB 2204397, EP 0027054, EP 0053501. EP 1288865, EP 1519575, WO 2004084547, WO 2005025199 and WO 9716015.

None of the above references, or others that are described herein, teach or suggest the novel computerized optical systems or methods of the present invention.

Further, there is a long-felt, but unsolved, need worldwide in the manufacturing and production industries for efficient, rapid and accurate guidance systems that have an ability to significantly reduce the amount of time, labor, manufacturing errors and paper products (blueprints, plans, instruction manuals and/or the like) that are typically required to manually assemble or otherwise manufacture complicated three-dimensional objects, such as aircrafts, submarines and automobiles, and that can be used on assembly lines and/or in other manufacturing and production environments.

SUMMARY OF THE INVENTION

The present invention provides pioneering and very advantageous computerized optical systems, and related methods, for the optical projection of three-dimensional text, images and/or symbols in a substantially or completely undistorted manner onto one or a plurality of surfaces of a variety of different three-dimensional objects, or parts thereof. These systems and methods may be employed in any field, industry, application, location and/or environment in which it is necessary or desirable to project three-dimensional text, images and/or symbols in a substantially or fully undistorted manner onto one or a plurality of three dimensional objects, or parts, including, but not limited to, the manufacturing, building construction, automotive, aviation, maritime, military, medical, veterinary, entertainment, advertising, publishing and/or textile industries.

In one embodiment, the present invention is directed to computerized optical manufacturing guidance systems and methods that enable assembly technicians and other manufacturing personnel to very efficiently, rapidly and accurately assemble any three-dimensional objects (without the use of lasers or laser technology), generally in a step-by-step order of a work process, whether having flat, curved, contoured and/or complex curved surfaces, including those objects that are relatively or very complex, such as aircrafts, submarines, missiles, military vehicles and automobiles, and objects that are not complex, such as cables, in a manner that tremendously reduces the amount of time, labor, paper products and/or computer screens that would otherwise typically be required to assemble or otherwise manufacture such objects manually, or using a laser system, and that significantly reduces or completely eliminates assembly errors, both of which result in tremendous cost savings (in time, labor, blueprints, plans, instruction manuals and/or the like). The resulting cost savings, which typically increase as the complexity of the particular object (or part) being assembled increases, can be millions of dollars for each object being assembled, such as an aircraft. Such cost savings are multiplied accordingly when more than one of the same object is being assembled. For example, if a cost savings of two million dollars is achieved in an assembly of one submarine, a cost savings of four million dollars will generally be achieved in an assembly of two such submarines, a cost savings of six million dollars will generally be achieved in an assembly of three such submarines, a cost savings of eight million dollars will generally be achieved in an assembly of four such submarines, and so forth.

The manufacturing guidance systems and methods of the invention use optical projectors to optically project calibrated, three-dimensional assembly (or work) instructions in the form of text, images and/or symbols in one or a variety of different colors and/or patterns onto three-dimensional objects, or parts, that are being constructed, such as an aircraft, or a part thereof, such as a vertical stabilizer, or a component thereof, such as a skin of a vertical stabilizer, in a substantially or fully undistorted manner, even when the objects, or parts, include curved, contoured and/or complex curved surfaces, such as curved surfaces having bumps or other raised areas thereon, rather than flat surfaces, and even when the optical projectors are not positioned and/or located in a manner that is perpendicular to, or straight in front of, the object being assembled. The three-dimensional text, images and/or symbols are projected onto the three-dimensional objects, or parts, when they are needed by manufacturing technicians or other system users, where they are needed on the object, or part, and in the manner that they are needed (i.e., at any time, at any place on the surface of the object, or part, and in any manner). These systems and methods are pioneering, and are such an advance over the current state of the art that they may revolutionize the manner in which complicated three-dimensional objects are assembled or otherwise manufactured worldwide.

Three dimensional optical projection is a brand new technology that can display three-dimensional images of objects, as well as text and symbols, onto the surfaces of three-dimensional objects, or parts thereof, without distortion. When employed in the manufacturing industry, by sequencing in order (preferably the "best" order) a series or set of complicated assembly instructions or steps (i.e., in the order of a work process), very complex assemblies or other manufactures, for example, of aircrafts, jets, helicopters, missiles, submarines, ships, boats, tanks, automobiles and a wide variety of other objects or systems, or parts thereof, can be assembled with unprecedented speed and accuracy. Such technology is expected to cause a significant improvement for manufacturing in industrialized countries. By implementing three-dimensional optical projection technology on their assembly lines, and in other production environments, businesses in countries with high-cost labor can provide a new tool to their workforces that will allow the output from one individual to be enhanced considerably. Further, third world countries are improving their workforces, so that they are taking on ever increasing complex manufacturing tasks. Three-dimensional optical projection technology is expected to enhance the productivity of workers in industrialized countries to such a large extent that third world countries' current competitive advantage (inexpensive or less expensive labor) will be greatly mitigated, with the benefit to the industrialized countries of having production performed in those countries, rather than in foreign third world countries.

In one aspect, the present invention provides a computerized optical system for a projection of three-dimensional text, images and/or symbols onto one or a plurality of surfaces of a variety of different three-dimensional objects, or parts thereof, comprising:

(a) one or more computers including an operating system, one or a plurality of graphics cards that can support a three-dimensional graphics computer programming language, or a combination or hardware and software that performs an equivalent function, and one or a plurality of computer ports that are capable of outputting video signals which contain a representation (or definition) of text, images, symbols, or a combination thereof;

(b) one or a plurality of programs that can run on the operating systems, and that function separately or together in any suitable order to enable a user of the system to:
  (i) create or import three-dimensional surface data (such as the output of a CAD program) that defines a geometric configuration of one or a plurality of surfaces of the one or a plurality of three-dimensional objects, or parts thereof, to be projected upon (Base Geometry);
  (ii) create or import three-dimensional data (such as the output of a CAD program) that defines a geometric configuration of one or a plurality of text, images or symbols, or a combination thereof; to be projected upon the one or a plurality of surfaces of the three-dimensional objects, or parts thereof (Annotated Geometry);
  (iii) optionally, organize the data of item (ii) into ordered steps or according to other desired criteria;
  (iv) correlate into one coordinate system one or a plurality of projectors, the surfaces of the three-dimensional objects, or parts thereof, being projected upon (as defined by item (i)), and the data of item (ii), optionally, in the manner defined in item (iii); and
  (v) display the data of item (ii) using the correlation determined in item (iv) onto the one or a plurality of surfaces of the one or a plurality of the three-dimensional objects, or parts thereof, and, optionally, execute the ordered steps, other desired criteria, or both, identified in item (iii);

(c) one or a plurality of data files containing:
  (i) three-dimensional surface data (such as the output of a CAD program) that defines a geometric configuration of one or a plurality of the surfaces of the three-dimensional objects, or parts thereof, to be projected upon (Base Geometry);
  (ii) three-dimensional data (such as the output of a CAD program) that defines a geometric configuration of the one or a plurality of text, images or symbols, or a combination thereof, to be projected upon the one or a plurality of surfaces of the three-dimensional objects, or parts thereof (Annotated Geometry);

(d) one or a plurality of optical projectors operably connected with the computers, wherein the optical projectors function to project one or a plurality of the correlated three-dimensional text, images or symbols, or a combination thereof, originating from the computers, simultaneously or at different times, in a substantially or fully undistorted manner, onto the one or a plurality of the surfaces of the three-dimensional objects, or parts thereof, in one or a plurality of different colors, or combination of colors;

(e) optionally, one or a plurality of movable or stationary means for supporting the optical projectors;

(f) optionally, one or a plurality of movable or stationary means for supporting the computers; and (g) optionally, a means for taking measurements of portions, areas or components of the three-dimensional objects, or parts thereof, or a combination thereof, that is operably connected with the computers.

In another aspect, the present invention provides a method for projecting three-dimensional texts, images or symbols, or a combination thereof, onto one or more three-dimensional objects, or parts, in a substantially or fully undistorted manner comprising a step of, using the above computerized optical projection system to project the three-dimensional text, images or symbols, or a combination thereof, onto the three-dimensional objects, or parts thereof, simultaneously or at different times, in one or a plurality of different colors, or combination of colors.

In yet another aspect, the present invention provides a computerized optical projection system for guiding users in manufacturing one or a plurality of three-dimensional objects, or parts thereof, comprising:

(a) one or more computers including an operating system, one or a plurality of graphics cards that can support a three-dimensional graphics computer programming language, or a combination or hardware and software that performs an equivalent function, and one or a plurality of computer ports that are capable of outputting video signals which contain a representation (or definition) of text, images, symbols, or a combination thereof;

(b) one or a plurality of programs that can run on the operating systems, and that function separately or together in any suitable order to enable a user of the system to:
  (i) create or import three-dimensional surface data (such as the output of a CAD program) that defines a geometric configuration of one or a plurality of surfaces of the one or a plurality of the three-dimensional objects, or parts thereof, to be projected on (Base Geometry);
  (ii) create or import three-dimensional data (such as the output of a CAD program) that defines a geometric configuration of one or a plurality of text, images or symbols, or a combination thereof, to be projected upon the one or a plurality of surfaces of the three-dimensional objects, or parts thereof (Annotated Geometry);
  (iii) organize the data of item (ii) into ordered steps or according to other desired criteria;
  (iv) correlate into one coordinate system one or a plurality of projectors, the surfaces of the three-dimensional objects, or parts, being projected upon (as defined by item (i)), and the data of item (ii), in the manner defined in item (iii); and
  (v) display the data of item (ii) using the correlation determined in item (iv) onto the one or a plurality of the surfaces of the one or a plurality of the three-dimensional objects, or parts thereof, to be manufactured and execute the ordered steps, other desired criteria, or both, identified in item (iii);

(c) one or a plurality of data files containing:
  (i) three-dimensional surface data (such as the output of a CAD program) that defines a geometric configuration of the one or a plurality of surfaces of the three dimensional objects, or parts thereof, to be projected upon (Base Geometry);
  (ii) three-dimensional data (such as the output of a CAD program) that defines a geometric configuration of the one or a plurality of text, images or symbols, or a combination thereof, to be projected upon the one or plurality of the surfaces of the three-dimensional objects, or parts thereof, to be manufactured (Annotated Geometry);

(d) one or a plurality of optical projectors operably connected with the computers, wherein the optical projectors function to project the one or a plurality of the correlated three-dimensional text, images or symbols, or a combination thereof, originating from the computers, simultaneously or at different times, in a substantially or fully undistorted manner, onto the one or a plurality of the surfaces of the three-dimensional objects, or parts thereof, in one or a plurality of different colors, or combination of colors;

(e) optionally, one or a plurality of movable or stationary means for supporting the optical projectors;

(f) optionally, one or a plurality of movable or stationary means for supporting the computers; and (g) optionally, a means for taking measurements of portions, areas or components of the objects, or parts thereof, or a combination thereof, that is operably connected with the computers.

In still another aspect, the present invention provides a method for providing instructions for guiding users in manufacturing a variety of different three-dimensional objects, or parts thereof, comprising optically projecting using the above computerized optical projection system one or a plurality of three-dimensional text, images or symbols, or a combination thereof, in a substantially or fully undistorted manner, simultaneously or at different times, onto the three-dimensional objects, or parts thereof, in one or a plurality of different colors, or combination of colors.

In yet another aspect, the present invention provides a computer program product for use in a computerized optical system for projecting by one or a plurality of optical projectors operably connected with one or a plurality of computers three-dimensional text, images and/or symbols in a substantially or fully undistorted manner onto one or a plurality of surfaces of a variety of different three-dimensional objects, or parts thereof, comprising:

(a) a computer usable medium having computer readable program code physically embodied therein; and (b) computer readable program code that enables a user to:
  (i) create or import three-dimensional surface data (such as the output of a CAD program) that defines a geometric configuration of one or a plurality of surfaces of the one or a plurality of three-dimensional objects, or parts thereof, to be projected upon (Base Geometry);
  (ii) create or import three-dimensional data (such as the output of a CAD program) that defines a geometric configuration of one or a plurality of text, images or symbols, or a combination thereof, to be projected upon the one or plurality of surfaces of the three-dimensional objects, or parts thereof (Annotated Geometry);
  (iii) optionally, organize the data of item (ii) into ordered steps or according to other desired criteria;
  (iv) correlate into one coordinate system one or a plurality of projectors, the surfaces of the three-dimensional objects, or parts thereof, being projected upon (as defined by item (i)), and the data of item (ii), optionally, in the manner defined in item (iii); and
  (v) display the data of item (ii) using the correlation determined in item (iv) onto the one or plurality of the surfaces of the one or a plurality of the three-dimensional objects, or parts thereof, and, optionally, execute the ordered steps, other desired criteria, or both, identified in item (iii).

In yet another aspect, the present invention provides a computer program product for use in a computerized optical projection system for guiding users in manufacturing a variety of different three-dimensional objects, or parts thereof, in which one or a plurality of optical projectors operably connected with one or a plurality of computers project three-dimensional text, images and/or symbols in a substantially or fully undistorted manner onto one or a plurality of surfaces of the three-dimensional objects, or parts thereof, comprising:
- (a) a computer usable medium having computer readable program code physically embodied therein; and
- (b) computer readable program code that enables a user to:
  - (i) create or import three-dimensional surface data (such as the output of a CAD program) that defines a geometric configuration of one or a plurality of surfaces of the one or a plurality of three-dimensional objects, or parts thereof, to be projected on (Base Geometry);
  - (ii) create or import three-dimensional data (such as the output of a CAD program) that defines a geometric configuration of one or a plurality of text, images or symbols, or a combination thereof, to be projected upon the one or plurality of surfaces of the one or a plurality of the three-dimensional objects, or parts thereof (Annotated Geometry);
  - (iii) organize the data of item (ii) into ordered steps or according to other desired criteria;
  - (iv) correlate into one coordinate system one or a plurality of projectors, the one or a plurality of surfaces of the one or a plurality of the three-dimensional objects, or parts, being projected upon (as defined by item (i)), and the data of item (ii), in the manner defined in item (iii); and
  - (v) display the data of item (ii) using the correlation determined in item (iv) onto the one or a plurality of the surfaces of the one or a plurality of the three-dimensional objects, or parts thereof, to be manufactured and execute the ordered steps, other desired criteria, or both, identified in item (iii).

In another aspect, the present invention provides a programmed computer for use in an computerized optical system for projecting by one or a plurality of optical projectors operably connected with the computer three-dimensional text, images and/or symbols in a substantially or fully undistorted manner onto one or a plurality of surfaces of a variety of different three-dimensional objects, or parts thereof, comprising:
- (a) a computer; and
- (b) a computer usable medium having computer readable program code physically embodied therein that enables a user to:
  - (i) create or import three-dimensional surface data (such as the output of a CAD program) that defines a geometric configuration of one or a plurality of surfaces of the one or a plurality of three-dimensional objects, or parts thereof, to be projected upon (Base Geometry);
  - (ii) create or import three-dimensional data (such as the output of a CAD program) that defines a geometric configuration of one or a plurality of text, images or symbols, or a combination thereof, to be projected upon the one or plurality of surfaces of the one or plurality of the three-dimensional objects, or parts thereof (Annotated Geometry);
  - (iii) optionally, organize the data of item (ii) into ordered steps or according to other desired criteria;
  - (iv) correlate into one coordinate system one or a plurality of projectors, the one or a plurality of surfaces of the one or a plurality of the three-dimensional objects, or parts, thereof being projected upon (as defined by item (i)), and the data of item (ii), optionally, in the manner defined in item (iii); and
  - (v) display the data of item (ii) using the correlation determined in item (iv) onto the one or a plurality of surfaces of the one or a plurality of three-dimensional objects, or parts thereof, and, optionally, execute the ordered steps, other desired criteria, or both, identified in item (iii).

In another aspect, the present invention provides a programmed computer for use in a computerized optical projection system for guiding users in manufacturing a variety of different three-dimensional objects, or parts thereof, in which one or a plurality of optical projectors are operably connected with the computer project three-dimensional text, images and/or symbols in a substantially or fully undistorted manner onto one or a plurality of surfaces of the three-dimensional objects, or parts thereof, comprising:
- (a) a computer; and
- (b) a computer usable medium having computer readable program code physically embodied therein that enables a user to:
  - (i) create or import three-dimensional surface data (such as the output of a CAD program) that defines a geometric configuration of one or a plurality of surfaces of one or a plurality of three-dimensional objects, or parts thereof, to be projected on (Base Geometry);
  - (ii) create or import three-dimensional data (such as the output of a CAD program) that defines a geometric configuration of one or a plurality of text, images or symbols, or a combination thereof, to be projected upon the one or plurality of surfaces of the one or a plurality of the three-dimensional objects, or parts thereof (Annotated Geometry);
  - (iii) organize the data of item (ii) into ordered steps or according to other desired criteria;
  - (iv) correlate into one coordinate system one or a plurality of projectors, the one or a plurality of surfaces of the one or a plurality of the three-dimensional objects, or parts, being projected upon (as defined by item (i)), and the data of item (ii), in the manner defined in item (iii);
  - (v) display the data of item (ii) using the correlation determined in item (iv) onto the one or a plurality of the surfaces of the one or a plurality of the three-dimensional objects, or parts thereof, to be manufactured and execute the ordered steps, other desired criteria, or both, identified in item (iii).

In still another aspect, the present invention provides a computerized method for correlating into one coordinate system (i) one or a plurality of optical projectors operably connected with one or a plurality of computers, (ii) one or a plurality of text, images and/or symbols being projected by the optical projectors, and (iii) one or a plurality of three-dimensional objects, or parts or surfaces thereof, being projected upon by the optical projectors, comprising, using one of the above computerized optical projection systems:
- (a) creating or importing into the computer three-dimensional surface data (such as the output of a CAD program) that defines a geometric configuration of one or a plurality of surfaces of the one or a plurality of the three-dimensional objects, or parts thereof, to be projected upon (Base Geometry);

(b) creating or importing into the computer three-dimensional data (such as the output of a CAD program) that defines a geometric configuration of the text, images or symbols, or a combination thereof, to be projected upon the one or a plurality of the surfaces of the one or a plurality of the three-dimensional objects, or parts thereof. (Annotated Geometry); and (c) identifying at least three correlation points in the three-dimensional surface data of step (a), in the three-dimensional data of step (b), or both; and (d) correlating the correlation points between the three-dimensional surface data of step (a) and the three-dimensional data of step (b).

BRIEF DESCRIPTION OF THE DRAWINGS

FIG. 7 is an illustration of a Demo Panel screen of an Annotated Geometry file of an Authoring Assembly Software Tool ("Authoring Tool") that may be employed in the systems and methods of the invention. In this example file, each row represents a pre-drilled hole on the Base Geometry surface of a three-dimensional object, or part, being manufactured.

FIG. 9 is an illustration of a Data_Import_Form screen of an Authoring Assembly Software Tool ("Authoring Tool") in which a user may define a column location for a pre-drilled hole ID and fastener part number for a three-dimensional object, or part, that is being manufactured.

DETAILED DESCRIPTION OF THE PREFERRED EMBODIMENTS

Figure 1:
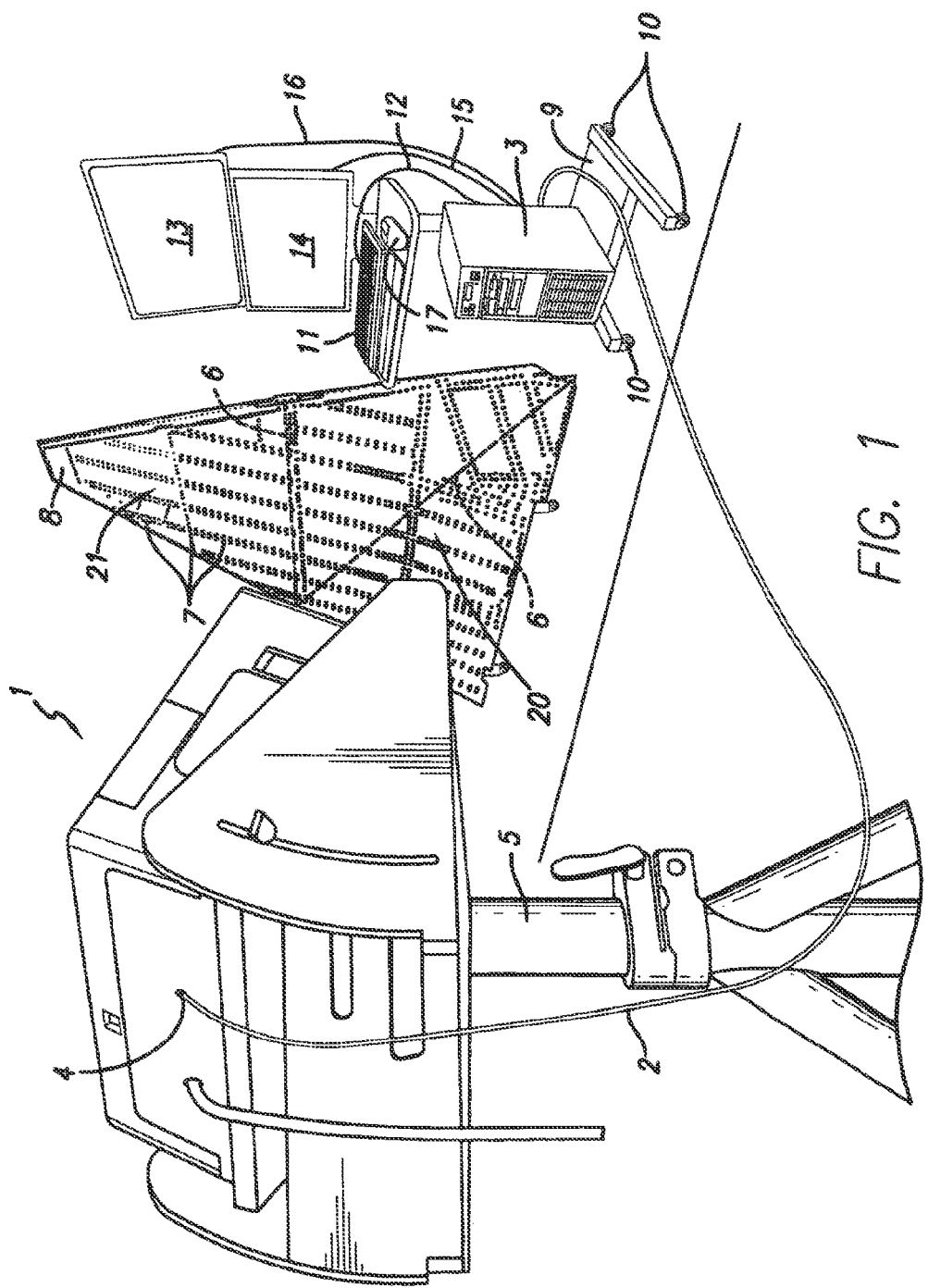
FIG. 1 is an illustration of a preferred system of the invention, and shows an optical projector that is operably connected with a computer using a video cable, and a three-dimensional object (airplane wing) that is being manufactured and projected upon by the optical projector.

The present invention may be understood more readily by reference to the following detailed description of the preferred embodiments of the invention, and to the examples included therein.

Definitions

For purposes of clarity, various terms and phrases that are used throughout this specification and the appended claims are defined in the manner that is set forth below. If a term or phrase that is used in this specification, or in the appended claims, is not defined below, or otherwise in this specification, the term or phrase should be given its ordinary meaning.

Many of the computer software programs and hardware devices that are discussed in these definitions are commercially available from Microsoft Corporation (Redmond, Wash.), and a large amount of additional information about these products is available on the web site microsoft dot com.

The term "about" as is used herein means approximately, as is known, and may be determined, by those having ordinary skill in the art.

The phrase "adaptor" as is used herein means a hardware device, such as a printed circuit board, that enables a computer to use one or more additional peripheral devices and/or hardware.

The phrase "Annotated Geometry file" as is used herein means a data file that contains a three-dimensional (3D) representation of one or a plurality of text, images and/or symbols that will be projected onto one or a plurality of three-dimensional objects, or parts, that will be projected upon by one or more optical projectors. For example, if a user wanted to place a series of fasteners into a skin for an airplane door, the Annotated Geometry file would be the 3D representation of the fastener holes located on the airplane door, as well as any text, images and/or symbols added in the Authoring Tool. The Annotated Geometry file contains the 3D data that describes everything that gets projected onto the surface of a three-dimensional object, or pan. While an image file (for example, a picture of a mountain) is not stored inside the Annotated Geometry, a reference to it is stored inside the Annotated Geometry. Thus, the foregoing is all considered to be data, because it is all a part of the data set. The Annotated Geometry contains the data that will be projected onto the one or a plurality of object, or parts, being projected upon by one or more optical projectors. The data is altered (transformed) prior to projection using the information from a calibration procedure, as is described in. The altering of this data is performed so that the text, images and/or symbols, or a combination thereof, that will projected by the optical projectors is distorted in such a way as to look correct to the person viewing it once it is on the three dimensional object, or part, on which it is being projected upon (regardless of where the optical projectors are placed, located and/or positioned in a manufacturing or other environment in relation to the three-dimensional object, or part, being projected upon).

The phrase "application" as is used herein means software other than the operating system, such as Word processors, database managers, Web browsers and the like. Each application generally has its own user interface that allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse).

The phrase "anti-virus software" as is used herein means computer software that functions to prevent, detect and/or remove malware, such as computer viruses, worms and trojan horses. Such programs may also prevent and remove adware, spyware and/or other forms of malware. A variety of strategies are typically employed. Signature-based detection involves searching for known malicious patterns in executable code. However, it is possible for a user to be infected with new malware in which no signature exists yet. To counter such so called zero-day threats, heuristics can be used. One type of heuristic approach, generic signatures, can identify new viruses or variants of existing viruses for looking for known malicious code (or slight variations of such code) in files. Some antivirus software can also predict what a file will do if opened and/or run by emulating it in a sandbox and analyzing what it does to see if it performs any malicious actions. If it does, this could mean the file is malicious.

The phrases "Application Program Interface" and API as is used herein means a set of commands, functions and/or protocols which programmers can use when building software for a specific operating system. The API allows programmers to use predefined functions to interact with an operating system, instead of writing them from scratch. All computer operating systems, such as Windows, Unix, and the Mac OS, usually provide an application program interface for programmers. APIs are also used by hardware devices that can run software programs. While the API makes the programmer's job easier, it also benefits the end user, since it generally ensures that all programs using the same API will have a similar user interface.

The phrase "ARM-based device" as is used herein mean ARM microprocessors or similar products, which are often employed in embedded devices, as well as in portable devices, such as personal digital assistants (PDAs) and some phones. The Microsoft software that is described herein generally significantly improves the performance of executing ARM instruction—reducing cold-boot time and improving application execution speed. Such devices are commercially available from sources that are known by those having ordinary skill in the art, for example, from ARM, Inc. (Cambridge, England).

The terms "assembly," "assembly processes" and "assemble" as are used herein refer to an act of connecting, affixing and/or assembling together of pieces, parts, components or things to produce a partially or fully completed product, such as a machine, an apparatus, a device, an instrument, an airplane, a submarine, a boat, a helicopter, a jet, a vehicle (automobile, truck, military vehicle, camper, trailer or the like), an electrical circuit, or a portion thereof, such as a wing of an airplane, or the like, or to the product that has been assembled.

The phrases "assembly jig" and "tooling" as are used herein mean the structure(s) that hold and/or support an object (or part thereof) being assemble or manufactured, or worked on, usually in a repeatable and secure position, so that a finished product is consistent with other such projects.

The phrase "Base Geometry file" as is used herein means a data file that contains a three-dimensional (3D) representation of a three-dimensional object, or part, that is being projecting on by an optical projector. For example, if a user wanted to place fasteners into a skin for an airplane door, the Base Geometry file would be the 3D representation of this door. This data file is typically output from a CAD computer software program, and is employed to in the calibrations that are performed by the systems and methods of the invention.

The term "byte" as is used herein refers to a unit of memory in a memory location or device of a computer. The storage capacity of a memory location or device, such as a main or secondary memory (hard disks, floppy disks, CD-ROMs, and the like) of a computer, is the total number of bytes that it can hold. Some computers can store thousands or millions of bytes. A large main memory permits large programs, or many programs, to run. On many personal computers, the hard drive can usually store between 40 GB and 120 GB. The table below shows the relation between bytes, number of bytes and symbols used to represent them.

| Unit | Symbol | Number of Bytes |
|---|---|---|
| Byte | None | $2^0 = 1$ |
| Kilobyte | KB | $2^{10} = 1024$ |
| Megabyte | MB | $2^{20} = 1,048,576$ |
| Gigabyte | GB | $2^{30} = 1,073,741,824$ |
| Terabyte | TB | $2^{40} = 1,099,511,627,776$ |

The terms "CAD" and "Computer-Aided Design" as are used herein mean the use of a computer software tool for a design of three-dimensional and other objects, or parts, real or virtual. CAD often involves more than just shapes, and CAD may be used to define assembly and dimensional manufacturing processes, both manual and automated. The output of CAD often must convey also symbolic information such as materials, processes, dimensions and tolerances according to application-specific conventions. CAD may be used to design curves and figures in two-dimensional (2D) space or curves, surfaces, or solids in three-dimensional (3D) objects. Additional information about CAD is present in G. Farin, *A History of Curves and Surfaces in CAGD, Handbook of Computer Aided Geometric Design* (North Holland, ISBN 0 444 51104-0). CAD software is commercially available from sources that are known by those having ordinary skill in the art.

The terms "CAE" and "Computer-Aided Engineering" as are used herein refer to computer software tools that are used by the electronic design automation industry to have computers design, analyze and/or manufacture products and processes. The software can analyze designs that have been created in a computer or that have been created elsewhere and entered into the computer. Different kinds of engineering analyses can be performed, such as structural analysis and electronic circuit analysis. CAE includes CAD (computer-aided design) for the use of a computer for drafting and/or modeling designs, and CAM (computer-aided manufacturing) for the use of computers for managing manufacturing processes. CAE software is commercially available from sources that are known by those having ordinary skill in the art.

The term "calibrate" as is used herein means to adjust, align, standardize, to make corrections in and/or to correlate. For example, in the systems and methods of the invention, the following may be correlated into one common coordinate system: (i) one or a plurality of optical projectors; (ii) one or a plurality of text, images and/or symbols being projected by the optical projectors; and (iii) one or a plurality of three-dimensional objects, or parts thereof, being projected upon by the optical projectors, such as three-dimensional objects, or parts, that are being manufactured. For example, an instrument, device, apparatus or machine, or a component thereof, may be standardized by checking, adjusting or determining by comparison with a standard the deviation from the standard so as to ascertain the proper correction factors. Independent entities that can perform such calibrations for a variety of instruments, devices, apparatuses and machines are known by those having ordinary skill in the art, such as Davis Calibration Labs (Atlanta, Ga.) and Qual Tech Labs, Inc. (Exton, Pa.). As is also known by those having ordinary skill in the art, calibration software may also be employed to perform calibrations for a variety of instruments, devices, apparatuses and machines, and is commercially available from known sources, such as CAMA Software (Trabuco, Calif.), Fluke Corporation (Everette, Wash.) and ProCalV5 (West Chester, Pa.).

The terms "CAM" and "Computer-Aided Manufacturing" as are used herein refer to a software tool employed for an integration of designing and/or manufacturing by computer. Generally, the electronic image of products designed in CAD programs are translated into a numerical control programming language, which generates the instructions for the machine that makes it (numerical control). CAD designs are also generally converted into slices for rapid manufacturing. CAM software is commercially available from sources that are known by those having ordinary skill in the art.

The term "camera" as is used herein means a digital (or other suitable) camera and/or video camera that has an ability to capture and transfer relatively high resolution digital (or other) images to a computer for analysis by the computer system software including, but not limited to, those that are commercially available from Point Grey Research, Inc. (Richmond, BC, Canada) for machine vision, industrial imaging and computer vision applications, such as IEEE-1394 (FireWire) and USB 2.0 imaging, stereovision and spherical vision cameras (Chameleon, Dragonfly2, Dragonfly Express, Firefly MV, Flea2, Grasshopper, ProFUSION 25, Bumblebee2. Bumblebee XB3, Ladybug 2, Ladybug3, and the like). A variety of camera catalogs, computer software programs and software development kits, often for use with such cameras and corresponding computers, are present on the Point Grey Research, Inc. and other web sites.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "compiler" as is used herein means one or more computer program (alone or in a set) that transform human readable source code of another computer program into the machine readable code that a CPU can execute or source code written in a computer language into another computer language (the machine code or target language, which often has a binary form known as object code). The most common reason for wanting to transform source code is to create an executable program. For many compilers, source code is translated directly into a particular machine language. Java source code, for example, may be converted using a Java compiler into Java byte code, and another compiler could be employed, for example, to convert the Java byte code into a particular machine language for execution on a particular computer.

The term "complex" as is used herein means relatively complicated, and including interconnected parts, units, elements and/or things (usually many, and often scores, hundreds, thousands or even millions). Those having ordinary skill in the art may readily determine whether or not a particular assembly is complex. If a particular assembly requires written instructions and/or drawings to assemble it, then it can be considered to be complex. If, on the other hand, a person having ordinary skill in the particular art of the assembly can assemble it without referring to any documentation or drawings, then it can be considered to be non-complex.

The terms "computer" and "programmable computer" as are used herein mean a programmable, preferably multipurpose, electronic machine that accepts data, such as raw data, facts and/or figures, and processes, transforms and/or manipulates the data into information that can be used. It is typically operated under the control of instructions that are stored in its own memory unit, which can accept and store data (e.g. data entered using a keyboard), perform arithmetic and logical operations on that data without human intervention (e.g. process data into information) and produce output from the processing (e.g. view information on a screen). A computer may be a stand-alone unit or may consist of a plurality of interconnected units that are operably connected with each other.

The phrase "computer network" as is used herein means a plurality of interconnected computers. A computer network generally allows computers to communicate with each other and/or to share resources and information. Networks may be classified according to a wide variety of characteristics. Computer networks can also be classified according to the hardware and software technology that is used to interconnect the individual devices in the network, such as Optical fiber, Ethernet, Wireless LAN, HomePNA, Power line communication or G.hn. Ethernet generally uses physical wiring to connect devices, and frequently deployed devices include hubs, switches, bridges and/or routers. Wireless LAN technology is generally designed to connect devices without wiring, and use radio waves or infrared signals as a transmission medium. ITU-T G.hn technology generally uses existing home wiring (coaxial cable, phone lines and/or power lines) to create a high-speed (generally up to 1 Gigabit/s) local area network.

The phrase "computer programmer" as is used herein means a person or entity that designs, writes, develops and/or tests computer programs, or the like.

The phrase "computer programming" as is used herein means a process of writing, testing, debugging/troubleshooting and/or maintaining source code of computer programs. This source code is written in a programming language, and the code may be a modification of an existing source or something completely new. The purpose of programming is to create a program that exhibits a certain desired behavior (customization). The process of writing source code may require, depending upon the circumstances, knowledge of the application domain, specialized algorithms and/or formal logic.

The phrase "computer software" as is used herein refers to computer programs and/or a series of instructions that may be installed on a computer, and that the computer's hardware executes, generally one after another. It generally consists of lines of code written by computer programmers that have been compiled into a computer program. Software programs are generally stored as binary data (a 2-digit numerical system used by computers to store data and compute functions that consists of ones and zeros) that is copied to a computer's hard drive when it is installed. Since software is virtual and does not take up any physical space, it is generally easier, and often less expensive, to upgrade than computer hardware. Computer software is often continuously upgraded and improved. CD-ROMs, DVDs and other types of media can be used to distribute software. When one purchases a software program, it usually comes on a disc, which is a physical means for storing the software. Many software programs require that one first install them on a computer before using them. For example, if one purchases Microsoft Office, it needs to be installed on a computer before one can run any of the included programs, such as Word or Excel. The software can be installed from a CD or DVD, an external hard drive, or from a networked computer. A software program or software update can also often be installed using a file that is downloaded from the Internet. Installing a software program generally writes the necessary data for running a program on a computer's hard drive. Often the installer program will decompress the data that is included with the installer immediately before writing the information to a hard drive. Software updates, which are often downloaded from the Internet, generally work the same way. When an update is run, the installer file generally decompresses the data, and then updates the correct program or operating system. Installing software usually involves double-clicking an installer icon, and then clicking "I Agree" when the license agreement pops up. A computer operator may have to choose what directory on a hard disk that the software should be installed in, but often the installer will even choose that for the computer operator. Some software can be installed by simply dragging a folder or application program onto a hard drive.

The term "computer port" as is used herein refers to a physical or wireless connection on a programmable computer, an optical projector and/or another peripheral device that functions to provide communication between two or more instruments or devices, usually by one or more communication cables being inserted into one or more of the ports present on the instruments or devices or wirelessly (using, for example, Wi-Fi, Bluetooth, 4610X and/or the like) in a manner that information (including data) may be transferred from one instrument or device to the other, or vice versa, or between each of the devices or instruments.

The phrase "computer usable medium" as is used herein means any portable or non-portable medium in which computer readable program code can be physically embodied, including, but not limited to, an optical disk, a CD, a CD-ROM, a CD-R, a floppy disc, a drive, a hard drive, a DVD, a USB memory key, a SD memory cards, or the like.

The phrase "configure" as is used herein means to design, arrange, set up and/or shape, generally with a view to specific applications or uses.

The phrase "configurator" as is used herein means a software application or tool that typically is employed to design products that fulfill or match the requirements, desired or needs of customers (or others).

The term "coordinate system" as is used herein means schemes for locating points in a given space by means of numerical quantities specified with respect to some frame of reference. These quantities are the coordinates of a point. To each set of coordinates there corresponds just one point in any coordinate system, but there are useful coordinate systems in which to a given point there may correspond more than one set of coordinates. A coordinate system is a mathematical language that is used to describe geometrical objects analytically; that is, if the coordinates of a set of points are known, their relationships and the properties of figures determined by them can be obtained by numerical calculations instead of by other descriptions. It is the province of analytic geometry, aided chiefly by calculus, to investigate the means for these calculations. The most familiar spaces are the plane and the three-dimensional Euclidean space. In the latter, a point P is determined by three coordinates (x, y, z). The totality of points for which x has a fixed value constitutes a surface. The same is true for y and z, so that through P there are three coordinate surfaces. The totality of points for which x and y are fixed is a curve and through each point there are three coordinate lines. If these lines are all straight, the system of coordinates is said to be rectilinear. If some or all of the coordinate lines are not straight, the system is curvilinear. If the angles between the coordinate lines at each point are right angles, the system is rectangular. A Cartesian coordinate system is constructed by choosing a point O designated as the origin. Through it three intersecting directed lines OX, OY, OZ, the coordinate axes, are constructed. The coordinates of a point P are x, the distance of P from the plane YOZ measured parallel to OX, and y and z, which are determined similarly. Usually the three axes are taken to be mutually perpendicular, in which case the system is a rectangular Cartesian one. A similar construction can be made in the plane, in which case a point has two coordinates (x, y). A polar coordinate system is constructed in the plane by choosing a point O called the pole and through it a directed straight line, the initial line. A point P is located by specifying the directed distance OP and the angle through which the initial line must be turned to coincide with OP in position and direction. The coordinates of P are (r, θ). The radius vector r is the directed line OP, and the vectorial angle θ is the angle through which the initial line was turned, + if turned counterclockwise, − if clockwise. Spherical coordinates are constructed in three-dimensional Euclidean space by choosing a plane and in it constructing a polar coordinate system. At the pole O a polar axis OZ is constructed at right angles to the chosen plane. A point P, not on OZ, and OZ determine a plane. The spherical coordinates of P are then the directed distance OP denoted by p, the angle θ through which the initial line is turned to lie in ZOP and the angle φ=ZOP. Cylindrical coordinates are constructed by choosing a plane with a pole O, an initial line in it, and a polar axis OZ, as in spherical coordinates. A point P is projected onto the chosen plane. The cylindrical coordinates of P are (r, θ, z) where r and θ are the polar coordinates of Q and z=QP). By means of a system of equations, the description of a geometrical object in one coordinate system may be translated into an equivalent description in another coordinate system. Additional information about coordinates is present in Shigeyuki Morita et al., Geometry of Different Forms (American Mathematical Society, ISBN 0821810456 (2001)); Fletcher Dunn et al., 3D Math Primer for Graphics and Game Development (Jones & Bartlett Publishers, 2002, ISBN 1556229119, ISBN 9781556229114), A. V. Durrant, *Vectors in Physics and Engineering* (Chapman and Hall, 1996, ISBN 0 412 62710 8); Vincent Pisacane, *Fundamentals of Space Systems* (2nd Edition, Oxford University Press, 2005, ISBN 13-978-0-19-516205-9, ISBN 0-19-516205-6): and Paul Martz, *OpenG Distilled* (1st Edition, Addison Wesley, 2006, ISBN 0321336798, ISBN 9780321336798).

The term "controller" as is used herein means a device that sends information back and forth from a CPU and main memory to peripherals. Each device generally has its own way of formatting and sending data, and part of the controller's job is to handle this.

The term "correlate" as is used herein means a structural, functional, quantitative and/or qualitative correspondence and/or relationship between two or more objects, data sets, information and/or the like, preferably where the correspondence or relationship may be used to translate one or more of the two or more objects, data sets, information and/or the like so to appear to be the same or equal.

The terms "CATIA" and "Computer Aided Three-Dimensional Interactive Application" as are used herein refer to a multi-platform CAD/CAM/CAE commercial software suite. It was developed by Dassault Systemes (Vdlizy-Villacoublay, France), and is commercially available from sources known by those having ordinary skill in the art, such as IBM Corporation (Armonk, N.Y.).

The phrase "data transfer device" as is used herein means a peripheral, such as a modem, that allows information to be sent and received between computers. A modem permits information to be sent across a telephone line, for example, at a rate of 56 kilobits (Kb) per second, or approximately 56,000 bits per second (bps).

The phrase "database engine" as is used herein refers to that part of a database management system (DBMS) that stores and/or retrieves data. Most DBMS's include an Application Programming Interface (API) that enables a computer operator to directly control the engine without going through the DBMS's user interface.

The term "device" as is used herein means a unit of hardware that generally is outside or inside the case or housing for the essential computer (processor, memory and data paths), and that is capable of providing input to the essential computer, of receiving output, or of both. It may include, for example, keyboards, mouses, display monitors, hard disk drives, CD-ROM players, printers, audio speakers and microphones, projectors, cameras and other hardware units, which are known by those having ordinary skill in the art. Some devices, such as a hard disk drive or a CD-ROM drive, while physically inside the computer housing, are considered devices because they are separately installable and replaceable. With notebook and smaller computers, devices tend to be more physically integrated with the "non-device" part of the computer. The units of a computer to which the term device is generally not applied include the motherboard, the main processor and additional processors, such as numeric coprocessors, and random access memory (RAM). The term peripheral is sometimes used as a synonym for device or any input/output unit.

The term "dimension" as is used herein in connection with a space or object means the minimum number of coordinates that are needed to specify each point within it. A line has a dimension of one because only one coordinate is needed to specify a point on it. A surface, such as a plane, or the surface of a cylinder or sphere, has a dimension of two because two coordinates are needed to specify a point on it (for example, to locate a point on the surface of a sphere, both its longitude and latitude are required). Cubes, cylinders and spheres, for example, are three-dimensional because three coordinates are needed to specify a point on them (x, y and z).

The terms "display," "display screen," "monitor," "computer screen" and "projector" as are used herein, depending upon the context, mean the various devices that can display, show and/or illustrate a computer's user interface and open programs, allowing the user to interact with the computer, typically using a keyboard and mouse, such as an LCD monitor, or data, information and/or graphics, or a display itself (i.e., that which is shown on a screen or monitor). Other known devices may also include display-type screens and/or displays.

The term "distorted" as is used herein means improper, not sharp or unclear in appearance and/or a change in a shape of an image, such as text, images and/or symbols (as opposed to being proper, sharp, clear and same in shape). For example, three-dimensional text, images and/or symbols appear in a distorted manner when projected onto a three-dimensional object, or part, when the systems and methods of the present invention are not employed.

The terms "dock" and "docking stating" as are used herein mean a cradle for a portable device that serves to charge the unit and/or connect it to other sources or destinations. For example, it may be a base station for a laptop computer that turns the portable computer into a desktop system. It generally uses a large plug and socket to quickly connect the laptop, which duplicates all the cable lines for the monitor, printer, keyboard, mouse and the like. The docking station typically has one or two slots for expansion boards, and may house speakers and other peripherals such as an optical drive.

The phrase "Document Explorer" as is used herein refers to software that functions to access and/or display local and/or online Help. Microsoft Document Explorer, for example, has its own Help documentation that may be accessed by opening a Commerce Server 2007 Help system, clicking the "Help" menu, and then clicking "Help on Help." Document Explorer typically provides a table of contents, an index, a full-text search and Help favorites for bookmarking topics, so that a computer operator may easily find information. When the computer operator browses the table of contents or uses the index, local Help is generally accessed. When the operator uses the full-text search feature, there becomes an option of searching local and online content. Using Document Explorer, an operator can see the table of contents or search results while viewing a Help topic. A "Help Favorites" tab may permit an operator to relatively quickly display topics and searches that are referred to frequently.

The term "download" as is used herein means to transfer (data or programs) from a server, host computer or other source to another computer or device.

The phrase "Device Drivers, Diagnostics and Technical Information" as is used herein means a program that serves as a resource for device drivers, diagnostics and technical information in the event that they are required or desired to resolve a problem with a computer system. It is generally compatible with a variety of different computers, and is supported by Dell Technical Support when it is provided by Dell Inc., and employed with a Dell system.

The terms "driver" and "device driver" as are used herein mean a program that controls a particular type of device that is generally attached to a computer. There are device drivers for printers, displays, CD-ROM readers, diskette drives and the like, and many device drivers may be built into an operating system or other computer-related product. However, if a new type of a device is subsequently purchased that such operating system did not anticipate, a new device driver may need to be installed. A device driver essentially converts the more general input/output instructions of an operating system to messages that the device type can understand. Some Windows programs are virtual device drivers, and these programs may interface with the Windows Virtual Machine Manager. There is usually a virtual device driver for each main hardware device in a system, including the hard disk drive controller, keyboard, and serial and parallel ports. They are generally used to maintain the status of a hardware device that has changeable settings. In Windows operating systems, a device driver file usually has a file name suffix of DLL or EXE, and a virtual device driver usually has the suffix of VXD.

The phrase "Driver Download Manager" as is used herein means a functionality which is available, for example globally across the support Dell dot corn web site, to facilitate a downloading of files, for example, from Dell, Inc. Generally, the time taken to download files using this tool is significantly shorter than would occur otherwise, often up to a 30-40% reduction in time, depending upon the internet connectivity. It also may include one or more mechanisms to facilitate the process of downloading files, for example, from the foregoing web site. For example, it may permit a computer operator to pause and resume downloads, with the progress of a download being capable of being saved via an icon on the computer, which can often be restarted at any time. It may also permit the computer operator to restart a download in the event of an interruption or termination of an internet connection during a download, as the Driver Download Manager may save the progress. Additional information about Driver Download Managers is present on the foregoing web site.

The phrase "electromagnetic field" as used herein means a physical field that is produced by electrically charged objects, and affects the behavior of charged objects in the vicinity of the field.

The phrase "emulator" as is used herein means a hardware, software or a combination of the two that enables a computer to act like another computer, and run applications written for that computer. It may be, for example, a hardware add-on that actually contains an instruction execution module for the emulated computer or software that provides a translation layer from the emulated computer to the computer it is running in. The emulator may generally translate machine language, calls to the operating system or both.

The term "energy" as is used herein mean a physical quantity that describes the amount of work that can be performed by a force, an attribute of objects and systems that is subject to a conservation law. Different forms of energy include kinetic, potential, thermal, gravitational, light, sound, elastic and electromagnetic energy, with the forms of energy often named after a related force, and can be expressed in joules or ergs. According to the principle of the conservation of energy, any form of energy can be transformed into another form, but the total energy always remains the same.

The phrases "Enterprise software" and Enterprise application software" as are used herein mean software that is intended to solve an enterprise problem, rather than a departmental problem, and is often written using an Enterprise Software Architecture. Large enterprises often attempt to build enterprise software that models the entire business enterprise and/or is the core Information Technology (IT) system of governing the enterprise and the core of communication within the enterprise. As business enterprises have similar departments and systems in common, enterprise software is often available as a suite of programs that have attached enterprise development tools to customize the programs to the specific enterprise. Enterprise level software is software which provides business logic support functionality for an enterprise, typically in commercial organizations, which aims to improve the enterprise's productivity and efficiency. Services that are provided by enterprise software are typically business-oriented tools such as online shopping and online payment processing, interactive product catalogue, automated billing systems, security, content management, CRM, ERP, Business Intelligence, HR Management, Manufacturing, EAI, Enterprise Forms Automation and the like. Characteristics of enterprise software are performance, scalability and/or robustness. Enterprise software typically has interfaces to other enterprise software (for example LDAP to directory services) and is centrally managed. Enterprise software is often designed and implemented by an Information Technology (IT) group within an enterprise, but it may also be purchased from an independent enterprise software developer, that often installs and maintains the software for their customers. Another model is based on a concept called on-demand software, or Software as a Service. The on-demand model of enterprise software is made possible through the widespread distribution of broadband access to the Internet. Software as a Service vendors generally maintain enterprise software on servers within their own enterprise data center, and then provide access to the software to their enterprise customers via the Internet. Enterprise software is often categorized by the business function that it automates, such as accounting software or sales force automation software. The are enterprise systems devised for particular industries, such as manufacturing enterprises. Enterprise application software is application software that often performs business functions such as accounting, production scheduling, customer information management, bank account maintenance, and the like. It is frequently hosted on servers, and generally simultaneously provides services to a large number of enterprises, typically over a computer network. This is in contrast to the more common single-user software applications, which generally run on a user's own local computer and serve only one user at a time.

The phrase "executable file" as is used herein generally means a sequence of subroutine calls that cause a computer to perform indicated tasks according to encoded instructions, as opposed to a file that only contains data.

The term "fastener" as is used herein means an object, such as a screw, bolt, nail or the like, or a substance, such as glue (or another adhesive), tape or the like, that may be used to physically or mechanically attach or connect a plurality of items together. Depending upon the type of fastener employed, a fastener can, in some situations, be paired with a nut, such that manufactured or assembled parts are sandwiched between a head of the fastener and the nut itself.

The term "file" as is used herein means a set of related or other records (written, electronic or otherwise) that are kept together The phrase "frequency" as is used herein means the number of occurrences of a repeating event per unit of time. The period is the duration of one cycle in a repeating event, so the period is the reciprocal of the frequency. Frequency has an inverse relationship to the concept of wavelength, and is inversely proportional to wavelength λ (lambda). The frequency f is equal to the phase speed v of a wave divided by the wavelength λ of the wave:

$$f = \frac{v}{\lambda}.$$

The term "graphics card" as is used herein means a mechanical device that is built into, or added to, a computer and enables a user to see graphics and/or video, preferably faster and/or clearer, on the computer.

The phrases "grip gage" and "grip gun" as are used herein refers to a device or instrument that can function to measure pre-drilled or other hole depths, for example, in a component part of a three-dimensional object, or part, that is being assembled or otherwise manufactured, to enable a user to determine proper bolt and/or fastener lengths for the hole. A corresponding dual use scale can measure depth of holes in 1/16" increments to 2½", and + grip length of fasteners in 1/16" increments to 2½". Grip gages may be operably connected with computers using, for example, serial ports, USB cables. Ethernet cables, or the like in order to communicate measured data back to a host (or other) computer (or to otherwise supply data and/or other information to the computers, and/or receive data and/or other information from the computers). Grip gages are commercially available from sources that are known by those having ordinary skill in the art, such as AveryTools (Fort Worth, Tex.).

The term "hard disk" as is used herein means a part of a unit (a "disk drive," "hard drive," or "hard disk drive") that stores and provides relatively quick access to large amounts of data on an electromagnetically charged surface; or set of surfaces. Today's computers typically come with a hard disk that contains several billion bytes (gigabytes) of storage (i.e., the place where data is held in an electromagnetic or optical form for access by a computer processor).

The phrase "hard drive" as is used herein means a unit that stores data on a computer. It generally houses a hard disk, where all of the computer files and folders are generally physically located. A typical hard drive can hold over 100 GB of data, and other hard drives can hold more data. The data is generally stored on a stack of disks that are mounted inside of a solid encasement. These disks generally spin extremely fast (often at either 5400 or 7200 RPM), so that data can be accessed immediately from anywhere on the drive. The data is stored on the hard drive magnetically, so it stays on the drive even after the power supply is turned off. In order to install new software on a computer, a user often needs to run an installer program. This program unpacks compressed data included with the installer and writes new information to a hard drive. While some installers do not use compressed data, most use some level of compression since it reduces the size of the files included with the installer. This is especially helpful when downloading programs or software updates from the Internet. RAID (Redundant Array of Independent (or Inexpensive) Disks) is a category of disk drives that employ two or more drives in combination for fault tolerance (an ability of a system to respond gracefully to an unexpected hardware and/or software failure) and performance. RAID disk drives are used frequently on servers, but are not generally necessary for personal computers. RAID allows a user to store the same data redundantly (in multiple paces) in a balanced way to improve overall performance.

The phrase "hardware" as is used herein means a physical aspect of computers, and distinguishes the "box" and the electronic circuitry and components of a computer from the program that is put into it to make it perform different functions. Hardware includes not only the computer proper (central processing unit, input/output devices, main memory, secondary memory devices, chips, boxes, wires, keyboards, speakers, disks, printers, mice, monitors and/or the like), but also the cables, plugs, connectors, power supply units and peripheral devices, such as the keyboard, mouse, audio speakers and printers.

The phrase "header" as is used herein means: (i) a unit of information that precedes a data object; or (ii) part of a data packet that contains transparent information about the file or the transmission. The header can generally be accessed only by the operating system or by specialized computer programs.

The term "hole" as is used herein means an area or portion of an object (or part, surface or skin) that is partially or fully void of material, regardless of shape or size, such that light or other objects can typically pass through it. Holes in objects may be pre-drilled (or otherwise drilled or formed). Pre-drilled holes are shown in the accompanying drawings.

The phrase "identity protection" as is used herein means a protection that is in addition to, or enhanced, in comparison with conventional security software. It often may keep a computer safe from online crime, including identity theft. It is often specifically designed to help prevent thieves from using carefully-targeted attacks to steal passwords, bank account details, credit card numbers and other digital valuables. It often uses a technology called behavioral analysis to make sure that all of the programs running on a computer are operating the way that they should. Typically, if it spots something suspicious that could indicate an attempted ID theft attack, it shuts that activity down, preventing any possible theft from occurring. It generally may be used in addition to other security software programs from the same or different vendors, and runs alongside most or all other computer programs to keep a computer safer when it is online.

The phrase "images" as is used herein includes pictures, drawings, illustrations, graphics, and/or the like, or any combination thereof.

The term "information" as is used herein includes, but is not limited to, text, data, symbols, images, pictures, drawings, illustrations, other graphics and/or the like, for example, in the form of letters, numbers, symbols, words, phrases, sentences, paragraphs, pages, documents and/or the like.

The phrase "input device" as is used herein means any machine, device or instrument that can be used in connection with the systems and methods of the invention to perform a particular desired function, such as measuring one or more features of a three-dimensional object (or part thereof) being assembled or otherwise manufactured, preferably in a manner that permits one or more computers employed in the systems and methods to interface with the input devices, so that they can accept input information from the devices and/or that information can otherwise be transferred or exchanged between the computers and the input devices. Examples of such input devices include, but are not limited to, electronic measurement devices, such as grip gages and depth gages, continuity checkers and/or the like. For example, some of the grip gages that are described and/or illustrated herein are operably connected with the computers and have an ability to, with one squeeze of a user's hand, align their probes into pre-drilled holes, measure the depths of the pre-drilled holes and send the data resulting from such measurements to the computers.

The term "install" as is used herein in connection with a software program generally means writing the necessary data for running the program on a hard drive. Often, the installer program will decompress the data included with the installer immediately before writing the information to a hard drive. Software updates, which are often downloaded from the Internet, work the same way. When the update is run, the installer file generally decompresses the data and then updates the correct program or operating system.

The phrase "installer program" as is used herein means a computer program that has an ability to install a new program on a computer or update a program that is currently present on a hard drive. Generally, it can also update or add files to an operating system. Most installers can be run by double-clicking the installer icon and then choosing a folder into which the software should be installed. The installers generally decompress and write the data on the hard drive. Once the installer is finished, the new or updated software can often by used by a computer operator right away. If any system files have been installed, the computer operator may be asked to restart a computer before using the new software (because system files may only be able to be loaded during a computer's boot process).

The phrases "Intel MKL" and "Intel Math Kernel Library" as are used herein refer to a library of highly optimized, extensively threaded math routines for science, engineering, and financial applications that desire or require maximum performance. Core math functions include BLAS, LAPACK. ScaLAPACK, Sparse Solvers, Fast Fourier Transforms, Vector Math, and more. It can perform many of the math calculations that are used to determine how the annotated geometry should be altered based on the results of a calibration or correlation process, and can be used for any software that performs significant mathematical calculations. It is also optimized for Intel processors, so that it will perform these calculations more rapidly.

The phrase "intensity" as is used herein means a measure of the time-averaged energy flux. To find the intensity, the energy density (the energy per unit volume) is multiplied by the velocity at which the energy is moving. The resulting vector has the units of power divided by area ($W/m^2$).

The term "Internet" as is used herein means a global network that connects multiple, and possibly millions, of computers together, often permitting exchanges of data, news and/or opinions. Unlike online services, which are generally centrally controlled, the Internet is decentralized by design. Each Internet computer (host) is generally independent. Its operators can choose which Internet services to use and which local services to make available to the global Internet community. There are a variety of ways to access the Internet, including online services such as America Online, and commercial Internet Service Providers.

The term "interpreter" as is used herein is a software program that functions like a compiler, but that performs a translation and execution in short bursts in which a small portion of source code, such as one statement, is translated and executed, and then another small portion of source code, such as a second statement, is translated and executed, and so forth.

The term "Java" as is used herein means one type of computer programming language that can be used to create computer software programs. It is not tied to any particular processor type and, thus, will work on many different types, and makes, of computers. It is typically is used worldwide, and permits software to be easily exchanged and executed via the World Wide Web (WWW or Web). Further, it includes a library of extra software that can be employed when a computer programmer is developing a program. The library permits the programmer to create graphics, communicate over networks, interact with databases, and the like. Typically, Java applications have a similar basic structure including, for example, comments (first few lines of the program that start with the symbols //, and help readers of the code understand the purpose of the program, and what it accomplishes), a class definition (which defines the Java program), a main method (location at which processing commences, with each programming statement (in the form of lines of code) in the main method being executed one at a time in order until the end of the method is reached, and is preceded by the words "class," "public," "static" and "void"), white space (spaces that separate the words and symbols that are used in a program, and include blanks, tabs and newline character), and printIn method (which prints specified characters to a screen in a character screen, and is enclosed in double quote characters ("")). When the program is executed, it calls the PrintIn method to print the first statement, and then the second statement, and so forth. The program terminates with the last statement. Additional information about Java is present in John Lewis et al., *Java Software Solutions*, (2nd Edition, Pearson Education, Inc., 2007, ISBN 0-13-222251-5).

The term "laser" as is used herein means a device that emits light through a process known as stimulated emission. Laser light is usually spatially coherent, which means that the light either is emitted in a narrow, low-divergence beam, or can be converted into one with the help of optical components, such as lenses.

The term "lens" as is used herein means a generally transparent optical device used to converge or diverge transmitted light and/or to form images.

The term "library" as is used herein means: (i) a collection of programs or data files; or (ii) a set of ready-made software routines (functions) for programmers. The routines are generally linked into the program when it is compiled.

The term "light" as is used herein means electromagnetic radiation, particularly radiation of a wavelength that is visible to the human eye (generally from about 380 to about 750 nm). Four primary properties of light are intensity, frequency or wavelength, polarization and phase. Light exists in tiny "packets" called photons, and exhibits properties of both waves and particles.

The term "lumen" as is used herein is a unit of measurement of the amount of brightness that comes from a light source. Lumens define "luminous flux," which is energy within the range of frequencies that human beings perceive as light. For example, a 100 watt bulb generates 1.200 lumens. An ANSI lumen is a measurement of light that has been standardized by ANSI (American National Standards Institute), and is commonly used to rate the brightness of a data projector. An ANSI lumen rating uses an average of several measurements taken across the face of the light source. A small room typically requires from 200 to 300 ANSI lumens, whereas a large room may require from 400 to 600, and a large auditorium may need 2000 or more.

The term "managed software" as is used herein means a collection of software elements that are generally grouped under a logical system. The purpose of a managed software system is to provide a logical container to organize a collection of software elements (database server, web server and the like), and its configuration is largely up to the user.

The term "manipulate" as is used herein in connection with information or data means to move, arrange, maneuver, control, manage, negotiate, translate, make adjustments to, handle, transform, influence, overlay, use, alter and/or the like.

The term "manufacture" as is used herein means a production of a product, including, but not limited to, all of the various steps that may be required to produce a particular product, such as assembly, measurement and/or quality assurance inspection, and/or the like.

The phrase "manufacturing area" as is used herein means any room (conference room, meeting room, office or the like), theater, plant (assembly plant, manufacturing plant or the like), business facility, line (assembly line or the like), or other area, location or environment, or combination thereof, in which, or on which, a three-dimensional object may be assembled or otherwise manufactured.

The term "mirror" as is used herein means a surface, such as polished metal or glass coated with a metal film, that is capable of reflecting sufficient undiffused light to form an image of an object placed in front of it.

The term "modem" as is used herein means a device or program that enables a computer to transmit data over, for example, telephone or cable lines. Computer information is generally stored digitally, whereas information transmitted over telephone lines is transmitted in the form of analog waves, and a modem may convert between these two forms.

The phrase "native software" as is used herein means software that generally is specifically written, compiled and/or or assembled to run on a particular system. Native code generally uses all of the individual features of the target system with no regard for generality or portability.

The term "network" as is used herein means two or more computers that are connected together in a manner that they can exchange information. Connecting two or more computers together can significantly increase the functions, and amount of functions, that can be performed by the computers. If a network includes a printer (or one or more other peripherals), any computer that is connected to the network can print a document on that printer (or communicate with the other peripherals). Networks may include point-to-point connections between computers, a local-area network (LAN) (designed to connect a relatively small number of computers that span short distances, such as all of the computers within one building), a wide-area network (WAN) (designed to connect two or more LANs, often across long distances) and the Internet (a WAN that spans the world).

The phrase ".NET Compact Framework" as is used herein means an environment that is generally hardware-independent, and supports building and/or running managed applications on resource-constrained computing devices. In such an environment, managed applications may run on devices. It provides access to the underlying features of the device, and the applications and components can interact on the device and/or over the Internet. Generally, every .NET Compact Framework application runs inside in a runtime construct (an application domain), which is similar to an operating system process. The .NET Compact Framework can ensures that all managed resources used by a running application are freed and/or returned to a host operating system when an application ends. Application domains offer many of the advantages of processes, such as fault isolation, improved robustness and security, but without requiring support from the underlying host operating system. An application domain host generally starts an instance of the common language runtime, and is itself native operating system code. The common language runtime can be statically or dynamically linked to the application domain host. The .NET Compact Framework does not place restrictions on the behavior of the application domain host, and the application domain host can be a simple extension to an existing interactive shell that is used to start and stop programs. On dynamic application systems like Windows, the application domain host can be an extension to the application loader, so that .NET Compact Framework applications can be started and stopped using the same mechanism as a native application.

The phrase "NET Framework" as is used herein means a software framework that can be installed on computers running Microsoft Windows operating systems. It generally includes a large library of coded solutions to common programming problems and a virtual machine that that manages the execution of programs written specifically for the framework. The .NET Framework is a Microsoft Corporation (Redmond, Wash.) offering, and is intended to be used by most new applications created for the Windows platform. The framework's Base Class library provides a large range of features including user interface, data and data access, database connectivity, cryptography, web application, development, numeric algorithms and network communications. The class library is generally used by programmers, who typically combine it with their own code to produce applications. Programs written for the .NET Framework generally execute in a software environment that manages the program's runtime requirements. Also part of the .NET Framework, this runtime environment is known as the Common Language Runtime (CLR), which provides an appearance of an application virtual machine, so that programmers need not consider the capabilities of the specific CPU that will execute the program. The CLR also provides other desirable services such as security, memory management and exception handling. The class library and the CLR together constitute the .NET Framework. Version 3.0 of the .NET Framework is included with Windows Server 2008 and Windows Vista. The current version of the framework can also be installed on Windows XP and the Windows Server 2003 family of operating systems. A reduced version of the .NET Framework, the .NET Compact Framework, is also available on Windows Mobile platforms. Version 4.0 of the framework was released as a public Beta in 2009.

The phrase "NET Framework 3.5" as is used herein refers to a redistributable package that builds on new features added in the .NET Framework version 3.0 program, for example, feature sets in Windows Workflow Foundation, Windows Communication Foundation, Windows Presentation Foundation and Windows CardSpace. (The .NET Framework version 3.0 redistributable package installs the common language runtime and associated files that are required to run applications that are developed to target the .NET Framework 3.0.) In addition, it contains the following features:

Deep integration of Language Integrated Query (LINQ) and data awareness.

(This feature permits code to be written in LINQ-enabled languages to filter, enumerate and create projections of several types of SQL data, collections, XML, and DataSets by using the same syntax.)

ASP.NET AJAX permits a computer operator to create more efficient, more interactive, and highly-personalized Web experiences that generally work across all of the most popular browsers.

New Web protocol support for building WCF services including AJAX, JSON, REST, POX, RSS, ATOM, and several other WS standards.

Full tooling support in Visual Studio 2008 for WF, WCF and WPF, including the new workflow-enabled services technology.

The term "network file system" as is used herein means any computer file system that permits and/or supports a sharing of files, printers and/or other resources, generally as persistent storage over a computer network including, but not limited to, Network File System, Andrew File System. Apple Filing Protocol, NetWare Core Protocol, and Server Message Block, which is also known as Common Internet File System.

The phrase "non-laser" as is used herein in connection with the systems and methods of the invention means that a successful operation of such systems and methods is not based upon, or a result of, a use of laser technology. However, one or more laser technologies may, optionally, be added to the systems and methods of the invention.

The term "object" as is used herein means an item, a thing, a device, an apparatus, an instrument, a machine, a manufacture, an assembly, a sub-assembly or the like. An object may be capable of being assembled or otherwise manufactured or produced from a plurality of component (or other) parts, including skins, such as an airplane, a jet, a helicopter, a submarine, a boat, an automobile, a truck, a trailer, a camper, a tank (or other military vehicle), a missile (or other weapon), or the like, or a component (or other) part thereof, such as a vertical tail or wing for an aircraft, a door for an automobile or a hull for a boat.

The term "online" as is used herein means turned on and/or connected. For example, printers are online when they are ready to receive data from a computer. In contrast, when a printer is offline (not turned on and/or connected), certain tasks, such as advancing paper, may be performed, but data cannot be sent to the printer. Also, computer operators are generally considered to be online when they are connected to a computer service through a modem.

The phrase "OpenGL" as is used herein means OPEN Graphics Language, a three-dimensional graphics language. It was developed by Silicon Graphics International (SGI) (Fremont, Calif.), and has become a standard supported in Unix, Windows and Macintosh computers. OpenGL can be implemented as an extension to an operating system or to a windowing system such as X Window. Many three-dimensional display adapters include OpenGL drivers. OpenGL and Direct3D (Microsoft Corporation's DirectX) are presently the major three-dimensional graphics languages in use.

The phrase "operably connected with" as is used herein in connection with a plurality of instruments or devices, such as one or more computers and one or more optical projectors, or a one or more computers and one or more peripheral devices, means that the instruments or devices are connected with each other, usually by one or more communication cables inserted into one or more ports present on the instruments or devices or wirelessly (using, for example, Wi-Fi, Bluetooth, 4610X and/or the like) in a manner that information (including data) may be transferred from one instrument or device to the other, or vice versa, or between the devices or instruments.

The phrase "operating system" as is used herein means software that generally communicates with computer hardware on a most basic level, and is the main software of a computer. Without an operating system, generally no software programs can run. The operating system generally allocates memory, processes tasks, accesses disks and peripherals, and/or serves as the user interface. For example, it provides a user interface that allows a user to interact with the machine, such as clicking on an icon to delete a file. It also manages computer resources such as the CPU and main memory. It generally decides when programs can run, where they are loaded into memory, and how hardware devices communicate. As a result of operating systems such as Windows, Mac OS and Linux, programmers can write code using a standard programming interface, or Application Program Interface. Without an operating system, programmers would often need to write about ten times as much code to get the same results. Other known operating systems include Windows 98, Windows NT, Windows 2000. Windows Server 2003, Windows Server 2008, Windows Vista, Windows XP and Windows 7.

The terms "optically" and "optical" as are used herein mean a projection of material, such as text, images and/or symbols, using a typically high intensity light bulb and a known and specially-shaped glass lens, so that when light is passed through, or on, the material, and through the lens, the material generally becomes much larger than the original on the surface or object that the projector is pointing at. Generally, one hundred percent of the material being projected is illuminated 100% of the time by the bulb when the full material is placed in front of the bulb and the entire image is continuously displayed. (In contrast, with a laser, the laser beam only displays a very small portion of the projected projection at any given point in time and moves, or sweeps, in order to project each individual point in the projected image. This results in flickering as the amount of points being displayed with a laser increases in number.)

The terms "ordered" and "sequenced" as are used herein in connection with a plurality of process steps being employed to assemble or otherwise manufacture a three-dimensional object, or part, or to perform a different process, means that the process steps occur in an appropriate, logical, methodical, prescribed and/or required arrangement and/or sequence, generally from start to finish in a step-by-step manner, for example, with respect to a particular three-dimensional object, or part, being assembled or otherwise manufactured, and the component parts thereof, such that a proper, desired and/or required appearance and/or function of the object, or part, are achieved, which may vary widely depending upon the particular object, or part, being assembled or manufactured (or otherwise being processed in some manner), and may be determined by those having ordinary skill in the art using the detailed information that is provided herein.

The phrase "other desired characteristics" as is used herein in connection with Annotated Geometry data means any other characteristics of the Annotated Geometry data that could be organized by a user of the systems and/or methods of the invention, and that would be suitable or desirable for the user, such as hole diameter, line width, minimum conductivity, minimum and/or maximum thickness, maximum step height, and/or the like.

The terms "peripheral" and "peripheral device" as are used herein means any external, internal and/or other device that generally is not part of the essential computer (the memory and microprocessor) and provides input and/or output in connection with a computer. For example, a keyboard, a mouse and a CD-ROM drive are input peripherals, while a monitor, a printer and a projector are output peripherals. Peripheral devices typically operate at the periphery, or outer edges, of a system, and can be external, such as a mouse, keyboard, printer, monitor, external Zip drive, scanner, CD-R drive, audio speaker, touch screen, plotter or goggle, or internal, such as a CD-ROM drive, CD-R drive or internal modem. Some peripherals, such as external hard drives, provide both input and output for the computer.

The term "phase" as is used herein in connection with an oscillation or wave is the fraction of a complete cycle corresponding to an offset in the displacement from a specified reference point at time t=0. Phase is a frequency domain concept, and as such, can be readily understood in terms of simple harmonic motion. The same concept applies to wave motion, viewed either at a point in space over an interval of time or across an interval of space at a moment in time.

The term "plurality" as is used herein means more than one, for example, two, three, four, five, six, seven, eight, nine, ten, eleven, twelve, thirteen, fourteen, fifteen, twenty, twenty-five, thirty, thirty-five, forty, forty-five, fifty, seventy-five, one hundred, two hundred, three hundred, four hundred, and so forth.

The term "polarization" as is used herein means a property of waves, such as light, that describes the orientation of their oscillations. By convention, the polarization of light is described by specifying the direction of the wave's electric field. When light travels in free space, in most cases it propagates as a transverse wave (i.e., the polarization is perpendicular to the wave's direction of travel). In this case, the electric field may be oriented in a single direction (linear polarization), or it may rotate as the wave travels (circular or elliptical polarization). In the latter cases, the oscillations can rotate rightward or leftward in the direction of travel, and which of those two rotations is present in a wave is known as the wave's chirality or handedness.

The term "photon" as is used herein means an elementary particle, the quantum of the electromagnetic field, and the basic "unit" of light and all other forms of electromagnetic radiation. It is also the force carrier for the electromagnetic force. Photons are governed by quantum mechanics and will exhibit wave-particle duality (i.e., they exhibit properties of both waves and particles). For example, a single photon may be refracted by a lens or exhibit wave interference, but also act as a particle giving a definite result when quantitative mass is measured.

The terms "processor," "microprocessor," "CPU" and "Central Processing Unit" as are used herein mean the logic circuitry of a computer, which responds to, and processes, the basic instructions that drive a computer, which are generally provided by one or a plurality of computer programs. The processor is on a chip (a microprocessor), a part of the main circuit board of a computer.

The term "project" as is used herein means to cause one or more text, images, symbols and/or the like, such as words, instructions and/or the like, to appear on a surface, such as a surface of a three-dimensional object, or part, or to cast or extend forward out into space, such as a room, for example, a beam of light.

The term "projector" as is used herein means a device, apparatus, instrument or the like that is capable of projecting, for example, displaying, one or more text, images, symbols and/or the like, or a combination thereof, such as words, instructions and/or the like, onto one or a plurality of surfaces, objects and/or parts, such as a surface of a three-dimensional object, which preferably may be viewed by one or more individuals and/or entities. Projectors typically includes a lighting unit that concentrates light within a limited solid angle by means of one or more mirrors and lenses, and provides a high value of luminous intensity in one direction. A wide variety of projectors are commercially available from sources that are known by those having ordinary skill in the art, including, but not limited to, LCD projectors, CRT projectors, DLP projectors, LCOS projectors, stationary projectors, transportable projectors, handheld projectors, and the like.

The term "protocol" as is used herein means a set of rules about the manner in which two or more things communicate.

The term "RAM" as is used herein means random access memory, a type of computer memory that can generally be accessed randomly, that is, generally any byte of memory can be accessed without touching the preceding bytes. RAM is the most common type of memory found in computers and other devices, such as printers. It also refers to main memory, the memory available to computer programs. For example, a computer with 8 MB RAM has approximately 8 million bytes of memory that programs can use. A typical computer may come with 256 million bytes of RAM, and a hard disk that can hold 40 billion bytes. RAM generally comes in the form of "discrete" (separate) microchips, and also in the form of one or more modules that may plug into holes in a computer's motherboard. These holes connect through a bus or set of electrical paths to the processor. The hard drive, on the other hand, stores data on a magnetized surface that looks like a phonograph record. Most personal computers are designed to allow a user to add additional RAM modules up to a certain limit. Having more RAM in a computer generally reduces the number of times that the computer processor has to read data in from a hard disk, an operation that generally takes much longer than reading data from RAM.

The terms "run" and "execute" as are used herein mean to perform an action, a command, an instruction and/or the like, or to be in partial or full operation (typically in full operation), for example, computer software that runs on a computer, or a computer software program that is executed.

The phrase "run time" as is used herein refers to the actual execution of a program. "At runtime" means while a program is running.

The term "scanner" as is used herein means an input device that converts text, photographs and/or graphics into machine readable form.

The terms "screen" and "screen shot" as are used herein mean a picture or illustration of that which is displayed on a computer, projector, monitor, other screen and/or the like.

The term "server" as is used herein means a computer or device on a network that manages network resources (generally any item that can be used). For example, a file server is a computer and storage device that is dedicated to storing files. Any user on the network can store files on the server. A print server is a computer that manages one or more printers, and a network server is a computer that manages network traffic. A database server is a computer system that processes database queries (requests for information from a database). Servers are often dedicated, meaning that they perform no other tasks besides their server tasks. On multiprocessing operating systems, a single computer can execute several programs at once. A server in this case could refer to the program that is managing resources rather than the entire computer.

The phrase "service pack" or "patch" as are used herein means an orderable, downloadable or other update or enhancement to a software that typically corrects one or more existing problems and, in some cases, delivers or provides product enhancements. A service pack is typically a collection of updates and fixes for an operating system or a software program. Many of these patches are often released before the larger service pack, but the service pack generally allows for an easy, single installation. Service packs also often include new features in addition to fixes. IBM and Microsoft are examples of companies that use these term to describe their periodic product updates. When a new product version comes out, it usually incorporates the fixes from the service packs that have been shipped to update the previous product version. A wide variety of service packs are commercially available from sources that are known by those having ordinary skill in the art, such as IBM Corporation (Armonk, N.Y.) and Microsoft Corporation (Redmond, Wash.).

The term "skin" as is used herein refers to an exterior surface, sheathing, casing and/or the like of an object, part, structure, assembly, sub-assembly, person, animal, place, or any combination thereof, or the like. The skin of an object typically can either be: (i) load-bearing (i.e., it provides at least some structural support for the object, such that the object would possibly fall apart, or not be structurally sound, if the skin were removed); or (ii) non-load-bearing (i.e., the object would typically remain intact, and would not fall apart, if the skin was removed therefrom). Typically, the skin of an object is the visible exterior surface of the object that has an exterior finish applied to it. Skin can also serve to provide a smooth surface that greatly reduces drag on an object, such as the skin of an aircraft, automobile, truck, ship or boat.

The phrases "software application" and "application software" as are used herein mean a computer software that is designed to help a user perform a particular task and include, for example, word processors, spreadsheets, media players, database applications and/or the other tasks that are described herein, or any combination thereof. An application can typically manipulate text, numbers, graphics, or a combination of these elements. An application suite generally comprises multiple applications bundled together. They usually have related functions, features and/or user interfaces, and may be able to interact with each other, e.g. open each other's files. Business applications often come in suites, e.g. Microsoft Office, OpenOffice dot org and iWork, which bundle together a word processor, a spreadsheet, and the like. Suites also exist for other purposes, such as graphics and/or music. Enterprise software addresses the needs of organization processes and data flow, often in a large distributed environment. Examples include Financial, Customer Relationship Management, and Supply Chain Management. Departmental Software is a sub-type of Enterprise Software, with a focus on smaller organizations or groups within a large organization. Examples include Travel Expense Management, and IT Helpdesk. Enterprise infrastructure software provides common capabilities needed to support Enterprise Software systems. Examples include Databases, Email servers, and Network and Security Management. Information worker software addresses the needs of individuals to create and manage information, often for individual projects within a department, in contrast to enterprise management. Examples include time management, resource management, documentation tools, analytical, and collaborative. Word processors, spreadsheets, email and blog clients, personal information system, and individual media editors may aid in multiple information worker tasks. Content access software is software that is used primarily to access content without editing, but may include software that allows for content editing. Such software addresses the needs of individuals and groups to consume digital entertainment and published digital content. Examples include Media Players, Web Browsers and Help browsers. Educational software is related to content access software, but has the content and/or features adapted for use in by educators. For example, it may track progress through material or include collaborative capabilities. Simulation software are for simulation of physical or abstract systems for either research, training or other purposes. Media development software addresses the needs of individuals who generate print and electronic media for others to consume, most often in a commercial or educational setting. This includes Graphic Art software, Desktop Publishing software, Multimedia Development software, HTML editors, Digital Animation editors, Digital Audio and Video composition, and many others. 3D computer graphics software refers to programs that are used to create 3D computer-generated test, imagery, symbols and/or the like. 3D modelers typically allow users to create and alter models via their 3D mesh. Users can generally add, subtract, stretch and/or otherwise change the mesh to their desire, and models can be viewed from a variety of angles, usually simultaneously, and rotated, with the view being capable of being zoomed in and out. Product engineering software is used in developing hardware and software products. This includes computer aided design (CAD), computer aided engineering (CAE), computer language editing and compiling tools, Integrated Development Environments, and Application Programmer Interfaces. Additional information about software applications is present in Paul E. Ceruzzi, *A History of Modern Computing* (MIT Press., 1998) and Kelly Martin Campbell, *Computer: A History of the Information Machine*, (Basic Books, 1996).

The term "software development kit" as is used herein means a kit including one or a plurality of software programs that function to facilitate one or more functions and/or activities of a device, such as a digital and/or video camera, often when associated or operably connected with a computer, including, but not limited to sensory optics, interface mechanisms, image acquisition, image processing and/or camera and device control. A wide variety of software development kits, such as FlyCapture 2.0, Beta 06, Censys3D, Ladybug, Triclops, Digiclops and Compass3D software development kits, are commercially available from sources that are known by those having ordinary skill in the art, for example, Point Grey Research, Inc. (Richmond, BC, Canada) and other camera manufacturers and/or distributors.

The term "SolidWorks" as is used herein refers to a commercially available 3D mechanical CAD program that can run on Microsoft Windows. It was developed by Dassault Systèmes SolidWorks Corp. (Concord, Calif.).

The phrase "source code" (commonly just source or code) as is used herein means any collection of statements, declarations or instructions written in some human-readable computer programming language. Such programming languages are known by those having ordinary skill in the art and include, but are not limited to, C#, C++, Java and other programming languages that are described herein. Source code is the mechanism that is typically most often used by programmers to specify the actions to be performed by a computer. The source code which constitutes a program is usually held in one or a plurality of text files (ending in .txt), or other files, for example, C# files (ending in .cs), sometimes stored in databases as stored procedures, and may also appear as code snippets printed in books and/or other media. A large collection of source code files may be organized into a directory tree, in which case it may also be known as a source tree. A computer program's source code if often the collection of files that is typically needed to convert from human-readable form to some kind of computer-executable form. The source code may be converted into an executable file by a compiler, or executed on the fly from the human readable form with the aid of an interpreter, or the like.

The term "spot" as is used herein refers to a relatively small mark or image that may be placed or displayed on a three-dimensional object, for example, one that is being assembled, manufactured or otherwise processed, or part, surface or skin thereof, or on some other surface, skin or part, and that is partially or fully distinguishable in, for example, color, size, shape, outline, filling, brightness and/or the like from the three-dimensional object, or part, surface, or skin, or items or projections appearing thereon. A spot may be present in a wide variety of different colors, patterns, sizes, brightness and/or configurations, such as an outline of, or a filled in, circle, oval, triangle, square, rectangle, polygon (pentagon, hexagon, octagon, and so forth) and/or the like. In the systems and methods of the invention, a type of spot that is employed may be dictated by a user by, for example, using the Authoring Assembly Tool Software, and the spot may be projected, for example, on a three-dimensional object, part, surface and/or skin, preferably along with some text that informs and/or shows a user the location at which to insert a nail, a screw or similar item, and/or to take some other action.

The phrase "SQL Server" as is used herein refers to software that functions to provide data management and analysis solutions that generally deliver increased security, scalability and/or availability to enterprise data and/or analytical applications, while generally making them easier to create, deploy and/or and manage. For example, building on the strengths of the Microsoft SQL Server 2000, SQL Server 2005 provides an integrated data management and analysis solution that help organizations of any size to: (i) build and deploy enterprise applications that are more secure, scalable and/or reliable; (ii) maximize the productivity of IT by reducing the complexity of creating, deploying and managing database applications; (iii) empower developers through a rich, flexible, modem development environment for creating more secure database applications; (iv) share data across multiple platforms, applications and/or devices to make it easier to connect internal and external systems; (iv) deliver robust, integrated business intelligence solutions that help drive informed business decisions and increase productivity across entire organizations; and/or (v) control costs without sacrificing performance, availability or scalability.

The phrase "SQL Server Compact 3.5" as is used herein refers to a relatively small footprint in-process database engine that allows developers to build robust applications for Windows Desktops and Mobile Devices.

The Phrase "SQL Server Compact 3.5 Design Tool" as is used herein refers to computer software that installs SQL Server Compact 3.5 (or other) design-time components with Visual Studio 2008 (or other programs), such as the user interface, dialog boxes and design-time environment. It may be used to write applications for SQL Server Compact 3.5. The SQL Server Compact 3.5 design-time components generally include design-time environment dialogs under the Server Explorer to design applications that use SQL Server Compact 3.5 (or other programs).

The Phrase "SQL Server Compact 3.5 ENU" as is used herein refers to computer software that permits a computer operator or programmer to create compact databases that can be deployed on desktop computers, smart devices and/or Tablet PCs. When applications are built using such software, one of the .NET programming languages (Microsoft Visual Basic or Microsoft Visual C#) and a .NET Framework or .NET Compact Framework may be employed to create a managed application. Alternatively, Visual C# or Visual C++ may be employed for devices to create a native application.

The phrase "SQL Server Database Publishing Wizard" as is used herein refers to a program that enables a deployment of SQL (or other) Server databases into a hosted environment on, for example, a SQL Server 2000 or 2005 server. It can generate an SQL script file that can be used to recreate a database (both schema and data) in a shared hosting environment where the only connectivity to a server is through a web-based control panel with a script execution window. If supported by a hosting service provider, it can also directly upload databases to servers located at the shared hosting provider. Optionally, it can integrate directly into Visual Studio 2005 and/or Visual Web Developer 2005 (and other programs) allowing easy publishing of databases from within a development environment.

The phrase "SQL Server Native Client" as is used herein refers to computer software that contains the SQL OLE DB provider and SQL ODBC driver in one native dynamic link library (DLL) supporting applications using native-code APIs (ODBC, OLE DB and ADO) to Microsoft SQL Server. It can be used to create new applications or enhance existing applications that need to take advantage of SQL Server features, such as Multiple Active Result Sets (MARS), Query Notifications, User-Defined Types (UDT) and/or XML data type support.

The phrase "SQL Server Setup" as is used herein refers to a computer program that installs the following software components: (i).NET Framework 3.5 SP1; (ii) SQL Server Native Client; and (iii) SQL Server Setup support files.

Figure 3:
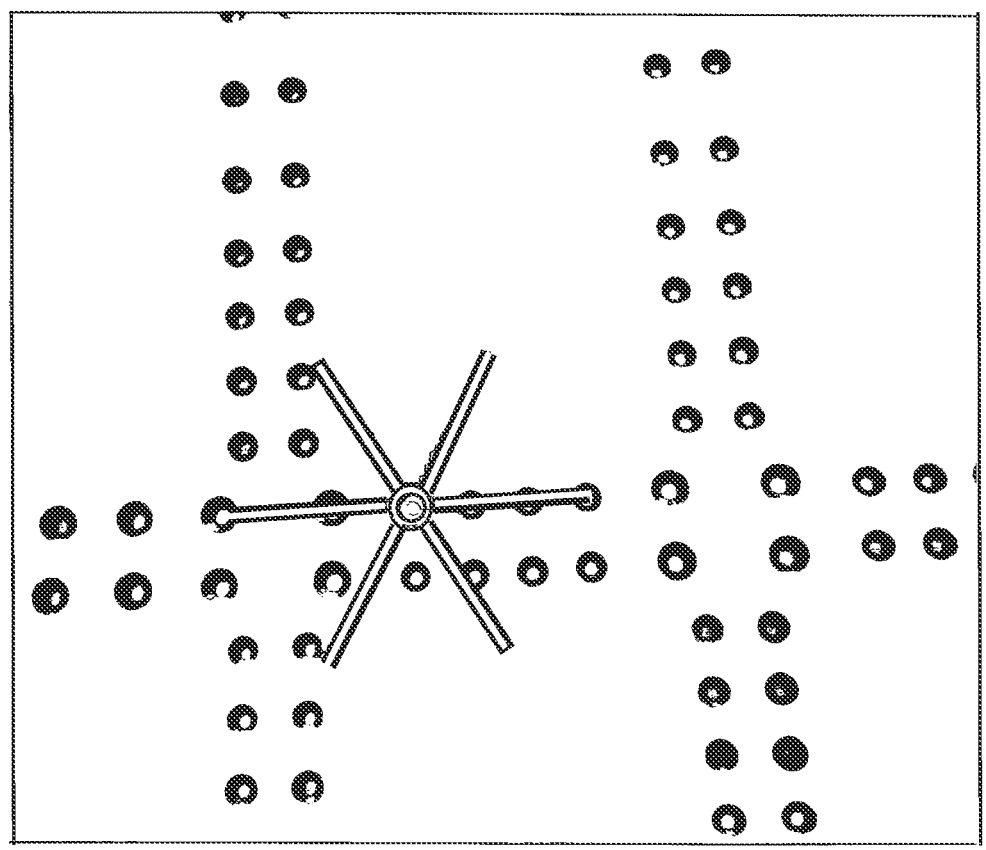
FIG. 3 is a photograph of a starburst pattern that is projected by an optical projector employed in the systems and methods of the invention onto a pre-drilled hole to be measured (its depth) that is present in a three-dimensional object that is being manufactured.

The phrase "starburst pattern" as is used herein refers to a pattern that may be displayed on a three-dimensional object, part, surface, skin and/or the like, and that has some characteristics of a star. It can be, for example, projected by an optical projector onto a three-dimensional object, or part, that is being assembled or otherwise manufactured, for example, when a measurement of a pre-drilled hole present therein is being made, or when some other measurement is being made. One such pattern is shown in FIG. 3.

The phrase "stereolithograph" as is used herein means an additive manufacturing process for producing models, prototypes, patterns and/or production parts. It uses liquid UV-curable photopolymer resin and a UV laser to build parts a layer at a time. On each layer, a laser beam typically traces a part cross-section pattern on the surface of the liquid resin. Exposure to the UV laser light generally cures or solidifies the pattern traced on the resin and adheres it to the layer below. After a pattern has been traced, the stereolithograph's elevator platform may descend by a single layer thickness, typically from about 0.05 mm to about 0.15 mm (0.002" to 0.006"). Then, a resin-filled blade generally sweeps across the part cross section, re-coating it with fresh material. On this new liquid surface, the subsequent layer pattern may be traced, adhering to the previous layer. A 3-dimensional part may be formed by this process.

The phrases "stereo lithography format" and "STL" as are used herein mean a file format native to the stereolithography CAD software created by 3D Systems (Rock Hill, S.C.). This file format is typically supported by many other software packages, and may be employed for prototyping and/or computer-aided manufacturing. STL files typically describe only the surface geometry of a three-dimensional object without any representation of color, texture or other common CAD model attributes. The STL format generally specifies both ASII and binary representations. An STL file can describe a raw unstructured triangulated surface by the unit normal and vertices (ordered by the right-hand rule) of the triangles using a three-dimensional Cartesian coordinate system.

The phrase "stimulated emission" as is used herein in connection with lasers means a process by which an electron, perturbed by a photon having the correct energy, may drop to a lower energy level resulting in the creation of another photon. The perturbing photon is seemingly unchanged in the process, and the second photon is created with the same phase, frequency, polarization and direction of travel as the original. If the resultant photons are reflected so that they traverse the same atoms or gain medium repeatedly, a cascade effect is produced.

The word "subroutine" or "subprogram" as are used herein mean a portion of code within a larger program, which generally performs a specific task, and is relatively independent of the remaining code. A subroutine generally behaves in much the same way as a computer program that is used as one step in a larger program or another subprogram. It is often coded so that it can be started ("called") several times and/or from several places during a single execution of the program, including from other subroutines, and then branch back (return) to the next instruction after the "call" once the subroutine's task is done. Subroutines are a programming tool, and the syntax of many programming languages includes support for writing and using them. Judicious use of subroutines (for example, through the structured programming approach) often substantially reduces the cost of developing and maintaining a large program, while increasing its quality and reliability. Subroutines, often collected into libraries, are an important mechanism for sharing and trading software.

The term "substantially" as is used herein means almost or in an extensive, considerable, or ample way, and may be determined by those having ordinary skill in the art.

The term "suitable" as is used herein means satisfactory, operable or capable of producing a desired result.

The term "symbol" as is used herein means a shape or the like, including, but not limited to, a square, a rectangle, a pentagon, a hexagon, an octagon, another polygon, a circle, an oval, a triangle, a point, a curvilinear or straight line, punctuation (period, comma, semi-colon, colon, hyphen, dollar sign, percent sign, asterisk, parentheses, and/or the like) and/or the like. It, as well as text and images, typically can be any color between, and including, black and white on the color scale, and can either be drawn unfilled (outlined in that color) or filled (filled with one or more colors, patterns and/or the like).

The term "system software" as is used herein means software that is involved in integrating a computer's various capabilities, but typically does not directly apply them in the performance of tasks that benefit the user, such as an operating system.

The phrase "Tao Framework" as is used herein means a C#library giving .NET and Mono developers (and others) access to popular graphics and/or gaming libraries, like OpenGL and SDL. It was originally developed by the C# OpenGL programmer, and since its start many developers have contributed to the project. The latest version of Tao is version 2.1 released on May 1, 2008. Additional information about Tao Framework is present on the web site tao framework dot com.

The phrase "text" as is used herein mean letters, numbers, symbols (plus signs, minus signs and/or the like), words, instructions, directions and/or the like.

The phrases "three-dimensional" and "3D" as are used herein mean having three or more dimensions. Three-dimensional objects generally have, or appear to have, extension in depth, and have height, width and depth.

The phrases "two-dimensional" and "2D" as are used herein mean having two dimensions. Two-dimensional objects do not have, or appear to have, extension in depth, and have height and width, but not depth.

The term "undistorted" as is used herein means that projected text, graphics, symbols and/or the like as viewed by the average human eye appear in a same or similar manner when projected onto objects with three-dimensional features and/or shapes as they would appear if projected onto a two-dimensional object, such as a flat screen or wall.

The term "viewer" as is used herein means a program that generally displays the contents of an electronic (digital) file. Viewers may generally be stand-alone programs or components within a larger program. They are widely used to display images downloaded from online services and the Internet. Viewers for sound and video files are also available. A viewer typically displays or plays one type of file, whereas a file viewer is a program that supports many different formats.

The phrases "video card" and "video adaptor" as are used herein mean a display adapter, such as a printed circuit or other board that plugs (or may otherwise be inserted) into a computer to generate images for a computer's screen (i.e., to give it display capabilities). Many different types of video adapters are available for computers, most of which conform to one of the video standards defined by IBM or VESA. Each adapter usually offers several different video modes, such as text and graphics. In text mode, a monitor can generally display only ASCII characters, whereas in a graphics mode, a monitor can display any bit-mapped image. Modern video adapters contain memory, so that the computer's RAM is not used for storing displays. In addition, most adapters have their own graphics coprocessor for performing graphics calculations.

The phrase "video signals" as are used herein in connection with text, images, symbols and/or the like are the data definition of the of text, images, symbols, or a combination thereof, including, for example, color, hue, saturation, and all other visual characteristics of the text, images, symbols, or a combination thereof, as well as the data that describes the physical characteristics of the text, images, symbols, or a combination thereof, such as size, shape, location, and the like. This data is in a format that is understandable by the computer monitor(s) and/or optical projector(s), so that the computer monitor(s) and/or optical projector(s) can display it.

The terms "virus" and "computer virus" as are used herein mean a computer program that generally can copy itself and/or infect a computer. Generally, a virus spreads from one computer to another (in some form of executable code) when its host is taken to the target computer; for instance because a user sent it over a network or the Internet, or carried it on a removable medium such as a floppy disk, CD. DVD or USB drive. Viruses can increase their chances of spreading to other computers by infecting files on a network file system or a file system that is accessed by another computer. The term "computer virus" may also mean all types of malware (computer viruses, worms, trojan horses, most rootkits, spyware, dishonest adware, crimeware, and other malicious and unwanted software, including true viruses). A worm can exploit security vulnerabilities to spread itself to other computers without needing to be transferred as part of a host, and a Trojan horse is a program that appears harmless but has a hidden agenda. Worms and Trojans, like viruses, may cause harm to either a computer system's hosted data, functional performance and/or networking throughput, when they are executed. Some viruses and other malware have symptoms noticeable to the computer user, but many are surreptitious. Additional information regarding computer viruses is present in Deborah Russell et al., *Computer Science Basics* (O'Reilly, ISBN 0937175714).

The phrases "Visual Studio" and "VS" as are used herein refer to a suite of programming languages and development tools that are designed to help software developers create innovative, next-generation applications, and are commercially available from known sources, for example, from Microsoft Corporation (Redmond, Wash.). This language product includes, for example, Visual Basic, Visual C++, Visual C#, Visual FoxPro, Visual J++ and Visual InterDev. The Visual Studio development system is a comprehensive suite of tools. Its features may include: (i) leveraging of local storage and local resources, such as peripherals, for high-performance and occasionally-connected applications; (ii) through LINQ, performing query, set, and transform operations using familiar object-oriented languages, such as Visual C# and Visual Basic; (iii) creating client applications that utilize Web services or offline tools that are complementary to Web-based applications; (iv) providing, via a .NET Framework, a wide variety of pre-built services that aid a computer operator in working more efficiently. (v) enhancing efficiency by providing inline code guidance right in the editor (without paging back and forth to documentation); (vi) collaborating more effectively and efficiently with designers through integration between Visual Studio and Microsoft Expression; and (vi) using integrated debugging and static code analysis to improve quality early and often.

The abbreviation "VSTO" as is used herein refers to Visual Studio Tools for Office, which are commercially available from Microsoft Corporation (Redmond, Wash.).

The term "wave" as is used herein means a disturbance that propagates through space and time, usually with transference of energy. Waves travel and transfer energy from one point to another, often with no permanent displacement of the particles of the medium (that is, with little or no associated mass transport); they consist instead of oscillations or vibrations around almost fixed locations.

The term "wavelength" ($\lambda$) as is used herein in connection with a sinusoidal wave:

$$y(t)=A\cdot\sin(\omega t+\theta)$$

means is the spatial period of the wave (the distance over which the wave's shape repeats). It is usually determined by considering the distance between consecutive corresponding points of the same phase, such as crests, troughs, or zero crossings, and is a characteristic of both traveling waves and standing waves, as well as other spatial wave patterns. Assuming a sinusoidal wave moving at a fixed wave speed, wavelength is inversely proportional to frequency: waves with higher frequencies have shorter wavelengths, and lower frequencies have longer wavelengths. Light is one example of wave-like phenomena, and in light and other electromagnetic radiation, the strength of the electric and magnetic field vary. Wavelength is a measure of the distance between repetitions of a shape feature such as peaks, valleys, or zero-crossings, not a measure of how far any given particle moves.

The terms "web" and "World Wide Web" as are used herein mean a system of Internet servers that generally support specially formatted documents. The documents are generally formatted in a markup language (HTML or HyperText Markup Language) that supports links to other documents, as well as graphics, audio and/or video files. Generally, one may move from one document to another by clicking on hot spots. Not all Internet servers are part of the World Wide Web, and there are several applications (Web browsers) that make it easy to access the World Wide Web, two of which are Netscape Navigator and Microsoft's Internet Explorer.

The phrase "wireless USB adaptor" as is used herein means a network adapter (a network or communications controller) that plugs into a computer via a USB port.

General Description and Utility

The present invention is directed to pioneering and very advantageous computerized optical systems for the projection of three-dimensional text, images and/or symbols in a substantially or fully undistorted manner onto one or a plurality of surfaces of a variety of different three-dimensional objects, or parts thereof.

In one embodiment (out of many), the present invention provides unique, very rapid, efficient, substantially or fully error-free and successful systems and methods for assembling or otherwise manufacturing any type of a three-dimensional object (or part thereof), including those that are relatively or very complex, such as an aircraft, a submarine, a helicopter, a missile, a tank, a military vehicle, an automobile, or the like.

In this embodiment, the systems of the invention significantly facilitate an assembly or other manufacture process, for example, on an assembly line or in a production facility, by providing ordered step-by-step assembly or manufacturing guidance work instructions that teach or guide one or a plurality of person or entities that are to assemble or manufacture any three-dimensional object or system, or component part, surface or skin thereof (hereinafter collectively referred to as "object"), which may be relatively or very complex, the manner in which object may properly be assembled or manufactured step by step with a series of ordered steps, generally in the "best" manner. For example, a set of assembly instructions may direct that the following steps be performed in the order listed: (i) remove a panel from an object; (ii) remove a clamp from the object; (iii) measure a depth of a series of pre-drilled holes; (iv) insert a series of different sized and types of fasteners into the pre-drilled holes; (v) remove a bolt from the object (before sliding an engine in); (vi) sliding an engine in; (vii) putting the clamp back onto the object; and (viii) put the panel back on the object.

Using the systems and methods of the invention to optically project any text, images and/or symbols onto any three-dimensional objects, parts, or skins, or even onto people, animals or locations, three-dimensional geometric data can be created in, or imported into, one or a plurality of computers using a software program, such as Catia. SolidWorks, Word, or the source code provided herein, or the like. A drawing can then be created on the computer(s) (in a wide variety of different colors, patterns, shapes, and/or the like, such as lines, squares, triangles, rectangles, circles, ovals, polygons, trapezoids and the like). The systems will accept as input the output files from most three-dimensional CAD (or other) programs. The drawing can then be incorporated into the imported three-dimensional geometric data, and the resulting product (text, images, symbols and/or the like, for example, that provide process instructions, such as assembly or manufacturing instructions) can then be optically projected onto any three-dimensional object to be assembled or manufactured, or otherwise, using three-dimensional optical projection. Such process instructions can be fully implemented on a computer (or other) screen before the images are ever projected onto the three-dimensional object. Process steps (text), other text, images of object component parts (or of the object itself), symbols and/or the like, are optically projected by one or a plurality of optical projectors as three-dimensional text, images and/or symbols that are displayed directly onto the three-dimensional object, or part of skin, for example, in an assembly process, at a location at which an attachment of two or more component parts is to be made (by bolting, fastening, gluing and/or the like). The projected material has an ability to wrap around the three-dimensional object, part or skin, for example, that is being assembled, manufactured or otherwise processed, permitting one or a plurality of assembly workers, manufacturing technicians and/or other system users to assemble or manufacture the object, part or skin, or to carry out some other desired process, and have control over such processes. Very advantageously, text, images and/or symbols to be displayed on the three-dimensional object, part or skin may be very rapidly calibrated in a manner that they can be projected in a substantially, and usually fully, undistorted manner onto one or a plurality of surfaces of the three-dimensional object, part or skin, which may be curved, contoured, complex curved, complex and/or flat, even when the optical projector(s) employed in the systems are not perpendicular to, or straight in front of and/or centered in connection with the objects, parts or skins (as is discussed in detail hereinbelow). The three-dimensional text, images and/or symbols may be, for example, three-dimensional images of the object that is being assembled, written assembly, manufacturing and/or other process steps or instructions, symbols and/or the like. For example, written instructions that instruct individuals that are assembling the object, such as a description of which of thousands of pre-drilled holes present in a skin of the object that specified fasteners fit within, and may be used with, may be projected directly onto the object.

In a preferred embodiment of the invention, a first computer program called an "Authoring Assembly Software Tool," which may be run on the computer's operating system, such as Windows XP, allows a user to put all of the required or desired components for a particular project into a computer, with a wide variety of annotation, pictures, video, symbols, drawings, audio and/or the like without concern for the number of optical projectors and/or computers that are being employed and/or their location within a particular assembly, manufacturing, work or other area or environment. A second computer program called a "Configurator Assembly Software Tool," which may also be run on the computer's operating system, allows a user to decide where within a particular assembly, manufacturing or other work area or environment the optical projectors being employed can be located, the number of optical projectors that are required for a particular assembly, manufacture, process or situation to have a good (preferably 100%) coverage of an object, part or skin, or a portion thereof, that is being projected upon, the number of workers that may be required or desired for executing one or more concurrent processes, for example, four different assembly technicians working simultaneously on the same aircraft wing, and/or other such information. This tool creates a file that can be run by an assembly, manufacturing or other technician each time that a particular assembly, manufacture or other process is being built or carried out. A third computer program called an "Operator Assembly Software Tool," which may also be run on the computer's operating system, guides a user through a process, such as an assembly of a three-dimensional object, or part or skin, step-by-step in an ordered manner using the file created by the Configurator Assembly Software Tool along with a wide variety of optional programming aids, such as annotation, pictures, video, symbols, drawings and/or audio, to aid the workers throughout the assembly, manufacturing or other process. For example, a video tutorial may be projected by one or more optical projectors directly onto a three-dimensional object that is being worked on, or with, such as on the surfaces of a vertical stabilizer that is being manufactured.

The systems of the invention use one or more optical projectors that are operably connected with one or a plurality of computers to project text, images, symbols and/or the like in a calibrated form in a manner that they appear substantially undistorted, and typically fully undistorted, when projected by the optical projectors onto a non-flat and/or non-perpendicular three-dimensional surface, generally regardless of where the optical projectors are positioned in relation to the three-dimensional surface. A dataset for the optical projectors that is created and/or provided by a user becomes calibrated by software that is present on the computer, and the resulting calibrated dataset becomes projected onto the 3-dimensional projection surface in a manner that projected text and images appear on the surface in a manner that generally is undistorted. The position of the optical projector in space relative to a coordinate system can be determined while simultaneously calibrating the projector optics. This allows a user to project three-dimensional geometry, such as from a CAD system (CATIA, SolidWorks, or the like) directly onto complex three-dimensional surfaces, which can be of virtually any shape and/or size. The optical projection system automatically compensates and "wraps" the projected material onto the surface(s) of the three-dimensional object, or part of skin, preserving its true shape. Text, images, symbols and/or the like, and/or any other projected matter, wrap around curved, contoured, complex, slanted and/or otherwise non-flat surfaces in an undistorted manner and appear in the same manner that the would if they had been projected directly onto a flat surface.

Figure 2:
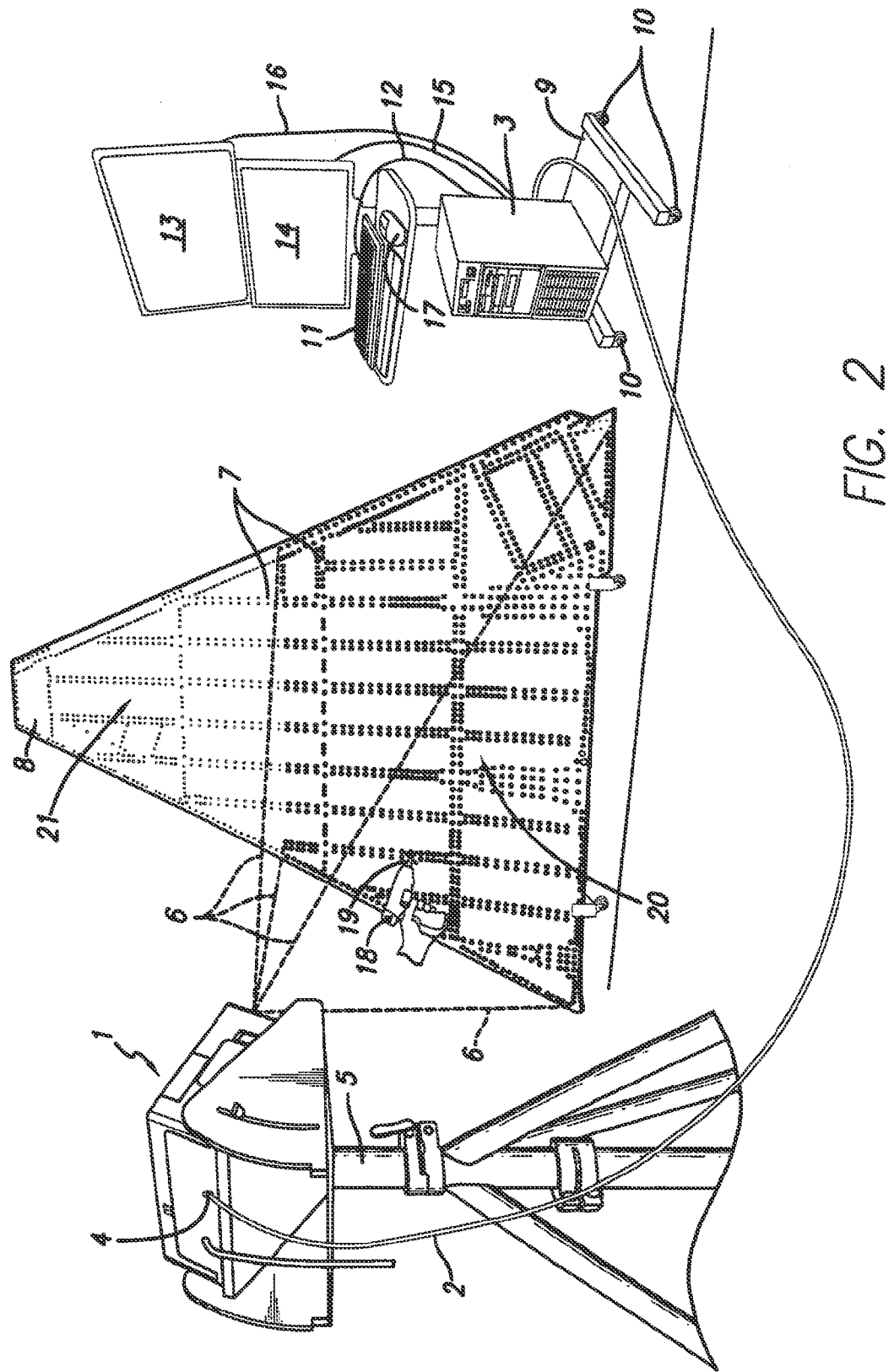
FIG. 2 is also an illustration of a preferred system of the invention, and in addition to the same features of the system that are shown in FIG. 1, shows the use of a grip gage to measure the depths of a series of pre-drilled holes that are present in the object (airplane wing) that is being manufactured.

The systems of the invention also permit users to determine and/or catalog the lengths of various fasteners that are desired or required to be inserted into or through pre-drilled holes, as is shown in FIGS. 2 and 3, in an assembly or subassembly that is being manufactured using a measurement device, such as an electronic grip gage (or similar device) that is operably connected with the computer being employed in the systems. The systems have an ability to utilize data from the various input devices, such as grip gages, depth gages, and the like, and can be used to coordinate data collection sequences, so that large data sets can be collected in one sequence, with measurement values that correlate to specific positions on a three-dimensional object, part or skin that is being assembled, manufactured, or otherwise worked with. This data is used at a subsequent time to project proper assembly, manufacturing or other instructions based on measured data.

The methods of the invention provide guidance in connection with an optical projection of three-dimensional text, images, symbols and/or the like in a substantially or fully undistorted manner onto three-dimensional objects, parts, skins or systems. In one embodiment, they also provide assembly and/or other manufacturing guidance and instructions for an assembly or other manufacture of three-dimensional objects, parts, skins and/or systems.

Three-dimensional objects that may be assembled using the systems and methods of the invention include, but are not limited to, cables, aircrafts (commercial, military, jets, props, helicopters, or the like) submarines, ships, missiles, tanks, boats, heavy machinery, earth moving equipment, automobiles, trucks, buses, trains, trailers, campers, military and other vehicles, or the like, or a part or skin thereof, such as a wing of an airplane, a tail of an airplane, an electrical panel, a control panel, a cableway and/or the like.

The systems and methods of the invention are extremely useful, among other things, for an assembly or other manufacture of objects, parts or skins that are complex, in other words, those that take a significant amount of time and/or labor to assemble or otherwise manufacture, as one example, two weeks while one technician is working on such assembly in a full-time manner, that are difficult to assemble or otherwise manufacture and/or that would normally have numerous pages of associated blueprints, plans, other assembly or manufacturing instructions and/or drawings (sometimes many hundreds, thousands, or hundreds of thousands of pages).

Advantages of Invention in Connection with Manufacturing

In addition to the advantages that have been described above, the assembly or manufacturing guidance systems and methods of the invention have numerous additional very important and significant advantages associated with them, which result in a significant increase in an efficiency of an assembly or other manufacture, and a corresponding savings of a significant amount of time, labor, paper products and money, in comparison with known methods for assembling or otherwise manufacturing three-dimensional objects, parts or skins, such as manual systems and methods, and laser systems and methods. Such advantages are also provided in connection with other uses or applications of the systems and methods of the invention.

First, such systems and methods significantly reduce, and usually completely eliminate, a need for persons or entities that are assembling or manufacturing a relatively complicated three-dimensional object, part or skin to continuously or otherwise use, and refer to, blueprints, plans, drawings and/or other paper instructions or computer displays for the assembly or manufacture, which are often several dozens, hundreds, thousands, or even hundreds of thousands of pages or screens in length (i.e., several inches thick) to learn and understand how to assemble such items. For example, a typical aircraft may have more than 100,000 pages of blueprints and/or written instructions to teach and guide an assembly technician how to assemble the aircraft (which components go where, which order of steps should be followed, how various parts are connected together and the like). In contrast, using the systems and methods of the invention, a set of step-by-step assembly or manufacturing instructions in the "best" or most logical order may be prepared very rapidly in an automated manner. This, in turn, eliminates the extensive amount of time and labor that is associated with reading, understanding and implementing the information that is present in such lengthy and complicated blueprints, drawings, plans, other paper instructions or computer displays, and the high labor fees that would be associated with paying workers or employees to carry out such tasks, renders these assembly and manufacturing processes tremendously more rapid. They tremendously reduce the labor and time required to perform an assembly or manufacturing process in comparison with assembly or manufacturing processes for assembling the same three-dimensional object, part or skin, but using blueprints, plans, drawings, other paper instructions or computer displays. Such time and labor may be, and is often, reduced by at least about 10%, 20%, 30%, 40% or 50%, or even a higher percent, depending upon the complexity of the particular object, part of skin being assembled or manufactured. Typically, the more complex an item is that is being assembled or manufactured, the more time and labor savings will be achieved with the systems and methods of the invention. Further, a much larger quantity of particular items being assembled or otherwise manufactured can be assembled or manufactured within a given period of time in comparison with assembly or manufacturing processes that employ blueprints, plans, drawings, other paper instructions or computer displays, to produce the same items, rendering an assembly or manufacturing process or line tremendously more efficient.

Second, the systems and methods of the invention greatly improve the accuracy of assembly or other manufacture of a three-dimensional object, part or skin in comparison with other assembly methods, such as those that employ blueprints, plans, drawings and/or other paper instructions or computer displays, usually providing error-free assemblies and manufactures. In the systems and methods of the invention, step-by-step instructions in a logical or required order, and usually the "best" order if more than one order is possible, for an assembly of a particular three-dimensional item are provided to an operator, and improve the accuracy of the assembly or other manufacture by highlighting specific points on the item being assembled or otherwise manufactured, and detailing specific instructions, which very advantageously reduce or eliminate assembly and manufacturing errors, which errors can be extremely costly. Typically, the systems and methods of the invention result in one or a plurality of assemblies or other manufactures of a three-dimensional object, part or skin that is substantially or fully error-free (i.e., 100% accurate). For example, if in assembling a particular object, part C cannot be fastened to part B until part B is fastened to part A, the step of fastening part C to part B will be ordered by the systems and methods of the invention in a manner that is subsequent to the step of fastening part B to part A (i.e., the steps will occur in a logical or proper order for an assembly or other manufacture of this particular object). An error in assembly can result in large quantities of wasted costs relating to raw materials, machine time, labor time, interruption of assembly process, rework and/or scrap disposal.

Third, the systems and methods of the invention provide an extraordinarily effective means to pass information from highly skilled and/or experienced workers to less experienced, or even inexperienced, individuals to readily be able to assemble or otherwise manufacture, or carry out some other process in connection with, a three-dimensional object, part of skin the second, third and subsequent times (i.e., after the first time). Once a complex object is assembled or otherwise manufactured using the systems and methods of the invention a first time, the second, third, fourth, fifth, sixth and subsequent times that the same complex object is assembled generally become less complicated, and less time-consuming, generally permitting a less experienced individual to readily be able to assemble or otherwise manufacture the object the second, third and subsequent times in a rapid, efficient and error-free manner. This is because the system generally only needs to be set up one time for each different object, part or skin being assembled (using the computer software and other items that is described herein). Once all of the data is entered by a user into the Authoring Tool, Configurator Tool and Operating Tool computer software programs that are described herein, and the various resulting files are created, in connection with one type of item to be assembled, such as an airplane vertical stabilizer, the user typically does not need to do this again (even though than more than one of the same object will likely be assembled). Thus, the second, third, fourth, fifth, sixth and subsequent times that the same object, part or skin is assembled using the system, no initial set up of the system typically needs to be performed, resulting in a tremendous savings in time and labor and, consequently, cost.

When assembling the same exact type of object, part or skin, the Authoring Tool and the Configurator Tool will not need to be re-run by the user. The Operator Tool will be re-run because it contains all of the ordered assembly or other manufacturing sequence instructions. Further, the calibration step in the Operator Tool may not have to be re-run if the object, part of skin being assembled or manufactured is placed in the same place, position and orientation as the previous objects, parts or skins that were assembled with respect to their locations and orientations in connection with the optical projector(s). In these cases, the Tweak screen could be used to make a final alignment between the three-dimensional object, part or skin, and the projected text, images and/or symbols, so that the latter appears in an undistorted manner on the former. If the object, part of skin cannot be placed in the same spot and orientation, then the calibration step will usually need to be re-run. Thus, it is preferred that an assembly line reliably place the object, part of skin to be assembled or manufactured in the same place, position and orientation each time that another one is being assembled or manufactured, which can avoid re-running the calibration step.

As an example, a complex three-dimensional object that takes approximately thirty hours to assemble the first time that it is assembled using the systems and methods of the invention may take only eighteen hours to assemble (by the same or a different individual) the second, third, fourth, fifth, sixth and subsequent times that it is assembled. The foregoing advantages result in an additional increase in efficiency for assembling the object, and a corresponding additional savings of time and money. Labor savings of 30% and greater have been demonstrated during testing of these systems.

Fourth, the systems and methods of the invention do not depend upon the particular type of lens that is used in an optical projector employed therein (regular lens, fixed local lens, wide angle lens, wide short throw lens, zoom lens, or the like) and, thus, can operate successfully using a wide variety of different types of optical projector (or other) lenses, regardless of how close that a three-dimensional object, part, skin being assembled or manufactured is to the optical projector(s) being employed. For example, typically, with other types of projection-based processes, a wide angle lens would be required when projecting from a projector that is physically located close to a screen being projected upon, and a different lens would be required if the projector were moved a great distance from the screen. This is not the case with the systems and methods of the invention, which can use any type of a suitable lens, whether close or far from an object being projected upon.

Fifth, the systems and methods of the invention have an ability to operate successfully in daylight and/or in other types of bright light that is typical in production environments (i.e., they do not need to operate in a dimly-lit or dark room in order to properly operate).

Sixth, in contrast with laser assembly guidance systems for assembling objects, which very disadvantageously can only project a limited quantity of a single color onto an object, cannot project images (pictures, drawings, illustrations, figures, tables or other graphics), shapes or video onto an object, must write out each letter of a word or text individually, which is extremely time consuming, and often have accompanying severe flashing or blinking with their laser projections, the systems and methods of the invention have an ability to very rapidly project virtually unlimited quantities of a wide variety of texts, images, shapes and video onto a three-dimensional object, part or skin that is being assembled, otherwise manufactured or processed (without having to write out each letter of a word being projected), such as dots, lines and/or a wide variety of shapes, or a combination thereof, and in any color or combination of colors in an unlimited quantity, and without flashing, blinking and/or other distortions. Virtually an unlimited pallet of a wide variety of different colors, or combination of colors, from black to white, can be displayed on a three-dimensional object, part or skin at the same or different times, including, but not limited to, orange, red, maroon, pink, purple, cyan, violet, fuchsia, blue (royal, navy, aqua or the like), green (lime green, olive green, light green, dark green or the like), teal, yellow, brown, black, white, grey, silver, gold and/or the like. The systems and methods of the invention provide a user with an option of using a standard windows (or other) color pallet that is available in many Microsoft Windows (and other) computer software programs, and all of the various colors provided therein. Such color pallets typically show a rainbow of color that start with black and ends with white. The user can lace a mouse over the rainbow to select a color or can enter RGB (Red, Green, Blue) values using a text box to define an exact color. As can be seen from the foregoing, the systems and methods of the invention are significantly more rapid, versatile and efficient in comparison with laser assembly guidance systems, and do not project projections that are distorted, like laser projection systems often project.

In order to present an image to observers, laser projectors move a laser beam quickly over the surface using computer-controlled mirrors. This laser beam, when not moving, is a simple point of light, and looks like a line when it is moving at a fast enough rate of speed. From the point at which a laser projects the start of an image to the point at which the laser projects the last point in an image before starting over again is called a "frame." How many of these frames can be displayed per second is referred to as frames per second (fps). This can be thought of as being equivalent to hertz (cycles per second).

For the human eye to perceive no flickering, and for images to seem fluid, a laser must generally project an image at a rate of at least 24 frames-per-second. Consequently, if the image a laser is projecting can be fully "painted" 24 times per second, the human eye shouldn't see any flickering. However, as the size of the image being displayed by the laser increases, so does the amount of time that it takes to paint an entire frame, since the mirrors in the laser cannot be sped up. Therefore, flickering will begin at less than 24 frames per second, and will get progressively worse as this number decreases.

An optical projector is different from a laser projector in that an optical projector contains a relatively high intensity light bulb inside that typically operates at from about 50 to about 60 hertz. This light shines through an image, then through the projectors lens, and onto the projection surface. The entire image is projected at the same time, and not one point at a time, as occurs with a laser. In addition, the laser projects only in one color, whereas an optical projector projects in whatever color each point of an image being projected is since the light shines "through" it. Because the light is generally on continuously, and generally projects an entire image continuously, there is no flickering, no matter how big the image gets.

The above features, and other features described herein, along with tremendous time and labor savings, which result in tremendous cost savings, significantly increase the utility of the system and methods in comparison with similar laser systems, and render them significantly more advantageous and desirable.

Seventh, in stark contrast with a standard Power Point or laser projection, due to their three-dimensional calibrations (described herein), the systems of the invention may be placed anywhere within a given assembly or work area, such as a conference room, a factory, an assembly line, a theater or the like (on one side, on the other side, in the front, in the back, in the middle, and the like), and retain an ability to project a picture (or other image), text, or both onto a three-dimensional object that is undistorted regardless of projector placement and/or surface contours of the object. Standard projections do not have such an ability. Software employed in the system includes a calibration routine that guides an operator through a sequence of steps that determines the relative positions and orientations of the optical projector(s) and the three-dimensional object, part or skin being illuminated. The system software then projects the image in a manner that orientation appears correct regardless of the projector-to-object (or part of skin) orientation.

Eighth, there is no system limit regarding the quantity of information that can be included in one or more assembly, manufacturing or other process steps (although practical limits may vary by application), or the number of such steps that may be programmed.

Ninth, the same systems and methods of the invention very advantageously can be used to assemble any three-dimensional object, part or skin, regardless of the complexity or non-complexity of the object, part or skin, and can project text, images and/or symbols upon any three-dimensional object (or part) in a substantially or fully undistorted manner. They are not limited to assembling, manufacturing or projecting upon, only one (or two, three, four, five, six, seven, eight, nine, ten and so forth) particular type of three-dimensional object, part or skin. The same systems and methods can be used to assemble, manufacture, process and project upon a wide variety of different three-dimensional objects, parts, skins or systems, having a varying complexity.

Tenth, the systems and methods of the invention very advantageously can be calibrated in the manner described herein very rapidly, generally in about three minutes or less, and usually in about two minutes or less, and often in about one minute or less, while producing very accurate alignments.

Eleventh, the three-dimensional optical projection technology of the systems and methods of the invention allow an assembly, manufacturing or other business to record (have inputted into the computer) its "best" practices (i.e., the "best" method for assembling, manufacturing or otherwise processing a particular three-dimensional object, part or skin, rather than just any one or more different ways out of a variety of different possible ways), so that there is an assurance that every worker knows the "best" way to assemble, manufacture or process any object, any time that such assembly, manufacture or process is being performed, even if they have never done this particular assembly, manufacture or process (or task thereof) before.

Twelfth, the systems and methods of the invention significantly reduce, often by as much as 50% or greater, assembly, manufacturing or other process errors made by workers when manually assembling, manufacturing or processing a three-dimensional object, part or skin (i.e., using blueprints, plans, instructions manuals, other paper products and/or computer screens to learn and understand how to assemble, manufacture or process a particular three-dimensional object, part or skin). For example, if an "L" shaped part needs to be mounted to another part in a configuration in which the "L" should face to the right and upwards (as opposed to the left and downwards), an assembly technician would typically mount the "L" shaped piece in an incorrect configuration about 50% of the time, greatly reducing the efficiency and accuracy of the assembly, resulting in large additional and unnecessary assembly costs. This problem is solved by the systems and methods of the invention, which can project an "L" in a desired color directly onto the three-dimensional object, part or skin being assembled in the exact orientation in which it is to be configured (facing to the right and upwards), very advantageously eliminating any possibility of assembly errors, and associated assembly costs.

Thirteenth, in stark contrast with laser projection systems and methods employed in an assembly of an object, which operate in a completely different manner from the optical systems and methods of the present invention, such laser systems are extremely expensive (often about $250,000.00 or more per system). In contrast, the optical systems of the invention currently cost much less than corresponding laser systems, often up to eight times less or more. Further, when a laser burns out, it is extremely expensive to replace. In contrast, when a light bulb employed in an optical projector burns out, it is relatively inexpensive to replace.

Fourteenth, unlike laser based projection systems, which only have an ability to illuminate one relatively small dot on a screen or object at one time, which may be moved by the operator to attempt to form a shape of a letter, the systems and methods of the invention very advantageously can illuminate a large area at one time, such as an entire aircraft.

Fifteenth, the systems of the invention can generally be installed and set up for operation in an assembly environment very rapidly by only one person, usually in about four hours or less, and more usually in about two hours or less, and still more usually in about one hour or less, and even still more usually in about thirty minutes or less. In some cases, it takes only one person about twenty minutes to install the system (take all of the steps that are necessary to make the system run to operate an assembly, manufacturing or other process). Further, the components of the systems can properly be calibrated in the manner described herein very rapidly by only one person at a very low cost (often at no cost), usually in about twenty minutes or less, and more usually in about ten minutes or less, and still more usually in about five minutes or less, and even still more usually in about one minute or less.

Sixteenth, in contrast with laser-based systems and methods, the systems and methods of the invention typically do not produce any blinking, flickering, or other phenomena that can cause eye strain for the user (or otherwise be annoying to the user).

The foregoing advantages will likely make American and other industrialized country's assembly lines, manufacturing environments and systems significantly more efficient, resulting in tremendous time and cost savings.

Preferred Embodiments

For the purpose of illustrating the systems, processes, uses and methods of the present invention in a manufacturing application, there are shown in the drawings, which form a material part of this disclosure, various illustrations, schemes and flowcharts of preferred embodiments thereof. However, the systems and methods of the present in invention are in no way limited to manufacturing applications, and may be employed in any application, process, situation and/or environment in which it is desired or required to project three-dimensional text, images and/or symbols in a substantially or fully undistorted manner onto one or a plurality of three-dimensional objects, parts, skins, persons, animals and/or the like.

After very extensive experimentation and testing with complex three-dimensional objects, such as aircraft vertical stabilizers, and development, the inventors discovered how to accurately and successfully optically project three-dimensional text, images and/or symbols in an undistorted manner onto one or a plurality of three-dimensional objects, parts or skins to provide a series of logically ordered assembly instructions (steps) for an assembly or other manufacture of the object having the numerous advantages that are described herein, which was extremely difficult and challenging, and which is completely different from the manner in which laser projection systems operate. Because mistakes in an assembly or other manufacture of many complex three-dimensional objects (aircrafts, vehicles, ships, trains, missiles, and the like) cannot be made without producing potentially very dire consequences, including a loss of human lives, an extensive amount of testing was required to perfect the systems and methods of the present invention, and to have them operate extremely accurately.

While preferred embodiments of the systems and methods are describe hereinbelow, these are only specific examples of how the systems and methods of the invention can be successfully set up and employed to operate, and there are many other ways that such systems and methods can be set up and employed to operate and/or programmed by a computer programmer having ordinary skill in the art using the information, drawings, equations and source code that are all taught, or provided herein, in very great detail. The inventors solved a hugely important, and long-felt, but unresolved need worldwide in the manufacturing, production, assembly, and three-dimensional projection industries, which is expected to revolutionize the manner in which three-dimensional objects, parts, skins and/or the like are assembled, manufactured or processed, particularly complex three-dimensional objects, such as airplanes, jets, helicopters, submarines, ships, boats, automobiles, trucks, trains, military vehicles, missiles, tanks, cables, heavy industrial machinery, and the like, and parts thereof. They developed a solution to a very large problem, and their solution is not limited to any particular type, number or brand of optical projectors, computers, computer software programs, computer code, measurement devices, mounts and/or the like. Using the information, drawings, equations and source code that are taught by the inventors herein in very great detail (i.e., the information that was discovered and developed by the inventors), any computer programmer having ordinary skill in the art can write and develop a wide variety of one or a plurality of computer software programs and/or pieces of computer code that can act alone or together in a wide variety of different combinations, and use such software programs in the manner described by the inventors herein with a wide variety of different optical projectors, computers, measurement devices, mounts and/or the like to produce the systems and methods of the present invention.

The various components of the preferred embodiments of the systems of the invention may be generally arranged in the manner shown in the drawings, and/or described herein, or otherwise, as may be desired or required in a particular situation and/or for a particular application. The present invention is in no way limited to the precise parts, components, arrangements, configurations, dimensions, instrumentalities, angles, codes, softwares, programs, computer programming languages, user interfaces, display screens, frames, calibrations, correlations and/or conditions that are shown in these drawings, or are described herein. These parts, components, arrangements, configurations, dimensions, instrumentalities, angles, codes, softwares, programs, computer programming languages, user interfaces, display screens, frames, calibrations, correlations and/or conditions may be varied widely, as circumstances, industries, environments, individuals, entities and/or locations require, or as is desired. Further, these parts and components may be arranged in a wide variety of different manners. The location of the various components or parts of the systems, and parts thereof, and the means employed for attaching or connecting one or more components or parts of the systems with one or more other components or parts thereof, may also be varied. Still further, various components or parts of the systems may be either permanently, or removably, attached with other components or parts thereof, and may be movable or stationary. Removably attached components and parts are often preferable because such components and parts may generally be replaced in a simpler and more cost effective manner in the event that they become worn, damaged or destroyed.

Specific and preferred embodiments of the systems of the invention, as they are employed in a manufacturing application and/or environment, will now be described with reference to the drawings.

Referring now to FIGS. 1-23, there is shown in FIGS. 1 and 2 a preferred embodiment of the system of the invention in a manufacturing application, which includes an optical projector 1 that is connected via a cable 2 with a computer 3. The cable 2 permits information to be transferred to the computer 3 from the optical projector 1, and information to be transferred to the optical projector 1 from the computer 3, and is connected with the optical projector 1 via a port 4 located in the back of the device 1, and with the computer 3 via a port (not shown) located in the back of that device 3. The optical projector 1 is mounted onto an adjustable tripod 5, and is optically projecting a projection 6 of a plurality of small circles onto pre-drilled holes 7 present in a three-dimensional object 8 that is being assembled (a vertical stabilizer of an aircraft). The computer 3 is sitting on a movable stand 9 including wheels 10, permitting the computer 3 and stand 9 to readily be moved from one location to another location within an assembly or manufacturing area. A keyboard 111 is connected to the computer 3 with another cable 12, and two monitors 13 and 14 are connected with the computer 3 with cables 15 and 16 that are connected to ports (not shown) that are located at the back of the computer 3 and of the two monitors 13 and 14. The cable 12 that connects the computer 3 with the keyboard 11 permits information to be transferred between the computer 3 and the keyboard 11, and the cables 15 and 16 permit information to be transferred between the computer 3 and the two monitors 13 and 14. A mouse 17 sits next to the keyboard 11 on the stand 9. FIG. 2 additionally shows a grip gun 18 having its probe 19 inserted into a pre-drilled hole 7 that is present in the three-dimensional object 8 being assembled. In FIG. 1 and FIG. 2, the pre-drilled holes 7 that are darker in color represent those holes 7 that are being projected upon by the optical projector 1, and the pre-drilled holes 7 that are lighter in color represent holes 7 that are not being projected upon by the optical projector 1. In both FIG. 1 and FIG. 2, the portion of the object 8 (vertical stabilizer) being projected upon 20 has its pre-drilled holes 7 illuminated by the projection 6, and the portion of the object 8 that is not being projected upon 21 includes pre-drilled holes 7 that are not illuminated.

Systems

Projectors

The systems and methods of the invention include one or a plurality of optical projectors (or similar devices that function in the same or a similar manner) that function to: (i) provide an amount of illumination in an assembly, manufacturing or other area, such as on a production line or inside an assembly building, that is effective for permitting optically projected text, images and/or symbols to be partially or fully visible to an average sighted user (preferably fully visible), preferably in any of a wide variety of different lighting conditions and/or situations ranging from no natural or other light (0% light) to full natural and/or other light (100% light), which typically depend upon a variety of factors, such as the size of a work or other area, the number of windows present therein, the number of lights present therein, the type of light bulbs employed in the lights, and/or the like (for example, a large fully dark room having no windows and no lights, a partially dark room having one or a plurality of windows and/or one or a plurality of lights turned on, ambient light, a room that is bright as a result of having one or a plurality of windows and/or one or a plurality of lights turned on, and a small room that is as bright as possible, for example, having many windows with sun shining through and a plurality of high wattage fluorescent or sodium vapor lights turned on), and preferably in ambient light; and (ii) provide an amount of coverage by such text, images and/or symbols on a three-dimensional object (or part, or skin thereof) being projected upon (in terms of height, width, depth, perimeter, circumference, diameter and/or the like) that is effective for permitting one or a plurality of workers or other system users to properly assemble, manufacture or process the object (or part, or skin thereof) (from greater than about 0% to about 100%), which coverage may be partial (less than 100%), as is shown in the drawings, or full (100%), but is preferably full. For example, if an entire automobile is present in an assembly area, and the part being assembled is a handle of the automobile, or the handle is being affixed to another part on the automobile, it is preferable that the entire handle be covered by the projected text, images and/or symbols, but the remainder of the automobile need not have any text, images and/or symbols projected thereon.

The optical projectors that are employed in the systems and methods of the invention should have a luminosity that is sufficient to overcome the amount of light that is present in a particular assembly, manufacturing, work or other area, such as ambient light, which may vary widely depending upon the situation and area, and which often ranges from about 1500 lumens (in dark assembly areas) to about 5,000 lumens (in bright assembly areas with a lot of natural light or auxiliary lighting), with at least about 4000 lumens being preferred. An effective amount of coverage of an object (or of a part, portion or area thereof) being projected upon generally ranges form about 50% to about 100%, and preferably ranges from about 90% to about 100%, with about 100% coverage being most preferred, but may vary. The type (natural light, sunlight, light from light (or other) bulbs and/or the like) of light and/or the amount of light that is present when the optical projectors are being employed generally ranges from about full brightness (100% light) to about complete darkness (0% light), with ambient light being in between.

A "lumen" is a unit of measurement of the amount of brightness that comes from a light source. Lumens define "luminous flux," which is energy within the range of frequencies that human beings perceive as light. For example, a wax candle generates 13 lumens and a 100 watt bulb generates 1,200 lumens.

When choosing an optical projector, the lumen rating is an important specification to be considered, and is greatly influenced by the available surrounding light. The standard lumen rating of a projector is the average of photometer readings at several points on a full white image on a screen.

While the intensity of an optical projector is rated in lumens, the power density on the object being illuminated is measured in foot-candles. Power density is defined as follows:

$$P = I/A$$

in which:
P=Power Density in foot candles;
I=Light Intensity at source (optical projector) in lumens; and
A=area illuminated in square feet.

The ambient light in a typical production (assembly) area ranges from about 20 to about 100 foot candles, with from about 30 to about 70 foot candles being typical, and about 40 being ideal. The optical projection system setup preferably is at least about 80% of ambient light, preferably no more than about 150% of ambient light. An even match of 100% is ideal. For example, with ambient light of 40 foot candles and a projector of 4000 lumens, the ideal illumination would mean the projected area would be 100 square feet, or 10×10 feet.

While a user of the systems and methods of the invention having ordinary skill in the art may generally readily be able determine what size of optical projectors to use for a particular assembly, manufacture or other process, and in a particular environment, the user may, optionally, use a calculator to help make this decision. One calculator that the user may use for this purpose is present at the web site infocus dot com. Other such calculators are known by those having ordinary skill in the art, and are often provided by manufacturers of optical projectors.

Using the information that is provided herein, those having ordinary skill in the art can readily select a suitable or desirable optical projector, an amount of ambient light, and a size of a work area that are suitable or required for properly using the systems and methods of the invention to assemble, manufacture or otherwise process a particular three-dimensional object, part or skin.

The optical projectors that are used in the systems and methods of the invention may be of any brand, model or type, as long as they can perform the functions that are described herein. As is known by those having ordinary skill in the art, component parts of optical projectors typically include a lamp, a cross dichroic prism, dichroic mirrors, LCD panels, reflection mirrors, lenses, polarizing converters and/or a projector lens. Additionally, they may include mounts, screens, digital or other zooms, magnifiers, fans, mouses (remote control or other), cameras, laser pointing devices, computers, VGA, RGB IN and/or other ports and/or cables, RGB1, RGB2, video and/or other inputs, computer connections and/or the like. Such components typically work together to affect light that is emitted from the lamp, and may facilitate a connection of the projector with a computer.

LCD optical projectors that are employed in the systems and methods of the invention generally project very tiny dots of light that produce red, blue and green lights on an object, surface of projector screen. By combining these primary colors, more interesting colors and tones are typically created. Red and blue light is combined to make purple, while green and red creates yellow. Transparent light is created by combining the three primary colors (red, blue, and green) with equal brightness. The colors of light are mixed into varying combinations to produce natural looking colors before the light exits the projector lens.

With most projectors, lighting conditions play a significant role in projecting an image onto a screen (or other surface or object). A dark room will work well for most LCD and other projectors, but there are times when it is not possible or desirable to have a room be dark, such as when a projection is being made in a well-lit room. LCD projectors may work differently in regards to brightness. Highly lighted areas, such as a room with many windows may require an LCD projector with a brightness of 5,000 lumens or more ANSI, whereas a room that does not include windows may require an LCD projector with a brightness as little as 1500 lumens.

When choosing a projector, the lumen rating may be an important specification to consider. In a darkened room, 1,000 lumens may be ample, but in a typical production environment with normal lighting, 4,000 lumens may be more desirable. In a room with daylight, greater than 5,000 lumens may be preferred. The standard lumen rating of a data projector is the average of photometer readings at several points on a full white image on the screen.

There are four variables that dictate what lens a user should use for a particular situation:
(i) the distance to the three-dimensional object, part or skin from the optical projector;
(ii) the size of the three-dimensional object, part of skin:
(iii) the amount of ambient light that is present in the particular work or other area;
(iv) the position of the optical projectors in relation to workers on a project, and to other objects, such as drilling machines, ladders and other objects that may normally be used in the area where the optical projectors are to be used, such as a work area.

With respect to the first variable, there are some lenses that are capable of projecting an image that may be 10' wide by 10' high when the projector is 8' away. There are other lenses that would only project an image that is 5' wide by 5' high from the same 8' distance. Therefore, the user needs to determine how close to the three-dimensional object, part or skin he can situate the optical projectors, and how far he can move them back, if needed. It is preferable that the optical projectors be as close as possible to the three-dimensional object, part or skin in order to get it to fully (100%) cover the object with the projected text, images and/or symbols. The larger the image, the dimmer the image will get. For example, a 4000 lumen projector will generally look the same with an 8'×8' projection area if the projector is 6 feet or 60 feet (different lenses) away. No matter what lens is chosen, the user has the same amount of light coming out of the optical projector. So, if the user chooses a lens that provides a 5'×5' image from 8' away, its picture will be much brighter than if the user chooses a lens that provides a 10'×10' image from 8' away. (The concept is similar to that of a flashlight. The closer that one is to an object, the smaller the light "spot" will be on its surface, but the brighter it will be. The farther back that one gets, the "spot" gets bigger, but dimmer.)

With respect to the second variable, if a three-dimensional object is so large that an optical projector cannot be moved far enough back to cover it, or there is no lens available that will project an image that is large enough to cover it, then at least two optical projectors will generally be required. Using all of the guidelines discussed in the following paragraph, the first optical projector would generally be placed with the optimal lens, and then the second optical projector would be placed in order to project an image over all of the areas that are not covered by the first optical projector. Additional optical projectors (and associated projector lens) may need to be added if coverage is not sufficient using just two of them. For example, if a computer having a plurality of video outputs specifically includes eight video outputs, typically up to eight monitors and optical projectors may be connected with the computer, such as one monitor and up to seven optical projectors (using various cables). A plurality of optical projectors, computers, monitors and/or associated equipment, each of which may have a plurality of inputs and outputs and associated cables, may be operably connected with each other in a manner that data may be transferred from one to the other, or vice versa, or both. The number of optical projectors needed or desired, and their placement within a particular assembly, manufacturing, work or other area, may be estimated, and often ranges from about 2 to about 4 per part of an object that is being assembled. For example, in one manufacturing environment, a manufacturer could have, for example, one hundred different stations in which various different three-dimensional component parts of one three-dimensional object are separately being assembled or otherwise manufactured, with each station using from about 2 to about 4 optical projectors, and a total of 200 to 400 optical projectors being employed. However, the most accurate method for ensuring that the appropriate number and placement is to try it. The user should first determine the size of the three-dimensional object (or part) being assembled.

Optical projector placement may be directed by many variables, the most important being that it needs to be placed in a manner that it is not in the way of anything, such as workers, or objects, such as aisles. Once this is determined, the type of lens to be used in the optical projector can readily be selected by those having ordinary skill in the art based on an analysis of "throw ratio." Throw ratio is defined as a distance to target divided by the width of the three-dimensional object, part or skin being projected upon, or assembled or manufactured. For example, if a three-dimensional object being assembled is 5 feet wide, and the optical projector is going to sit 10 feet away from the object, that means that the throw ratio should be 10/5, which is a throw ratio of 2. The optical projector and lens may then be placed in position and powered up (by electricity, a battery and/or the like). If a user then determines that the object (or part) is not fully covered by one optical projector, a second optical projector should be added, generally off of either side of the first optical projector. If the user then determines that the object (or part) is still not fully covered by two projectors, then a third optical projector should be added, generally off of either side of the first or second optical projector, and so forth. All optical projectors should be placed in locations within an assembly or work area so as to minimize any interference with workers, aisles, and the like. Further, if an object (or part) can be covered width wise with one optical projector, but the height of the object (or part) is such that one optical projector cannot cover it, a second optical projector will typically be needed. In this situation, the second optical projector will most likely need to be placed above the first optical projector, and high enough to cover the top of the three-dimensional object (or part).

With respect to the third variable, the ambient light plays a factor because the brighter the work or other area, the harder it is to see the projected text, images and/or symbols. Therefore, a user will generally have to move the optical projector closer or use a lens that projects a smaller image in a brighter environment (as opposed to a darker environment).

Projector sizing calculators may be employed in, or to carry out, the systems and methods of the invention, and are available on, or from, sources that are known by those having ordinary skill in the art, such as the web site infocus dot com. Data regarding image size, projection distance (distance from the optical projector to the three dimensional object or part being assembled), optical projector model and/or other variables typically may be input into the calculator, and the calculator will typically provide corresponding data, such as how large a particular image will be, or how far back from an object that a optical projector should be located.

The number, type, size and capacity of optical projectors, optical projector lens, computers, monitors, inputs, outputs, cables, associated equipment, and the like, and their placement within a particular assembly, manufacturing, work or other area, and in relation to one another, that would be suitable or desirable for a particular project, object (or part) and/or situation may readily be determined by those having ordinary skill in the art using the information that it taught herein.

Some optical projectors have interchangeable lenses, but others do not. The following list of InFocus optical projectors that may be employed in the systems and methods of the invention include interchangeable lenses.

| Throw Model | Lens Type | Throw Ratio | Zoom Ratio | Supported Projectors |
|---|---|---|---|---|
| LENS-022 | Short Throw Fixed | 0.8:1 | 1.0 | LP840, LP850, and LP860, C440, C450, and C460 |
| LENS-023 | Short Throw Zoom | 1.5:1 | 1.1 | LP840, LP850, and LP860, C440, C450, and C460 |
| LENS-024 | Long Throw Zoom | 2.2:1/4.1:1 | 1.0 | LP840, LP850, and LP860, C440, C450, and C460 |
| LENS-025 | Ultra Long Throw Zoom | 3.9:1/7.3:1 | 1.0 | LP840, LP850, and LP860, C440, C450, and C460 |
| LENS-026 | Short Throw Fixed | 0.64:1 | 1.0 | SP777 |
| LENS-028 | Short Throw Zoom | 1.44:1 | 1.2 | SP777 |
| LENS-029 | Long Throw Zoom | 3.6:1 | 1.0 | SP777 |
| LENS-030 | Extra Long Throw Zoom | 2.4:1 | 1.33 | SP777 |
| LENS-031 | Ultra Long Throw Zoom | 5.6:1 | 3.6 | SP777 |
| Lens-039 | Long Throw Zoom | 1.9-3.9:1 | 2.0 | IN42, IN42+, C445, C445+, IN5100 Series |
| Lens-037 | Fixed Short Throw | .8:1 | 1.0 | IN42, IN42+, C445, C445+, IN5100 Series |
| Lens-038 | Short Throw Zoom | 1.2-2.0:1 | 1.6 | IN42, IN42+, C445, C445+, IN5100 Series |
| Lens-040 | Ultra Long Throw Zoom | 3.9-7.4:1 | 1.85 | IN42, IN42+, C445, C445+, IN5100 Series |
| Lens-050 | Short Throw Fixed | 1.5:1 | 1.2 | IN5502, IN5502L, IN5504, IN5504L, IN5532, IN5532L, IN5534 and IN5534L |
| Lens-051 | Short Throw Zoom | 0.8:1 | 1.0 | IN5502, IN5502L, IN5504, IN5504L, IN5532, IN5532L, IN5534 and IN5534L |
| Lens-052 | Long Throw Zoom | 3.8:1 | 2.0 | IN5502, IN5502L, IN5504, IN5504L, IN5532, IN5532L, IN5534 and IN5534L |
| Lens-053 | Ultra Long Throw Zoom | 7.22:1 | 3.8 | IN5502, IN5502L, IN5504, IN5504L, IN5532, IN5532L, IN5534 and IN5534L |
| Lens-WUXGA-STD | Standard | 1.5-2.2:1 | 1.0 | IN5504, IN5504L, IN5534 and IN5534L |
| Lens-WXGA-STD | Standard | 1.5-2.0:1 | 1.0 | IN5502, IN5502L, IN5504, IN5504L, IN5532, IN5532L |

Any optical projectors, and associated optical projector lens, that have an ability to perform the functions that are described herein may be employed in the systems and methods of the present invention. A wide variety of projectors are commercially available from sources that are know by those having ordinary skill in the art, such as Barco (Rancho Cordova, Calif.). Preferred optical projectors for use in the systems and methods of the invention are those that are available from InFocus (Wilsonville, Oreg.) having Model Nos. IN5102, INS104, IN5106, IN5108 or XS1 with integral ultra short throw lens, or equivalent. Preferred optical projector lens for use in the systems and methods of the invention, and in the foregoing optical projectors, are those that are available from InFocus (Wilsonville, Oreg.) having Model Nos. LENS-037 (Short Throw lens (0.8)), LENS-038 (Short Throw lens [1.2-2.0]), LENS-039 (Long Throw lens [1.9-3.9]) or LENS-040 (Ultra Long Throw lens [3.9-7.4]), or equivalent.

The one or more optical projectors that are employed in the systems and methods of the invention may be operably connected with one or a plurality of computers that are also employed therein with, for example, a video cable or other means for transferring data, information and/or graphics between the two types of devices.

Very advantageously, the systems and methods of the invention permit the optical projectors employed therein to be placed virtually anywhere within a particular work or other environment, such as an assembly line, even often at extreme angles, thereby permitting workers to see projected data sets of text, images, and/or symbols from virtually any work station in that environment. Because multiple optical projectors can be used, and each is projecting the appropriate calibrated text, images and/or symbols, if one optical projector gets obscured by a worker, the projected data sets of text, images and/or symbols from the other optical projectors will still generally be visible on the three-dimensional object.

FIG. 1 illustrates schematically a setup of a system of the invention as it relates to a three-dimensional part that is being assembled, or worked on, by a user. In this configuration shown, the optical projector used to project the work instructions, assembly sequences, part outlines, or the like, on the surface of the object is shown mounted to a tripod stand.

Projector Mountings

Preferably included in the systems and methods of the invention is one or a plurality of means for supporting the optical projectors and/or maintaining the optical projectors stationary and/or steady, in place and/or at a desired height and/or other position while in use, and so that any calibrations that are made using the systems and methods of the invention do not change. Such means may be any device or apparatus that performs such function(s), such as a tri-pod (or other stand), a table on which the optical projector may sit or rest, a fixed, pivot-arm or other wall mount, a flush, suspended or other ceiling mount, a table mount, a universal mount, or any similar configuration. A wide variety of such devices, which may be stationary or transportable, and associated mount kits, brackets, extendable or non-extendable extensions, clamps, stands, shelves, tilts, plates, tri-pods and the like are commercially available from sources that are known by those having ordinary skill in the art, such as CDW (Vernon Hills, Ill.). It is preferred that an optical projector that is employed in the systems and methods of the invention be mounted on a tri-pod, for example, in a conventional manner, or in a manner recommended by a manufacturer. Preferred tri-pods for such use are those that are commercially available from Delta Sigma Corp. (Kennesaw, Ga.) (Part No. PWHIDPS1) or Vitecgroup Italia SpA (Via Sasso Rosso, 19 36061 Bassano del Grappa (VI), Italy) (Manfrotto Part No. 161MK2B), or equivalent.

Computers

The systems and methods of the invention also include one or a plurality of computers (or devices that function similarly thereto) operably connected with each other and/or with other devices that are described herein, which function in the manners that are dictated by system software installed therein (discussed hereinbelow). There is generally no limit to the number of computers that may be employed in these systems and methods.

Any type and/or brand of computer that has an ability to perform the functions that are described herein, from any source, and whether present in or out of a computer network, or used with or without the Internet or the World Wide Web, may be employed in the systems and methods of the invention. Examples of computers that may be employed include, but are not limited to, personal computers, business computers, desktop computers, laptop computers, notebook computers, personal digital assistants and other hand-held computers, pocket computers, general purpose computers, special purpose computers, and the like, such as those that are sold by Dell, Inc. (Round Rock, Tex.) at the web site Dell dot corn or at 1-800-www-dell, Apple Computer, Inc. (Cupertino, Calif.) at the web site store apple dot com or 1-800-my-apple, Hewlett Packard Company (Palo Alto, Calif.) at the web site hp dot corn or 1-800-buy-myhp, Delta Sigma Corp. (Kennesaw, Ga.) at the web site deltasigmacorp dot com or 770-975-3992, or similar companies, all of which are hereby incorporated herein by reference in their entireties. Preferred computers for used in the systems and methods of the invention are a Dell Precision WorkStation T3400 or a Dell IBU Americas (Dell Inc. Round Rock, Tex.).

The computers that are employed in the systems and methods of the invention preferably include one or a plurality of means for enabling a user to view graphics and/or video, on a computer and/or display screen, such as an internal or external graphics card, or similar device. When more than about four display screens are being employed in such systems and methods, the graphics card may need to be upgraded from that of a conventional graphics card. Such an updated graphics card is commercially available from sources that are known by those having ordinary skill in the art, such as Delta Sigma Corp. (Kennesaw, Ga.) (Part No. PWHDGU1).

As is known by those having ordinary skill in the art, a computer network can be a public network, and typically includes a central processing unit (CPU) or processor that executes the individual demands of a program, that has an ability to add, subtract, multiply and/or divide a multitude of numbers, and is connected to a system memory, which typically contains an operating system, a hard drive (for storing data), RAM (a chip that holds data), one or more application programs, one or more input devices (permitting a user to interact with the computer), such as a mouse or a keyboard, one or more output devices (also permitting a user to interact with a computer), such as a printer, a display monitor, and a communications interface, such as an ethernet card, to communicate to an electronic network, for example, via a Wide Area Network (WAN) or as an inter-network, such as the Internet. Many other similar configurations are known by those having ordinary skill in the art, and it is contemplated that all of these configurations could be used in the systems and methods of the present invention. Furthermore, using the information that is provided herein, it is within the abilities of those having ordinary skill in the art to program and configure a computer system to implement one or more of the steps of the present invention, as are discussed herein. Moreover, the present invention contemplates providing computer readable data storage means with program code recorded thereon for implementing the method steps that are described herein.

A wide variety of computer accessories may be employed with the computer that are used in the systems and methods of the invention. Such accessories include, but are not limited to, computer drives (hard drives, DVD media drives, CD media drives and/or other drives), monitors, screens, mice, keyboards, batteries, printers, storage units, docking stations. USB (and other) ports and cords, memories, memory upgrade kits, modems, wireless (and other) adaptors, rooters, cables, remote controls, surge protectors, power supplies, servers, mounts, stands, speakers, headsets, headphones, web cams, DVD and CD media and media cases, carrying cases, and the like. These and other computer accessories are commercially available from sources that are known by those having ordinary skill in the art, such as Dell, Inc. (Round Rock, Tex.), Apple Computer, Inc. (Cupertino, Calif.), Hewlett Packard Company (Palo Alto, Calif.) and similar computer supply companies.

Computer systems can be configured to receive inputs from a user, such as a query as to whether an action has been performed, and output the status or lack of status of the action. Still other embodiments could be configured to output reminders, form schedules based on actions associated with the present invention, and the like, to assist in the practice of the invention and/or to manage the practice of the invention.

Embodiments within the scope of the present invention include program products on computer-readable media, and carriers for carrying or having computer-executable instructions or data structures stored thereon. Such computer-readable media can be any available media which can be accessed by a general purpose or special purpose computer, for example, RAM, ROM, EPROM, EEPROM, CD-ROM or other optical disk storage, magnetic disk storage or other magnetic storage devices, or any other medium which can be used to carry or store desired program code in the form of computer-executable instructions or data structures, and which can be accessed by a general purpose or special purpose computer. When information is transferred or provided over a network or another communications connection (generally hardwired, wireless, or a combination of hardwired or wireless) to a computer, the computer properly views the connection as a computer-readable medium. Thus, any such connection is properly termed a computer-readable medium. Computer-executable instructions comprise, for example, instructions and data which cause a general purpose computer, special purpose computer, or special purpose processing device to perform a certain function or group of functions.

The present invention is described in the general context of method steps which may be implemented in one embodiment by a program product including computer-executable instructions, such as program modules, executed by computers in networked environments. Generally, program modules include routines, programs, objects, components, data structures, and the like, that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

The present invention is suitable for being operated in a networked environment using logical connections to one or more remote computers having processors. Logical connections may include a local area network (LAN) and a wide area network (WAN). Such networking environments are commonplace in office-wide or enterprise-wide computer networks, intranets and the Internet. Such network computing environments typically encompass many types of computer system configurations, including personal computers, handheld devices, multi-processor systems, microprocessor-based or programmable consumer electronics, network PCs, minicomputers, mainframe computers, and the like. The invention may also be practiced in distributed computing environments where tasks are performed by local and remote processing devices that are linked (by hardwired links, wireless links, or by a combination of hardwired or wireless links) through a communications network. In a distributed computing environment, program modules may be located in both local and remote memory storage devices.

The order of the steps that are described herein may generally be varied, and two or more steps may generally be performed separately, concurrently and/or with partial concurrence. Such variation will depend on the software and hardware systems chosen and on designer choice. All such variations are within the scope of the present invention. Also, software and web implementations of the present invention could be accomplished with standard programming techniques with rule based logic and other logic to accomplish the various steps thereof.

The preferred system features for computers that are employed in the methods and systems of the invention are as follows:

Processor: Core 2 Duo E8200 processor (or equivalent or better), with a Dual Core Intel Xeon W3503 2.40 GHz, 4M L3, 4.8 GT/s being more preferred;

RAM: at least about 4 MB, and more preferably at least about 8 MB;

Hard Disk: at least about 50 GB, and more preferably at least about 320 GB;

CD or DVD Drive: a 40×CD (or equivalent or better), but a DVD is preferred;

Hard Disk Drive: at least 1 hard disc drive, and more preferably a dual disk drive RAID system;

Graphics Card: at least one graphics card that can support the OpenGL or DirectX 3D graphics language;

Operating System: an operating system for the computer(s), preferably the Microsoft Corporation desktop operating system known as "Windows XP";

For systems of the invention that are employed on a production line, which generally cannot afford to have hard drive crashes, or other hardware and/or software problems, it is preferably to employ a dual disk drive RAID system.

The preferred Precision WorkStation T3400, for example, includes the following components and/or characteristics that are described below (and also on the Dell Inc. web site):

| Quantity | Part No. | Part Description |
|---|---|---|
| 1 | RU100 | INSTRUCTION . . . , DEVIATE L6 TO L5.5, 525 W |
| 1 | MT920 | Intel Processor, E8200, 2.66 GHz, 6 MB Wolfdale, 65 W, C0 |
| 1 | 5120P | Cord, Power, 125 V, 6 Feet, SJT . . . , Unshielded |
| 1 | C158J | KIT . . . , DOCUMENTATION . . . , SERI/WSI, ENGLAND/ENGLISH . . . , DAO/BCC |
| 1 | DJ310 | Palmrest, Keyboard, Plastic Entry, Liteon, Board Lock |
| 1 | DR972 | Assembly, Digital Video Disk Drive, 16X, Serial ATA, Half Height, TOSHIBA SAMSUNG STORAGE TECHNOLOGY . . . , Black |
| 1 | DC094 | Assembly, Cable, Serial Ata Optical, Matrix, smith, mini Tower |
| 1 | J229H | KIT . . . , Software, VB32SP1A, Digital Video Disk Drive, Multiple, 5 |
| 1 | R662K | Kit, Software, Overpack, WXPPSP3 Compact Diskette W/documentation, English |
| 1 | K123H | Kit, Software, Power dvd, 8.1-00 Digital Video Disk Drive |
| 1 | XT213 | Hard Drive, 250 G, S2, 7.2K, 8M SGT-SH |
| 4 | J8461 | Assembly, Cable, Video, Lead Free |
| 4 | W579C | Dual In-Line Memory Module, 1 GB 800, 128X72, 8, 240, 1RX8 |
| 2 | RN034 | nVidia Quadro FX 1700 Graphics Card, 512, Fix, 1700 MRGA14L, Dual Monitor DVI or VGA |
| 1 | XN966 | Kit, Mouse, Universal Serial Bus, 2BTN, Optical, Logitech |
| 1 | H026G | Kit, Software, Roxio, Creator 9.0-01, Business |
| 1 | 7797R | System Integration, Fee Integration, #9 |
| 1 | D568C | Assembly, DVD +/− RW . . . , 16X Half Height, Serial Ata, PLDS |
| 1 | CD011 | Kit, Compact Diskette, Driver Resource Compact Disk Precision Workstation, V2 |
| 1 | DJ331 | Keyboard, 104, Universal Serial Bus, United States, Entry Liteon, Black |
| 1 | JT147 | Assembly, Heatsink, Shroud, CEL MTD |
| 1 | RW118 | ASSEMBLY . . . , CHASSIS . . . , PWA INTEGRATED . . . , 525 W, T3400 |

The Dell Precision WorkStation T3400 includes the following features:
It supports duel-core and quad-core Intel processors as follows:
Dual-core Intel Core2 Extreme with 1333 MHz FSB, 4 MB L2 Cache, XD, VT, EIST;
Dual-core Intel Core2 Duo with 1066 MHz FSB, 4 MB L2 Cache, XD, VT, EIST;
Quad-core Intel Core2 Quad with 1066 MHz FSB, 2×4 MB L2 Cache, XD, VT, EIST
It supports the following Operating Systems:
Genuine Windows 7 Professional 32-Bit;
Genuine Windows 7 Professional 64-Bit;
Genuine Windows 7 Professional 32-Bit with Downgrade Rights Service to Windows XP Professional;
Genuine Windows 7 Professional 64-Bit with Downgrade Rights Service to Windows;
XP Professional x64 Edition;
Genuine Windows 7 Ultimate 32-Bit;
Genuine Windows 7 Ultimate 64-Bit;
Genuine Windows 7 Ultimate 32-Bit with Downgrade Rights Service to Windows XP Professional;
Genuine Windows 7 Ultimate 64-Bit with Downgrade Rights Service to Windows XP
Professional x64 Edition;
Genuine Windows Vista Business 32-Bit;
Genuine Windows Vista Business 64-Bit;
Genuine Windows Vista Business with Downgrade Rights Service to Windows XP Professional;
In includes an Intel X38 Express chipset (for computing power);

It includes Dual Channel DDR2 SDRAM System Memory (Four DIMM slots support up to 16 GB dual-channel DDR2 667 or 800 MHz non-ECC and ECC memory);

It support Dual PCI Express ×16 graphics cards up to 300 watts, and with up to 768 MB discrete graphics memory, with all graphic cards supporting dual monitor configurations;

It provides serial attached SCSI (SAS) and supports up to four hard drives in the tower orientation, and up to three hard drives in the desktop orientation, for potential capacities of 4 TB and 3.5 TB, respectively. With RAID 0, 1, 5 and 10 options, storage can be configured to meet a user's needs, whether for storing huge files, backing them up or helping to improve performance with data-striping:

SATA 3.0 Gb/s 7200 RPM with 16 MB DataBurst Cache up to 750 GB;

SATA 3.0 Gb/s 7200 RPM with 8 MB DataBurst Cache up to 250 GB;

SATA 3.0 Gb/s 10K RPM with 16 MB DataBurst Cache up to 160 GB;

SAS 15K RPM up to 300 GB (requires controller card);

It includes an Integrated SATA 3.0 Gb/s controller with support for RAID 0, 1, 5 and 10 Optional SAS 6i/R PCI Express controller card with support for SAS RAID 0 or 1;

It includes the following power supply:

375 watt manual selection power supply;

525 watt Wide-ranging Power Supply;

It includes the following slots:

2 PCI-e×16 graphics slots;

1 PCI-e×8 slot wired as ×4;

3 PCI 32 bit/33 MHz slot with support for 5 v cards

It includes the following bays:

2 internal 3.5" hard disk drive bays;

2 external 5.25" optical bays;

1 external 3.5" drive bay (Flex Bay) in desktop orientation, or 2 external 3.5" drive bays (Flex Bays) in tower orientation;

It includes the following standard I/O Ports:

11 USB 2.0 (2 front, 6 back, 3 internal for uDOC/Flex-bay connectors;

1 serial (optional 2nd connector), 1 parallel, 2 PS/2, 1 RJ-45, Stereo line-in and headphone line-out on back panel;

Microphone and headphone connector on front panel, IEEE 1394a connector available on front panel with add-in card.

For security, it includes a Setup/BIOS Password; I/O Interface Security; Chassis intrusion switch; Biometric Fingerprint Reader; Kensington lock; and A Network Controller of an Integrated Broadcom 5754 Gigabit Ethernet controller with Remote Wake Up and PXE support.

Any computer which is equivalent, or is similar in function, to the computer that includes the hardware and software configuration that is described herein may be employed in the systems and methods of the invention, such as a standard desktop computer with an external monitor and an extra video output for connecting it to a projector will work, and a laptop computer with an integral monitor and one external video port. Such computers, for example, include Dell Inc. model numbers T3400, T3500, T5500, T7400, T7500 and R5400 (as well as a wide variety of other computers marketed by the same or other manufacturers or distributors). The invention can support a plurality of video displays, such as eight, which can be in any combination of projectors and external/integral monitors.

The computer is preferably connected with a means for controlling the movement of a cursor or pointer on a display screen, such as a mechanical, optomechanical or optical mouse and its connecting wire, which may be connected to the computer in a variety of manners, such as via a an RS-232C serial port or a PS/2 port, or may be cordless, and rely on infrared or radio waves to communicate with the computer. It preferably is also connected with a means for displaying data, information and/or graphics, such as a display screen or monitor, and a means for entering or inputting data into the computer, such as an internal or external keyboard, and includes one or more means for connecting it with a monitor, such as a video port, graphics port, VGA port or other socket on the back (or other portion) of a computer that is used to connect a monitor. The computer is also preferably connected with one or a plurality of internal or external means for permitting data to be exchanged between the computer's components and one or more peripherals, such as cables or cords, for example, power cables (for electrically or otherwise powering the computer), VGA or DVI video cables (for transferring video signals between devices, such as a monitor and a computer), IDE and SATA cables (for transferring data between a computer's internal components and the motherboard), USB and Firewire cables (for permitting peripherals to connect to a computer and transfer data, generally at high speeds). Ethernet cables (for joining two network devices, and permitting data to be transferred, generally at high speeds between the devices in the form of a series of electrical pulses), and the like.

The one or plurality of computers may be operably connected with one or a plurality of optical projectors that are being employed in the systems and methods of the invention with, for example, video cables.

Additional information regarding computers and computing is present in the following books, each of which is hereby incorporated herein in its entirety by reference: (i) Douglas E. Corner, *Computer Networks and Internets with Internet Applications* (5th Edition, Prentice Hall, 2008); (ii) M. Morris Mano and Charles Kime, Logic and Design Computer Fundamentals (4th Edition, Prentice Hall, 2003); (iii) Randal E. Bryant and David R. O'Hallaron, *Computer Systems: A Programmer's Perspective* (Prentice Hall, 2002); (iv) William Stallings, *Data and Computer Communications* (8th Edition, Prentice Hall, 2008); (v) Harold Abelson, Gerald Jay Sussman and Julie Sussman, *Structure and Interpretation of Computer Programs*, (2nd Edition, McGraw-Hill. 1996); (vi) J. Stanley Warford, *Computer Systems* (4th Edition, Jones & Bartlett Pub, 2009); and (vii) John Lewis et al., *Java Software Solutions*, (2nd Edition, Pearson Education, Inc., 2007, ISBN 0-13-222251-5).

Display Screens

The systems and methods of the invention preferably include one or a plurality of means for displaying data, information and/or graphics, such as a computer's user interface and open programs, allowing the user to interact with the computer, and the data, information and/or graphics appearing thereon, for example, display screens that are internal and/or external to the computer(s) being employed. Any type and/or brand of such means that has an ability to perform the functions that are described herein, from any source, may be employed in the systems and methods of the invention. Preferred display screens for use in the systems and methods of the invention are a Dell LCD Flat Panel E2209Wc or a Dell LCD Flat Panel E207WFPc (Dell Inc., Round Rock, Tex.) or equivalent.

Cables

The systems and methods of the invention preferably include one or a plurality of means for transferring information, data, graphics and/or the like between computers, optical projectors, monitors, keyboards, mouse(s), printers, drives, measurement devices, grip gages, adaptors and/or other peripherals, such as cables, cords or the like, for supplying electrical (or other) power to the foregoing devices, and/or for performing similar or other functions, which means are commercially available from sources that are known by those having ordinary skill in the art. Using the detailed information that is provided herein, those having ordinary skill in the art may readily determine which type, and the number and suitable length, of such means that should be used for a particular project, and would know how to connect such means between the foregoing and/or other devices. Preferred cables for use in the systems and methods of the invention include a 50-foot cable set that is commercially available from Delta Sigma Corp. (Kennesaw, Ga.) (Part No. PWHDCB50), projector power cables (typically one per optical projector) that are usually supplied with projectors (InFocus, Wilsonville, Oreg.), power cables (typically one per computer) that are usually supplied with computers (Dell Inc., Round Rock, Tex.), power cables (typically one per monitor) that are usually supplied with monitors (Dell Inc., Round Rock, Tex.) and video cables (typically one per monitor) that are usually supplied with monitors (Dell Inc., Round Rock, Tex.).

Computer Mountings

The systems and methods of the invention optionally may include one or a plurality of movable or non-movable mountings, stands, tables and/or the like for the computers (or similar devices) and/or peripherals (keyboard, mouse, monitors and/or the like), which function to provide support therefore, and a place for them to rest at a position, height and/or location that renders them convenient for a user to use, and out of the way of projections being projected upon a three-dimensional object, part or skin being assembled, otherwise manufactured or processed in some way. It is preferable that the mounting be movable, for example, having wheels (as is shown in FIG. 1 and FIG. 2), so that the user can conveniently move the computer and/or peripherals around to a variety of different locations within an assembly, manufacturing, work or other area, location and/or environment.

Measurement (and Other Input) Devices and Fasteners

Various means may be employed in connection with the systems and methods of the invention to connect or attach various component parts and/or surfaces of a three-dimensional object, part or skin that is being assembled, manufactured or processed in some way together, such as various glues (and other adhesives or bonds), cements, fasteners, bolts with nuts or nut plates, nails, screws and/or the like, of various sizes, types and/or configurations, which may vary according to a particular object, part or skin being produced or processed, and which may readily be determined by those having ordinary skill in the art using the information that is provided herein.

When a three-dimensional object is being assembled or manufactured using, for example, bolts with nuts, or nut plates (nuts that are generally glued to an internal surface or structure of an object being assembled), or fasteners, the systems and methods of the invention preferably include one or a plurality of means for measuring hole depths of pre-drilled or other holes that may be present in the object, part or skin to determine proper bolt and/or fastener lengths, for example, a grip gage (grip gun), which means are commercially available from sources that are known by those having ordinary skill in the art. Preferred grip gages, and corresponding cables and hardware, for use in the systems and methods of the invention are commercially available from Delta Sigma Corp. (Kennesaw, Ga.) (Part No. PWHDGG1—POE Grip Gage with cables and all necessary hardware, or Part No. PWHDPG1—POE Plunge-Style Grip Gage with cables and all necessary hardware). One of these types of grip gages is generally operably connected to a computer with the use of a serial cable by plugging the serial cable into a serial port of the computer, and typically requires that a serial card also be inserted into the computer (which generally comes from the manufacturer or distributor along with a grip gage). The other of these types is generally connected with a computer by plugging a connecting cable into the computer's USB port. Another type of a grip gage that may be employed in the systems and methods of the invention is one that performs the same function, but that uses a power-over-ethernet connection (cable) to connect to the computer, which could use a commercially-available CAT6 network cable, rather than a serial or USB port. Yet a further type of grip gage that could be employed is one that performs the same function, but that is wireless and, thus, requires no cables attached to the grip gage (or otherwise), which cables are often tripping hazards for workers. Such a grip gage generally would not have any cables attached to the device (or otherwise), and would have a wireless adapter installed in the computer. As is apparent from the foregoing, a wide variety of grip gages and similar devices may be employed in the systems and methods of the invention.

While a grip gage is an optional feature of the systems and methods of the invention, it is typically required when fasteners are to be installed into an object, part or skin that is being assembled or otherwise manufactured (to connect various component parts of the object, part or skin together). The maximum fastener size that typically may be employed is about ½" diameter×about ¼" long, and the minimum fastener size that typically may be employed is about ¼" diameter×¼" long, with the use of smaller or larger fasteners also being possible. The head configuration of such fasteners generally has no restrictions and can be, for example, a hex head, a socket head cap screw, a countersunk, or the like, all of which work well, and do not affect grip gages.

When a three-dimensional object, part of skin is being assembled using nails and/or screws, generally there would not be a grip gage involved in the process. In such a situation, a spot would most likely be projected by the one or plurality of optical projectors on the object, part or skin along with some text informing, illustrating or showing a user the location(s) at which to insert a nail or screw (or similar device), and there generally would not be any restrictions on diameter and/or length of the nail or screw.

When a three-dimensional object, part of skin is being assembled using glue (or the like), generally a line that is a specific length, width and shape (i.e., straight, curvilinear, wiggly, curved and/or the like) would be projected on the object, part or skin that shows the user the location at which to apply a bead, strand or other application of the glue, and a grip gage would not need to be used.

Further, if it is desired or necessary to measure the conductivity of one or a plurality of surfaces of a three-dimensional object, part or skin, or the thickness of a coating that is present thereon, the "spots" projected on the object, part or skin and the text would generally inform a user of the location at which to place the applicable measurement device (thickness or conductivity). When the user places it at the indicated location and triggers the measurement device, a reading would generally be sent back to the computer. Some aircraft parts have a conductive coating sprayed on them and, for quality assurance reasons, a conductivity meter (gage) is used to ensure that the coating is conductive and, therefore, thick enough. These measurements are typically made in the same location for each of the same object, part of skin that is made. This tool could project a "spot" onto the part where the measurement should be made.

Figure 4:
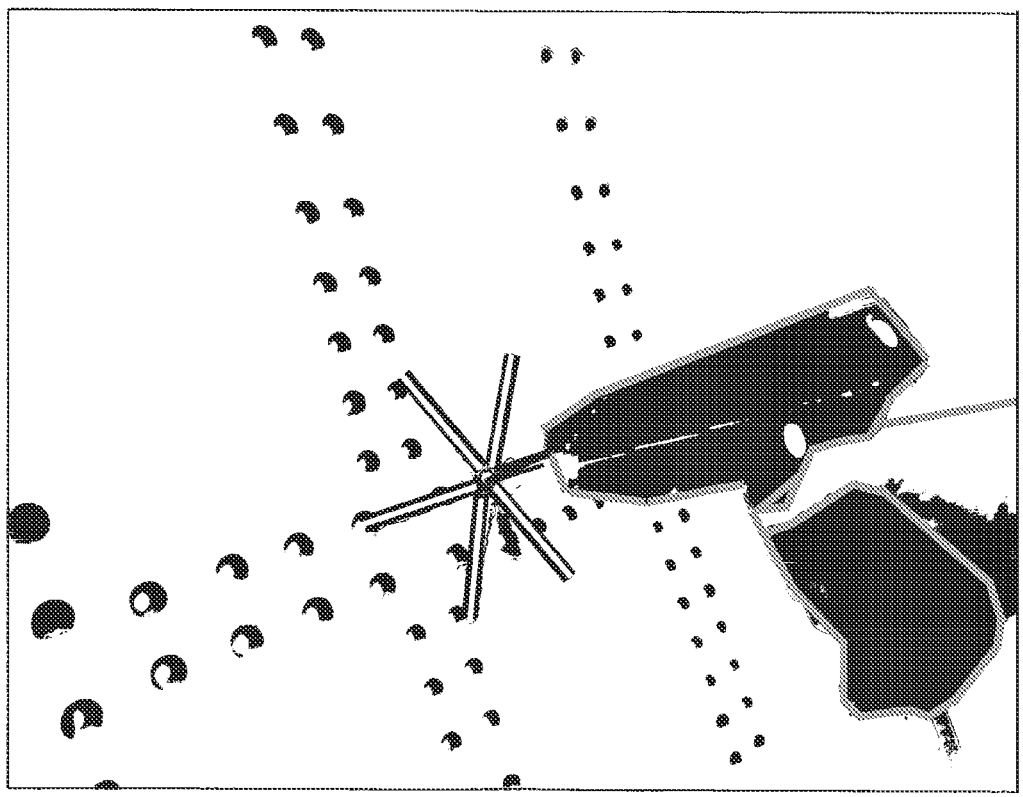
FIG. 4 is a photograph of a grip gage being inserted into a pre-drilled hole shown in FIG. 3.

Grip gages generally operate in the systems and methods of the invention in the manner that is shown in FIGS. 2-3. FIG. 3 shows a starburst pattern that is projected by an optical projector onto a pre-drilled hole (present in an object or part) that is to be measured, and FIG. 4 shows a grip gage that is placed into a hole shown in FIG. 3 in a manner that its three "feet" are in contact with a surface of an object being assembled.

A grip gage generally includes a relatively long probe, for example, one that is about 1.5" inched long, having a relatively blunt hook on its end that is placed through the hole, extending through it and out its back.

In operation, a user squeezes a handle that is present on a grip gage until the hook on the probe is pulled inward and contacts the back of the object. Once the handle "clicks," the computer that the grip gage is connected, and can exchange data, with reads circuitry that is present inside of the grip gage to procure a thickness reading of the skin of the object (or other surface or part of the object), which typically correlates with fastener length. If the thickness reading is within a particular tolerance band (as opposed to not being within the tolerance band), the starburst pattern shown in FIG. 3 generally advances to the next pre-drilled hole, and the grip gage is moved to that location to measure the skin thickness (fastener length) in connection with that hole. If the measurement is out of the tolerance band, the starburst turns red, and does not advance to the next hole. (Many product manufacturers will specify to assembly technicians that the thickness of a skin of a particular product (or component or surface thereof) must be at least about X inches, but no thicker than about Y inches, which is a "tolerance band" for the particular product.) When a user measures fastener length in this step, the user is effectively measuring skin thickness. Because the skin on, for example, the vertical tails of F-22 aircrafts is typically a graphite composite layup, its thickness can vary, and should be measured. (A composite layup is made up of numerous layers of fiberglass cloth and resin, which typically gets compressed and heated into a rigid skin. Because it is a layup, it can have a thickness variation.) Thus, if the thickness that is measured falls within this tolerance band, it is said to be intolerance. If it is outside this tolerance band, it is out of tolerance. The user can then push the yellow (or other) button on the grip gage to repeat the measurement. Alternatively, the user can press the red (or other) button on the grip gage to advance to the next hole, and the Operator Assembly Software Tool that is described herein will automatically save this out-of-tolerance hole information to the computer. The user can subsequently view all of the holes that were out of the tolerance band (i.e., at the time that the user starts to insert fasteners into the holes).

A wide variety of other measurement and/or input devices can, optionally, be employed in the systems and methods of the invention, preferably in a manner that permits the computer(s) to interface with the devices (i.e., to be able to transfer information between the two), so that they can accept input information from the devices and/or that information can otherwise be exchanged between the programmable computers and the devices. Examples of such other devices include devices that measure weight, depth, angles, size, shape, width, and the like, for example, continuity checkers, depth gages and/or the like.

Computer Software

The computers that are included or employed in the systems and methods of the invention include one or more different computer software programs, which function in the manner that is described herein, and which may be procured from sources that are known by those having ordinary skill in the art and/or written by computer programmers having ordinary skill in the art using the information, drawings and source code that is described, and provided, herein in great detail.

When writing a computer program, a programmer typically tries to solve a particular problem by, for example, understanding the problem, breaking the problem into manageable units, designing a solution, considering alternatives to the solution, refining the solution, implementing the solution (by writing a program in the form of code), and testing the solution, fixing any problems. When developing software, separate pieces are generally designed that are responsible for different parts of the solution, and then are subsequently put together. A program is written in a particular programming language, such as Java (an object-oriented programming language in which objects are the basic pieces that make up a program), Ada, C++, C#, Pascal or Smithtalk, which typically employ specific words and symbols to express the problem solution. Different programming languages define different sets of rules that determine exactly how a programmer can combine the words and symbols of the language into programming statements (instructions that are carried out when a program is executed).

Four general categories of programming languages currently exist, and include machine language, assembly language, high-level languages and fourth-generation languages. In order for a particular program to run on a computer, the program must be in the computer's machine language. Each type of a CPU typically has its own machine language. Because machine language code is expressed as a series of binary digits, such code is difficult for human beings to read and write. While assembly language, which employs relatively short words that represent commands or data, is significantly easier for programmers to use, a program in this language cannot be executed directly on a computer. It first needs to be translated into machine language. Most programmers employ high-level language, such as Java, Ada, C++, C# and Smithtalk, to write software, which employs phrases, and is relatively easy for programmers to read and write, but must also be translated into machine language before it can be executed, for example, using a compiler and/or interpreter. A wide variety of commercially available Software Development Kits (SDKs) are often used by programmers to develop software, such as the Java Software Development Kit, which includes a compiler, an interpreter, and several other software tools that may be useful for a programmer, and may be downloaded at no cost from the Sun Microsoft web site java dot sun dot com. In addition, Integrated Development Environments (IDEs), programs that combine an editor, compiler and other Java support tools, may be used by programmers to support a development of Java programs. One of these programs, known as NetBeans, incorporates the development tools provided by Java Software Development Kits, into one convenient GUI-based program, and may be downloaded at no cost from the web site netbeans dot org. A similar Integrated Development Environment (IDEs) that is called Eclipse, and is promoted by IBM, may be downloaded at no cost from the web site eclipse dot org.

A wide variety of computer software programs and operating systems that may be employed in the systems and methods of the invention are commercially available from sources that are know by those having ordinary skill in the art, such as Microsoft Corporation (Redmond, Wash.), Dell, Inc. (Round Rock, Tex.), Apple Computer. Inc. (Cupertino, Calif.), Hewlett Packard Company (Palo Alto, Calif.), Delta Sigma Corp. (Kennesaw, Ga.), and similar computer software supply (or other) companies, and/or may be written by computer programmers having ordinary skill in the art. The present in invention is not limited to any particular type, number or version of computer software programs or operating systems, or to any particular manufacturer or distributor of computer software or operating system. As is well known by those having ordinary skill in the art, more than one computer software program, or version thereof, and often a wide variety of computer software programs, and versions thereof, or combined software programs, may be used to perform the same function on, or in connection with, a computer. Also, computer software programs that may retain the same function are often routinely or continuously updated or enhanced, sometimes with the use of "plug-in" or "add-in" computer code and/or with other enhancements, additions, deletions and/or substitutions to existing code. Thus, any type and number of computer software programs and/or operating systems may be employed in the systems and methods of the present invention, as long as they have an ability to perform the functions that are described herein, and such computer software and operating system may be procured from any known (or other) computer software manufacturer or distributor or store or generated by a computer programmer having ordinary skill in the art. Further, additional computer programs may be employed in the systems and methods of the invention, as long as they are compatible with computer programs that are required for the invention to properly operate, which may be determined by those having ordinary skill in the art.

There are several general categories of computer software that may be employed in the systems and methods of the invention. Programming software generally come in forms of tools that assist a programmer in writing computer programs (sets of logical instructions that make a computer system perform certain tasks). The tools that help the programmers in instructing a computer system include text editors, compilers and interpreters. System software helps in running the computer hardware and the computer system, and is a collection of operating systems; devise drivers, servers, windowing systems and/or utilities. System software helps an application programmer in abstracting away from hardware, memory and other internal complexities of a computer. Application software enables the end users to accomplish certain specific tasks. Business software, databases and educational software are some forms of application software. Different word processors, which are dedicated for specialized tasks to be performed by the user, are other examples of application software. Inventory management software helps an organization in tracking its goods and materials on the basis of quality, as well as quantity. Warehouse inventory management functions encompass the internal warehouse movements and storage. Inventory software helps a company in organizing inventory and optimizing the flow of goods in the organization, thus leading to an improved customer service. Utility software helps in the management of computer hardware and application software, and performs a relatively small range of tasks, such as disk defragmenters, systems utilities and virus scanners. Data backup and recovery software provides functionalities beyond simple copying of data files. This software often supports user needs of specifying what is to be backed up and when. Backup and recovery software generally preserve the original organization of files, and allow an easy retrieval of the backed up data. Installation software functions to prepare an application (software package) to run in a computer. Typically combined with the application it is installing, the install program creates a folder with a default name on the hard disk and copies the application files to that folder. The complete installation package is generally either an Internet download or on a CD-ROM, DVD-ROM or a diskette. Application files are generally compressed in the package, and the install program decompresses them into their original format and respective folders. With Windows applications, the install program often adds or updates extensions to Windows that reside in the Windows folder. It is also customary for the install program to deposit an uninstall option so the application can be easily removed later on. Install programs may also be used to attach a new peripheral device to a computer. The install program may add the device's driver to the operating system, or it may be used to set or reset parameters in an updatable memory (flash memory, EEPROM, etc.) on the expansion board that has been plugged in. Security software provides some measure of security from attack to a an individual computer, or a computer that forms part of a network, and the data present therein. Document display software functions to display text documents on a display screen, so that they can be read and/or modified. Networking software, such as Microsoft Outlook and Internet Explorer, function to permit communication over a network via email, internet and/or the like, and/or allow a user to perform network maintenance, troubleshooting and/or setup. Computer configuration software functions to configure a computer for usage, for example, setting up graphics cards, performing maintenance, such as cleanup and/or error detection on hard drives, and/or to install, configure and/or uninstall other hardware components on the computer. Database software development software functions to create, maintain and/or query databases that can be used as standalone databases and/or have them incorporated into one or more other software programs. Software development software functions to permit a user to write one or more software programs that will run (execute) on one or a plurality of different software programs, such as the Authoring, Configurator and/or Operator Assembly Software Tools that are described herein, which were written using Microsoft Visual Studio 2008.

The computer software that is employed in the systems and methods of the invention performs necessary or desired adjustments, translations and/or transformations to data, so that a projected image onto a three-dimensional object, part or skin preferably appears undistorted, and should be installed on a programmable computer. One preferred embodiment of this software includes three separate software tools (or software components) as are described below, and as are illustrated in the flowcharts that are present in FIGS. 21, 22 and 23. The source code for these three separate components is described herein, and is provided herewith. Detailed information about this source code is present towards the end of this document.

(i) an Authoring Assembly Software Tool ("Authoring Tool")—Used to define what needs to be done, such as design a particular assembly, manufacture or other process in a step-by-step manner. For example, this tool permits a user to initially set the system up by inputting a series of manufacturing or assembling steps into the computer(s), creating the steps that are required to manufacture or assemble a particular three-dimensional object, part or skin;

(ii) a Configurator Assembly Software Tool—Used to define how to do it. For example, this tool permits a user to properly configure the system by putting the manufacturing, assembling or other process steps created in the Authoring Tool into a logical, proper or "best" order for a particular manufacturing, assembly or other process (i.e., into a proper workflow), as well as to assign one or a plurality of optical projector(s) to the appropriate graphics output ports on the computer(s)); and (iii) an Operator Assembly Software Tool—Used by an operator to direct the optical projection process. For example, this tool permits an operator to execute the manufacturing, assembly or other process steps that were put into the logical, proper or "best" order using the Configurator Tool, by operating the system to optically project a series of ordered manufacturing, assembly or other instructions in the form of steps using text, images and/or symbols onto a three-dimensional object, part or skin being manufactured, assembled or otherwise processed.

One of the key features of the systems and methods of the invention is that when an assembly or other manufacture is being designed, all the details about how it will be assembled or manufactured are not needed. The Authoring Tool allows an engineer or other user to put all of the components into the project with all of the associated text, images and/or symbols, and without having to be concerned with, determine or evaluate, the number of optical projectors that will be required, where they will need to be located or positioned within a particular area, or even how many systems it will take for a particular job, such as manufacturing an entire aircraft.

The production department of a manufacturer (or other business) typically will take the project file from the Authoring Tool and load it into the Configurator. In the work cells for a particular process, a user will decide where optical projectors can be located, how many are needed to get a desired or good coverage of a three-dimensional object, part or skin, how many technicians will be used executing concurrent or separate process steps, and other such information. The Configurator Tool creates a file that can be run, for example, by a technician each time that the same three-dimensional product, or part thereof, is assembled, manufactured or otherwise processed.

The Operator Tool is very easy to run and requires practically no computer knowledge. An operator (system user) is led through, for example, a manufacturing, assembly or other process step-by-step in a logical or "best" order of steps with all of the programmed aids to help along the way, such as a video tutorial, and typically cannot change any step of the process.

The three software tools can be present in one computer program, in a series of two or more computer programs (in any manner desired), or the like, and can be installed together or separately on a single computer, or on separate computers. If installed on separate computers, the necessary or desired files can be transferred between the two or more computers using a means for transferring data and/or files between computers, such as a memory stick, a CD, a DVD or a floppy disc, or transferred over a network, if the computers are linked together.

Included herein is computer source code written in Microsoft Visual Studio C# that shows one solution for projecting three-dimensional projections using one or a plurality of optical projectors onto three-dimensional objects, parts or skins. The solution that is described below is one way of achieving such results, and these results could also be achieved by a computer programmer having ordinary skill in the art using different algorithms and/or computer languages, such as C, C++, Java, Fortran, Visual Basic, and the like, and is not limited to that which is shown below. The computer language selected was based primarily on the inventors' experience and preference, as none of these computer languages hold significant advantages over all of the other computer languages.

In order for the systems and methods of the invention to work, in addition to the computer hardware, peripheral devices, and optical projectors that are described herein, there must be a specialized software program written specifically for this purpose (or otherwise procured). An example of one such program (referred to as "code," or "source code") is included herein. This code is to be compiled from the source code into an executable code to be run on a computer using the computer operating system for which it is compiled.

The details of every aspect of how to accomplish the task of projecting three-dimensional text, graphics and/or symbols, and a combination thereof, onto three-dimensional objects, parts or skins in a substantially or fully undistorted manner, as is described herein, is included in the source code that is described herein, and provided herewith. Additionally, the following paragraphs provide a high level overview of that which is being accomplished in the programs. The necessary functions have been divided into three separate programs in this implementation, but all of those functions could have been put into one or two programs, or perhaps more than three. This is one example that is a matter of programming preference, and what is expected to be the most convenient to the particular user.

Define Geometry of Surface to Project on (Base Geometry)

It is first required that the three-dimensional geometry dataset of the surface(s) that will be projected upon by the optical projector(s) be supplied in a format that can be consumed by the computer code. This format is dictated by the source code author and programming language, and can vary depending upon how the source code is written. The contents of this three-dimensional geometry is created or generated by a third party (or other) three-dimension modeling tool, such as Catia (Computer Aided Three-dimensional Interactive Application) or Solid Works. This file is preferably exported from the three-dimensional modeling software in an .STL format, but the format required is dictated solely by how the source code requires it. The software also provides a means to create simple planar surfaces to use as projection surfaces if CAD (or similar) data is not available or required.

Define Geometry of What to Project (Annotated Geometry)

The second dataset that is needed in this example of three-dimensional projection using optical projectors is what is referred to as the "Annotated Geometry" file. This dataset file contains all of the information that is necessary to define what is projected onto the three-dimensional surface(s). This dataset can be built and then imported from a CAD (or similar) system, or it can be built within the software here. In examples used herein, fastener hole locations are being projected onto the three-dimensional surface. Holes are used only as an example. The projected features can be any desired geometry. The Annotated Geometry file for this type of dataset contains the X, Y, and Z location (point) in space of the hole, as well as the I, J, K orientation in space (normal vector) for each hole, which can be thought of as the definition of which direction the hole is facing. The format for this file is dictated by the source code Authoring Assembly Software Tool, and can vary for different implementations. The annotated geometry can be created or modified within the software tool.

Define Spatial Relationships Between Projectors and Objects (Calibration Step)

After these datasets are consumed or created within the source code described, and provided, herein, the next step in performing a three-dimensional projection is to determine where the three-dimensional object, or part, to be projected upon is located in a manufacturing, or any other, environment or location with respect to the one or plurality of optical projectors being employed. This is accomplished using a "Calibration" step. In this step, a series of points must be chosen from the Annotated Geometry file or the Base Geometry file that can be used as calibration points. These points are chosen in such a way as to insure that all geometric variances of the three-dimensional object, part or skin are calibrated. In other words, these points are chosen so that all of the visible corners and/or visible edges of the object, part or skin are calibrated, as well as any variances in depth. The example source code that is included herein has algorithms that require a minimum of 8 calibration points (8 or more calibration points, with no upper limit).

While it could be possible in other calibration methods that may be employed in connection with the systems and methods of the invention that as few as 3 calibration points could possibly be employed, it is typical in most calibration methods for most three-dimensional objects, parts or skins to employ from about 8 to about 10 calibration points. 3 calibration points can generally only be employed if the optical parameters are already known. If a user knows nothing about the target position, optical projector position, or optics, generally about 7 or more calibration points (and usually 8 or more) need to be employed. Some ambiguities can exist with 7 calibration points, and 8 calibration points will usually work over 99% of the time, and is thus preferred. However, if the optics were calibrated in a prior step, and there were certain constraints on the target position, it could be resolved in as little as 3 calibration points. In other words, 8 or more calibration points generally always work, but a lesser number of calibration points could work given the right set of conditions. The number of calibration points needed in a particular situation, and with respect to a particular three-dimensional object, part or skin, being projected upon varies in accordance with the complexity of the surfaces of the object, part or skin, being projected on (i.e., the greater the complexity (more variations) of the surface of the object, part, or skin, the more calibration points that typically may be desired or required). Thus, for some more complex three-dimensional objects, parts, or skins, for example, 20 to 30 calibration points may be desired or required. Typically, the greater number of calibration points that are employed, the longer that the systems and methods of the invention take to operate, but the less distorted a projected three-dimensional text, image or symbol, or combination thereof, will appear to the human eye when projected onto a three-dimensional object, part or skin (up to a certain number of calibration points). At some point, additional calibration points will not make much or any difference in the appearance of the projected material. Using the information that is set forth herein, a person having ordinary skill in the art can determine a suitable number of calibration points to employ in connection with a particular situation and three-dimensional object, or part, to be projected upon.

To perform the calibration, the optical projector is set up to illuminate the area of interest on a three-dimensional object, part or skin. The projector is essentially a second computer display (hereinafter referred to as the "Projector Display"), while the first display shows the software User Interface (hereinafter referred to as the "User Display"). The geometry to be calibrated is shown on the User Display. The software sequentially steps through the calibration points, highlighting each point. In the projected view, the user moves the cursor to the corresponding point on the actual three-dimensional object, part or skin, and clicks the mouse. The software captures the x, y·screen position of the mouse click (hereinafter referred to as "the projected point"). This point represents the projection of the actual three-dimensional point onto the projector's image plane, and it's conversion into the digital graphics coordinate system.

The projected point, along with the three-dimensional coordinates of the actual point, define a point correspondence. Using a set of these point correspondences (minimum of 8), it is possible to calculate the location and orientation of the projector (or multiple projectors) within the geometry's coordinate system, and to calibrate the projector's optics, including focal length, lens distortion, optical center and scaling. The result of this calibration is a graphical transformation matrix, which can then be used to accurately draw within the geometry's coordinate system.

This transformation is now applied to the projected annotated geometry dataset and projected onto the actual three-dimensional object, part, or skin in true scale. If the projected image was viewed on a standard LCD type monitor, the geometry would appear to be distorted due to the transformation, but on the three-dimensional object, part or skin, the geometry is drawn accurately, undistorted and in true scale.

The calibration procedure that is described herein for a use with the systems and methods of the invention may be performed very rapidly (often in one minute or less by a few clicks of a mouse), and can last, for a particular optical projection, for a very long period of time, for example for a period of at least 2 years (and sometimes longer).

Further, in contrast with a manual calibration system, a user could use a vision calibration system with the systems and methods of the invention, which uses, for example, one or more machine vision cameras. It would work by using the cameras to identify known points or features on the three-dimensional object. Machine vision software packages, such as Cognex VisionPro, are commercially available, and have utilities built into them in which a Machine Vision Camera would take an image of a known object, and determine its orientation in space with respect to the camera by locating predefined features on the part. With this information, it is able to determine where in space, i.e. the coordinate system, the object is located and provide back to the systems and methods of the invention the same information determined by using a mouse method of calibrating. Other calibration systems could also be employed.

Provide Input Measurement Data (Optional Step)

At this point, the system of the invention now allows a user to collect information about the three-dimensional object, part or skin, based upon the points in the Annotated Geometry file. Examples of the type of information that can be collected about these points can include, but are not limited to, skin thickness at each projected point on the three-dimensional object, or part, surface conductivity at each point, coating thickness at each point, and/or the like. This information is collected, for example, using an external measurement device that is operably connected with the computer, such as a grip gage. Information that is sent from this collection device is stored along with the point geometry for future use by the source code. In the source code that is described, and provided, herein, this information is used to indicate to an assembly technician (or other system user) what type of fastener (out of possibly many different fastener types and/or lengths that may be used to manufacture a particular three-dimensional object, or part) should be placed into each of a series of pre-drilled or other holes (of any number) that are present in the three-dimensional object's or part's surface, and how long this fastener should be. Other implementations of this source code could use this information to perform various other tasks, and are not limited to fastener installation. Examples of additional or other implementations could include quality control for surface conductivity or coating thickness, application of external coatings, both visible and non-visible, locations for surface decals or paint features, installation of specific components, and/or the like.

Project Desired Information

After all of the inputs have been gathered, the data is processed and made ready to be displayed by the optical projector(s). The algorithms used are similar in concept to those used for making three-dimensional measurements with a camera, with an exception that the process is reversed. Rather than viewing the image of a physical object through a lens onto a CCD (charge coupled device), or another type camera image sensor, and then transforming that into a three-dimensional computer model, the system of the invention uses a similar process, but inverted, to take a three-dimensional computer model and place that on a LCD (liquid crystal display), or on another type device in an optical projector where it will be backlit and pass through a lens, such that it will conform to the physical three-dimensional object, or part, of the computer model.

Information that is helpful in understanding the discussion above, and the source code described, and provided, herein is present in Dave Schreiner, *OpenGL Reference Manual, The Official Reference Document to OpenGL, Version 1.4* ($4^{th}$ Edition, Addison Wesley, 2004, ISBN: 0-321-17383-X); Dave Schreiner et al., *OpenGL Programming Guide, The Official Guide to Learning OpenGL, Version 2.1* ($6^{th}$ Edition, Addison Wesley, 2008, ISBN-13: 978-0-321-48100-9, ISBN-10:0-321-48100-3); Tom McReynolds et al., *Advance Graphics Programming Using OpenGL* (Morgan Kaufman Publishers, 2005, ISBN: 1-55860-659-9); Richard J. Wright Jr., et al., *OpenGL SuperBible* (Waite Press Group, 2000. ISBN: 1-57169-164-2); Robert M. Haralick et al., *Computer and Robot Vision, Volume 2* (Addison Wesley, 1993, ISBN: 0-201-56943-4); Berthold Klaus Paul Horn, *Robot Vision* (The MIT Press and McGraw-Hill Book Company, 1986, ISBN-13: 978-0-262-08519-7, ISBN-13: 978-0-07-030349-2); Matthew MacDonald, *Pro .NET 2.0 Windows Forms and Custom Controls in C#* (Apress, 2006, ISBN: 1-59059-439-8); Leonid Yaroslavsky et al., *Fundamentals of Digital Optics* ($1^{st}$ Edition, Birkhauser Boston, 1996, ISBN-10: 0817638229, ISBN-13: 978-0817638221); E. R. Davies, *Machine Vision, Third Edition: Theory, Algorithms, Practicalities (Signal Processing and its Applications)* (Morgan Kaufmann; 3rd Edition, 2005, ISBN-10: 0122060938 ISBN-13: 978-0122060939); Daniel Malacara, *Optical Shop Testing* (3rd Edition, John Wiley and Sons, 2007, ISBN: 978-0-471-48404-2); Karl Dieter Moller, *Optics Learning by Computing, with Model Examples Using MathCad MATLAB, Mathemarica, and Maple Springer* 2007 (2nd Edition, Springer, 2006, ISBN: 978-0-387-26168-3); Nikos Paragios, et al., *Handbook of Mathematical Models in Computer Vision* (1st Edition, Springer, 2006, ISBN: 0-387-26371-3); E. R. Davies, *Machine Vision. Theory, Algorithms, Practicalities* ($2^{nd}$ Edition. Academic Press, 1997, ISBN: 0-12-206092-X); Robert E. Fischer et al., *Optical System Design* (2nd Edition, SPIE Press, 2008, ISBN: 978-0-07-147248-7); Eric White, *Pro .NET2.0 Graphics Programming* (Apress, 2006, ISBN: 1-59059-445-2); Wilfried Linder, *Digital Photogrammetry* ($2^{nd}$ Edition, Springer, 2006, ISBN: 3-540-29152-0); Paul R. Wolf et al., *Elements of Photogrammetry with Applications in GIS* ($3^{rd}$ Edition, McGraw-Hill, 2000, ISBN-13: 978-0-07-292454-1, ISBN-10: 0-07-292454-3); Gary Bradski et al., *Learning OpenCV* (1st Edition, O'Reilly): Gene Golub et al., *Matrix Computations* (2nd Edition, John Hopkins); and Gerald Farin, *Curves and Surfaces for CAGD, a Practical Guide* (1st Edition, Academic Press).

Authoring Assembly Software Tool

In the systems and methods of the invention, the actual assembly or manufacture instructions for assembling or otherwise manufacturing a particular three-dimensional object, part or skin (i.e., an assembly or manufacturing process in a logical step-by-step order, preferably of the "best" way to assemble a particular object, part or skin), such as an aircraft, or a wing or tail of an aircraft, are typically initially provided by the technicians that normally assemble or otherwise manufacture the particular object, part of skin, or by the engineers (or others) that designed the particular object, part of skin, and then programmed as a sequence of ordered assembly instructions (steps) into the computer. These instructions are used to initially (only the first time that an object, part or skin is assembled) setup the systems of the invention, using the Authoring tool, and must generally be provided by individual(s) that have knowledge about the particular item being assembled. In contrast, if the item were to be assembled manually (i.e., using blueprints, plans, instruction manuals, other paper documentation and/or computer screens), which may be hundreds of thousands of pages in length, such documents must be re-read each time that the item is assembled or manufactured, whether performed by a skilled technician or an unskilled technician, rendering such process extremely time-consuming, difficult, inefficient, and subject to a significant amount of human error.

Someone with no knowledge of the particular object being assembled in connection with the systems and methods of the invention would not have the knowledge required to design and create an assembly process for that object. Further, the person(s) who create the assembly, manufacturing or other process for a particular object will generally be one who is already skilled with respect to the particular object. The goal of this software is not to take someone who knows nothing about assembling, manufacturing or processing the object and have them create an assembly or manufacturing process for the object, but rather to have someone who has never assembled or otherwise manufactured the object execute the assembly or manufacturing process created, and perform the associated assembly or manufacture in much less time than would otherwise be required if the process was performed manually (i.e., without the systems and methods of the invention). For example, an object (or part) being assembled or manufactured may include several thousands of pre-drilled holes having a variety of different depths, and thirty different fastener part numbers may be required for use in various groups of different holes. The process assembly instructions can, thus, be set up to specify which fastener parts are to be used in which pre-drilled holes, and which fastener parts are to be used with specified groups of pre-drilled holes before other fasteners (i.e., steps and an order of assembly).

The Authoring Tool is used to create or read into the computers employed in the systems and methods of the invention the Base Geometry and Annotated Geometry for a particular three-dimensional object, or part, to be projected upon, and then create various frames that are needed to perform a single or multiple-step assembly, manufacturing or other process, with the number of frames being created corresponding with the number of assembly, manufacturing or other steps to be performed, for example, in the manufacture of the three dimensional object, or part, and each frame describing a separate step. The Authoring Tool generally does not perform any data manipulation (which generally does not occur until the calibration step in the Operator Tool).

Figure 5:
FIG. 5 is an illustration of a User Interface screen of an Authoring Assembly Software Tool ("Authoring Tool") that may be employed in the systems and methods of the invention. This screen shows "Base Geometry" and "Annotated Geometry" geometry options, as well as a series of icons at the top of the screen that permit different functions.

FIG. 5 is an illustration of a User Interface for an Authoring Assembly Software Tool (hereinafter "Authoring Tool") that may be employed in the systems and methods of the invention.

To start, the user launches the Authoring Tool by selecting on the main computer screen "Start," and then "All Programs," and then "Authoring Tool" (or by using a desktop short cut). The User Interface of the Authoring Tool is then used to create processes that may be needed or desired to assemble, manufacture, measure, or otherwise process a particular part.

Figure 6:
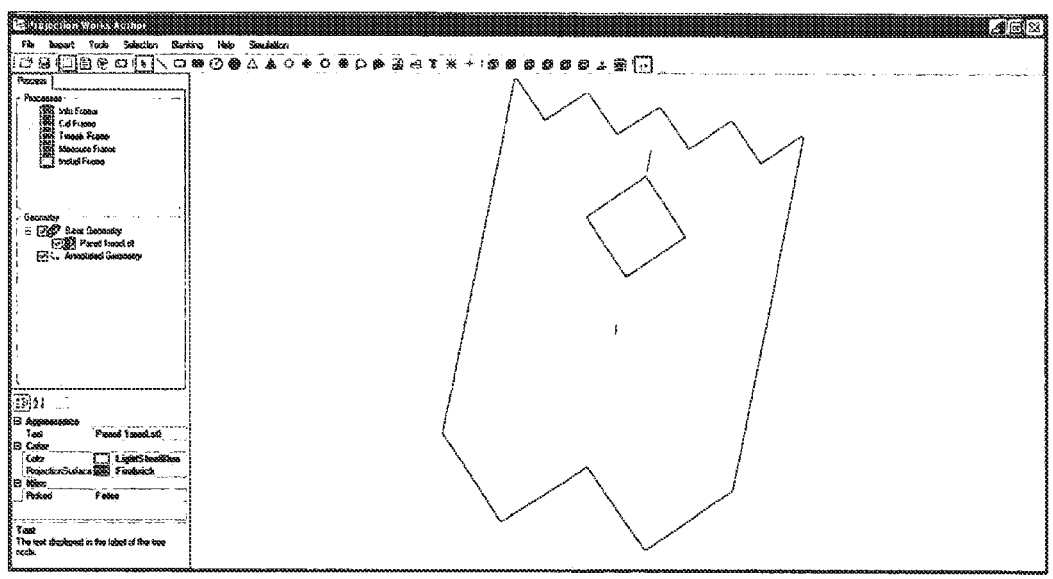
FIG. 6 is an illustration of a User Interface screen of an Authoring Assembly Software Tool ("Authoring Tool") showing a Base Geometry for use in manufacturing a three-dimensional object, or part. This figure shows schematically a setup of the system of the invention as it relates to a three-dimensional object, or part, that is being manufactured by a user.

A Base Geometry file should first be imported into the Authoring Tool. This may be performed by selecting, from the top level menu, "Import" and "Base Geometry." The Base Geometry file is a stereo lithography formatted file of the three-dimensional object, part or skin that will ultimately be used as the projection surface. This file is created or generated by a third party three-dimensional modeling tool, such as Catia (Computer Aided Three-dimensional Interactive Application) or SolidWorks. This file is preferably exported from the three-dimensional modeling software in .stl format for use by the Authoring Tool. Once imported into the Authoring Tool, the Base Geometry file will be displayed on the User Interface of the Authoring Tool, as is shown in FIG. 6.

Figure 7:
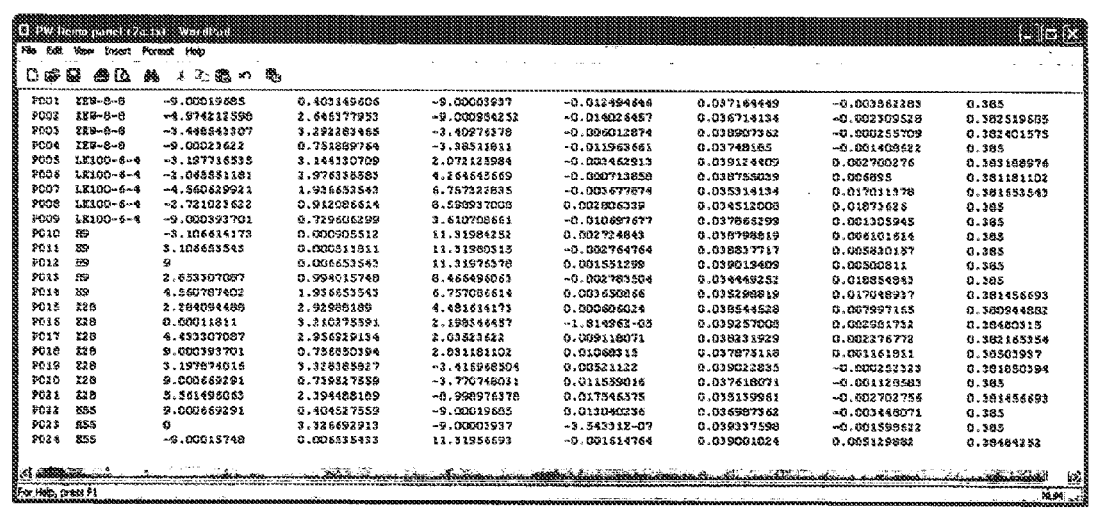

After importing the Base Geometry file into the Authoring Tool, an Annotated Geometry file should be imported into the Authoring Tool using "Import" and then "Annotated Geometry." The Annotated Geometry file is preferably generated by the same person who generated the Base Geometry file, but may be generated by a different person. The Annotated Geometry file format should be a comma, tab or whitespace delimited format. An example file is shown in FIG. 7. In this example file, each row represents a hole into which the Base Geometry panel (i.e., the actual part that will have a fastener inserted into it) should ultimately have a fastener inserted. Because the Base Geometry panel is three-dimensional, each hole in the annotated file should be defined in 3D. In this example file, the columns are defined as is shown in the table below.

| Column # | Definition |
| --- | --- |
| 1 | Hole ID |
| 2 | Fastener Part # |
| 3 | X Location of hole |
| 4 | Y location of hole |
| 5 | Z location of hole |
| 6 | I Component of normal vector of hole |
| 7 | J Component of normal vector of hole |
| 8 | K Component of normal vector of hole |

-continued

| Column # | Definition |
| --- | --- |
| 9 | Hole diameter |
| 10 | Additional Identifier |

The Annotated Geometry file should be a comma, tab or whitespace delimited and each line should define an object to be displayed. The order of the columns is not particularly important, but should be consistent from line to line.

Figure 11:
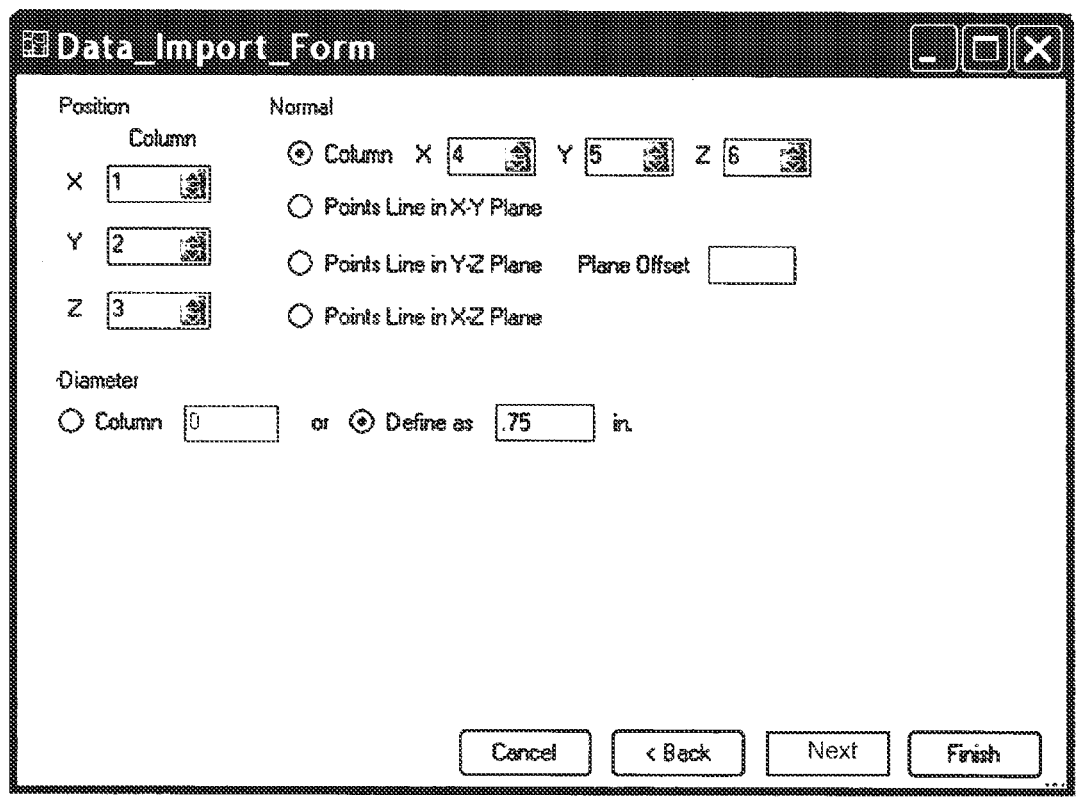
FIG. 11 is an illustration of a Data_Import_Form screen of an Authoring Assembly Software Tool ("Authoring Tool") in which a user may specify the columns in which the x, y and z position data for pre-drilled holes located in a three-dimensional object, or part thereof, to be assembled.

After "Import" and "Annotated Geometry" is selected, the user should be prompted to enter the delimiter type that is used in the file, as shown in FIG. 11. The example is a tab delimited file so the user would select "Tab" and then "Next". The user should then see the screen shown in FIG. 9. In this screen, the user should define the column location for the hole ID and fastener part # of the three-dimensional object (or part) being assembled or manufactured. In this example, these are located in columns 1 and 2 of the file, respectively. This information should be entered using a drop list marked "Column" located next to the ID and fastener part #label on the screen in FIG. 9. The user should set this drop list to the correct value that reflects the column location for each of these items.

Figure 9:
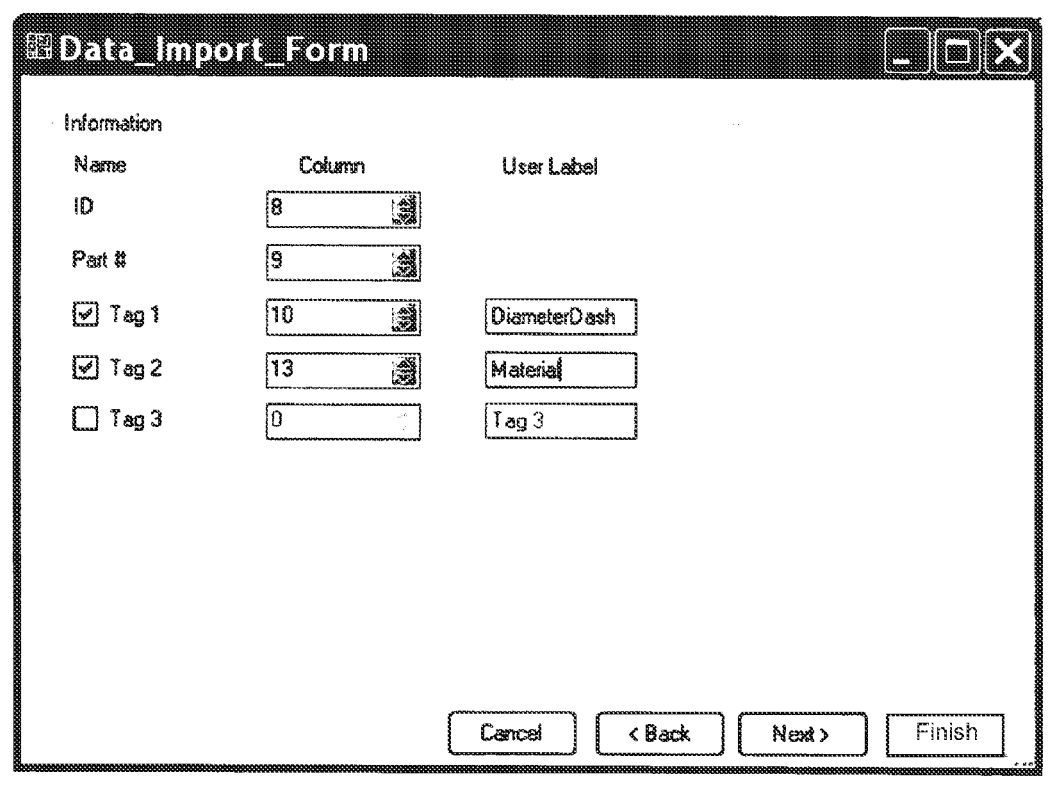

Additional fields may be supplied, as are shown in FIG. 9 to specify optional information that the user may have included in the Annotated Geometry file. The optional fields can be activated, for example, by selecting the checkbox next to tag 1, 2, or 3. When checked, the Column and User label field should become active. As before, the user should then specify the column in which this optional data should be located by setting the drop list to the appropriate column value. The user should also specify the User Label to be used when this data is displayed. If this data is to be used by the Authoring Tool as a default value for a fastener length or other variable, the "Default Measured Value" check box should be selected. This indicates to the Authoring Tool that the specified column contains a default value that should be used for the specified item unless it is overridden by a measured value. When the user has supplied all of the necessary information on FIG. 9, the "Next" button should be selected.

Figure 10:
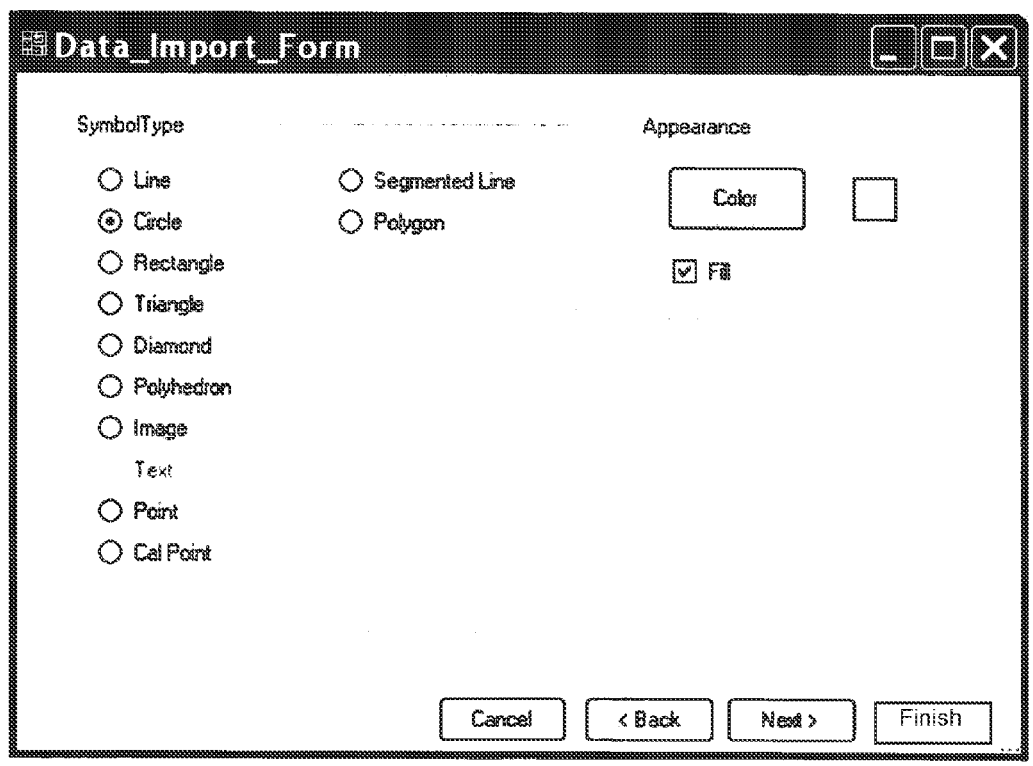
FIG. 10 is an illustration of a Data_Import_Form screen of an Authoring Assembly Software Tool ("Authoring Tool") in which a user may specify how the Annotated Geometry should be displayed in the systems and methods of the invention, for example, a circle in the color yellow.

The screen in FIG. 10 should be displayed next and allows the user to specify how the Annotated Geometry should be displayed. The user should select one of the options available within the "Symbol Type" area of the screen by selecting the push button next to the desired symbol type. Preferably, only one selection is allowed. The user also has an ability to select the color that should be used when displaying the symbol, and whether the symbol should be filled with color by selecting the "Fill" checkbox or whether it should be outlined by leaving the "Fill" checkbox unchecked. The "Fill" option should have no effect upon Lines, Segmented Lines or Cal Points. Once the user specifies the "Symbol Type" and the color, the "Next" button should be selected.

At this point the screen in FIG. 11 should be displayed. The user may use this screen to specify the columns that the x, y, and z position data for the hole are located in. As in the previous screen, the user should select the column location using the drop lists that correspond to each position variable on the "Position" frame of the window in FIG. 11. The user should also specify the column location for the normal vector of the hole on the "Normal" frame of this same window. The user should also have an option of specifying if the 3D data should be displayed in a 2D plane. If the X-Y Plane option is selected, all points should be projected onto an XY plane. If the Y-Z Plane option is selected, all points should be projected onto an YZ plane. If the X-Z Plane option is selected, all points should be projected on the XZ plane. The user can also specify an offset for the plane, which should indicate that the selected Plane will be offset from its zeroed location by the amount entered into the "Plane Offset" text field. Once the user has entered all of the data for each required field, the "Finish" button can be selected. This should finish the Annotated Geometry input, and pull all of the data into the Authoring Tool, and the User Interface for such software should be displayed.

Figure 12:
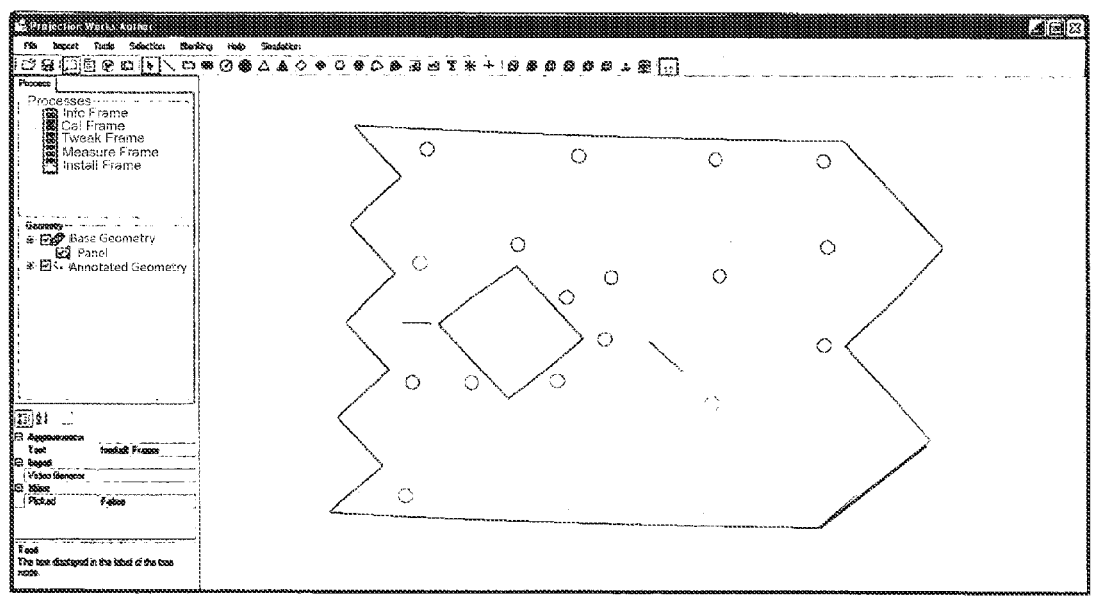
FIG. 12 is an illustration of a User Interface screen of an Authoring Assembly Software Tool ("Authoring Tool") showing a Base Geometry having Annotated Geometry data displayed over the top of it (i.e., having the Annotated data overlayed onto the Base Geometry), for use in assembling a three-dimensional object, or part.
Figure 13:
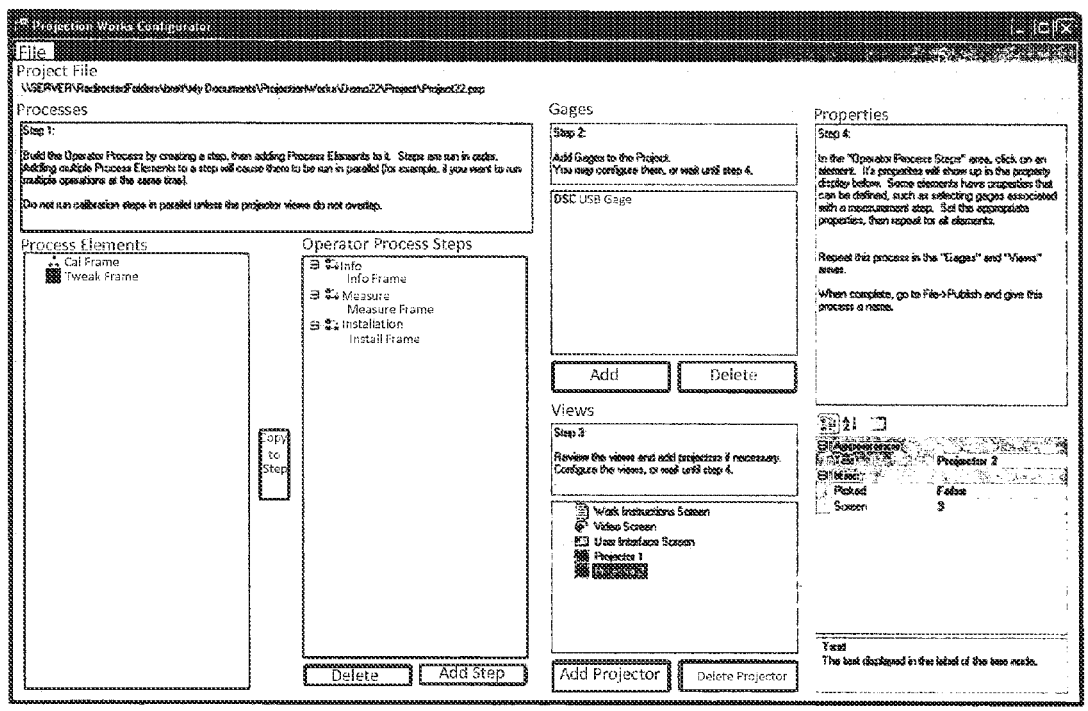
FIG. 13 is an illustration of a User Interface screen of a Configurator Assembly Software Tool ("Configurator Tool") that permits process elements to be placed together to form a series of ordered process steps, such as a series of assembly steps in a step-by-step logical order for conducting an assembly or other manufacture (or other process).
Figure 14:
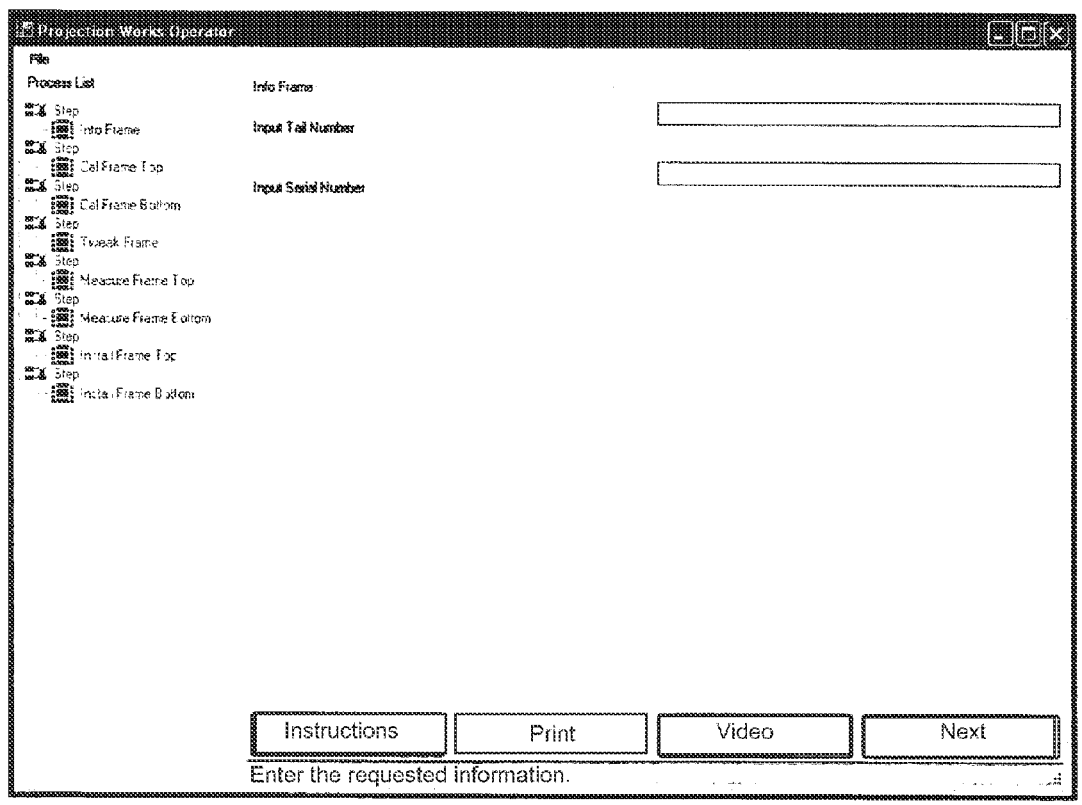
FIG. 14 is an illustration of a User Interface screen of an Operator Assembly Software Tool ("Operator Tool") that is used to run the actual assembly sequence (series of ordered process steps) created using the Authoring Tool and the Configurator Tool for a three-dimensional object, or part, to be assembled or otherwise manufactured.

All of the data import screens that are illustrated in FIGS. 11, 12, 13 and 14 preferably have a "Cancel" button located on them. If a user selects this button, the import operation should be canceled and the window should close. In FIGS. 12, 13 and 14, the user has an option of selecting a "Back" button, which should close the current screen and take the user back to the previous screen. At that point, the user should be able to change the selections if needed before proceeding forward.

At this point, the screen shown in FIG. 12 should be shown, which is typically the main User Interface screen of the Authoring Tool. The Base Geometry should be shown with the Annotated data displayed over the top of it. At this point, the user should now be able to start to enter a plurality of process frames that are needed or desired to perform a particular assembly, manufacture or other process.

Along the left hand side of the User Interface of the Authoring Tool (FIG. 12), there is a framed panel called Processes. By right (or other) clicking a mouse in this window, the user is able to add a process frame to an assembly process being created. Preferably, there are five types of process frames that can be added as follows: (i) Information; (ii) Calibration; (iii) Tweak; (iv) Measurement; and (v) Installation. Multiple frames of each type preferably can be added. A description of the purpose of each frame type follows below, while details of the actual usage of each frame will be discussed in the Operator Assembly Tool sections.

The "Information" frame should prompt the end user running an assembly, manufacturing or other process to enter a wide variety of desired information about an object that is being assembled, otherwise manufactured or processed. For example, if a vertical tail for an aircraft is being assembled, information such as the aircraft vertical tail serial (or other) number, and assembly information for the object, such as date, and the like, may be entered. This information may be used, for example, for creating a log, preferably of all of the objects that are made whenever a final assembly process is executed using the Operator Assembly Tool.

The "Calibration" frame may be used to specify the calibration points that are used to perform the software alignment of the imported data, so that the projected image of the annotated points correctly line up with the actual points on the projection surface. Preferably, a plurality of calibration points are employed for performing a successful calibration, with a minimum of eight calibration points being more preferred. The number of calibration points that should be employed may vary (be smaller or larger) in accordance with a complexity of a 3D projection surface being employed. Calibration points should be chosen so that they are spread out over the entire surface of the object, and are not all concentrated in one area. These points should also be selected so that they are not all linear, and they should be chosen in such a way as to ensure that depth of the object is adequately covered. Thus, on relatively complex surfaces, it is entirely possible to have 20 or more calibration points. Typically, the more points that are selected, the better the calibration will be. Care should be taken to select an appropriate number of calibration points, which may readily be determined by those having ordinary skill in the art. The actual calibration step, which is preferably performed in the Operator Assembly Tool (discussed hereinbelow), will preferably finish by displaying all of the annotated points after they have been calibrated. At that point, if these points align with the actual points satisfactorily, then a suitable number of points have been selected. If they do not, it may be necessary to come back to the User Interface of the Authoring Tool and select additional calibration points.

The "Tweak" frame will preferably allow the end user using the Operator Assembly Tool to perform relatively minor adjustments to the projected image by shifting it up/down or left/right in order to align the projected image of the annotated points to line up with the actual points on the projection surface. The reason that this may be required is that a part locator that is used to hold a part in front of the projector(s) does not always index in the exact same location each time.

The "Measurement" Frame is preferably used to guide the user in the measurement process. This frame contains the information regarding which holes should be measured. The holes which require measurement will be identified in this frame for later use in the Operator Tool (discussed hereinbelow).

The "Final Process" frame that is preferably available for use is an Installation Frame. This frame preferably uses data that is collected in the measurement process to guide the user through the installation of the appropriate fasteners.

Along the top of the User Interface of the Authoring Tool (FIG. 12) is preferably a plurality of buttons including various icons. These buttons preferably provide shortcuts and/or additional functionality for the user. The first one shown is the standard "File Open" windows icon, which should display the standard Windows file open dialog box, used to open files stored on a disk (or otherwise). The second one preferably is a standard Windows save file icon which appears as a computer floppy disk (or otherwise). This should save the contents of the currently opened file to disk (or otherwise) when selected. The third button, whose icon preferably is the xyz axis with a part displayed, is for showing the geometry screen in the User Interface of the Authoring Tool. The fourth button should display a "work instructions" screen when selected. The fifth button should display a video screen, while the sixth button should display the user interface.

The following nineteen buttons shown in the User Interface of the Authoring Tool (FIG. 12) are drawing related buttons. The first of these buttons, which is shown as the 7' button in the row, preferably is the standard Windows pointer button which, when selected, will change the cursor back to the standard Windows arrow shaped pointer used for selecting items on the screen. The second of these buttons (the 8th button shown) preferably will allow the user to draw a line on the screen where the geometry is displayed. The next two buttons ($9^{th}$ and $10^{th}$ buttons shown) preferably will draw an outlined and filled rectangle. The following two buttons (the $11^{th}$ and $12^{th}$ buttons shown) preferably will draw an outlined and filled circle. An outlined or filled triangle preferably is drawn using the next two buttons ($13^{th}$ and $14^{th}$ buttons shown), and the following two buttons ($15^{th}$ and $16^{th}$ buttons shown) preferably draw an outlined and filled diamond. The following two buttons ($17^{th}$ and $18^{th}$ buttons shown) preferably draw outlined and filled hexagons, while the following two buttons ($19^{th}$ and $20^{th}$ buttons shown) preferably draw an outlined and filled polygon.

Additional items that may be placed on the projection surface are preferably made available as buttons next to the shape drawing buttons. For example, the $21^{st}$ button shown preferably allows the user to place an image onto the geometric surface, and the $22^{nd}$ button shown preferably allows a user to place a video onto any one or more of the display screens that are connected with the computer(s). The video can, for example, be placed on the projector screen to get projected onto the object, or onto one or more monitor screens. This may be performed by adding the video, using this button, to one of the frames. When the displays are assigned in the Configurator Assembly Tool (discussed below), the video will be shown on whatever display was assigned. Usually, the Work Instruction or User Interface are assigned to one of the computer monitor displays. Text preferably can be placed onto the projection surface by selecting the $23^{rd}$ button shown, and calibration points are preferably placed on the projection surface using the $24^{th}$ button shown. A point shape preferably can be placed onto the projection surface using the $25^{th}$ button shown.

The properties for some or all of the foregoing items preferably can be changed once they have been placed onto the projection surface by using, for example, an Appearance window, which in FIG. 12 is located in the lower left corner of the User Interface of the Authoring Tool. Parameters that preferably can be changed include fill color, text, filenames for images, video and/or the like.

The next seven buttons that are shown in FIG. 12 preferably allow the user to choose to display the base geometry on the User Interface of the Authoring Tool. When displayed using, for example, the first six of these buttons, the image is preferably displayed as a 3D object. The first of these buttons (the $26^{th}$ in the row shown) preferably displays the object as if the user is looking at it from the front. The next button (the $27^{th}$ in the row shown) preferably displays the object as if viewed from the back. The next button (the $28^{th}$ in the row shown) preferably shows a view of the object from the right, and the next button shown (the 29th in the row shown) preferably shows a view of the object from the left. Top and bottom 3D views are preferably shown using the next two buttons, the 30th and 31st buttons, respectively. The next button (32nd shown) preferably displays the 3D object in 2D, collapsing it onto a flat plane along the Z-Axis.

Along the top of the User Interface of the Authoring Tool preferably are a series of menu options (as is shown in FIG. 12). The first menu preferably is the standard Windows File menu which, when selected, preferably allows the user to perform one or more (and preferably all) of the following standard set of operations:
New: create a new file
Open: open an existing file that has been saved to non-volatile memory (NVM) (or otherwise)
Save: save the currently opened file to NVM (or otherwise)
Save As: save the currently opened filed to NVM (or otherwise) with the specified name
Export: creates and saves to NVM (or otherwise) the file which will be opened and used in the Configurator
Close: closes the currently opened file
Exit: terminate the application The next menu that is preferably available to the user is the Import menu (FIG. 12), which preferably allows the user to perform one or more (and preferably all) of the following Import operations:
Base: imports the Base Geometry (i.e., the 3D model to be projected upon)
Annotated: import the Annotated points (the points that get projected onto the Base Geometry)
Images: import images that are to be displayed as a part of the projected image with the Annotated Points The following Tools menu option (FIG. 12) preferably allows the user to:

Displays: identifies the Windows display number on the screen for each of the connected displays.

The Displays option allows the user to define which graphics port should be assigned to which "display." (The graphics ports are generally the number of video outputs on the computer(s).)

The following Selection menu option (FIG. 12) preferably allows the user to identify which of a following list of objects are selectable when they are present on the projection screen. These objects can be placed on the Base Geometry, as described, using the drawing buttons. Preferably, all objects are selectable by default, and selection can be disabled by un-checking the objects below on the Selection Menu:
STL: The Stereo Lithography Model
Plane
Line
Rectangle
Circle
Triangle
Diamond
Hexagon
Polygons
Image
Text
Calibration Point
Point (The term "selectable," as is used above, means that the user can select an object with, for example, a mouse by clicking on it, then changing its properties, moving it and/or deleting it. If the user has placed any of the above items onto the screen and made them un-selectable (by un-checking the checkbox next to them on the menu), then they generally cannot be modified, moved and/or deleted.)

The next menu option preferably is Blanking (FIG. 12). This menu option preferably give the user an ability to hide (i.e. not display) the same set of objects that are listed under the Selection menu option. All of these objects preferably are not blanked by default. To blank them, the user preferably checks the box to the left of the desired item in the menu.

The next menu option (FIG. 12) preferably is the standard Windows Help menu, which preferably provides the user with one or more (and preferably all) of the following menu options:
Contents: displays a table of contents for the Help file
Index: displays an index of the Help file
Search: allows a user to search the Help file
About: provides a user with information about the User Interface of the Authoring Tool, such as version number, release date, and copy write and patent information.

The following menu option is the Simulation option (FIG. 12). When selected, this screen preferably displays a simulated screen of how the currently selected frame will look in the Operator tool (discussed below).

While, as is discussed hereinabove, there are only five different choices in the "Processes" frame of the preferred embodiment of the Authoring Tool (Info, Calibration, Tweak, Measurement and Install), a user of the system may have numerous measurement steps, numerous install steps, and the like. Thus, if a user is employing this system to assemble a vertical stabilizer for an airplane, for example, the user could make a set of frames that cover those ordered steps that are required for assembling the top half of the vertical stabilizer (preferably in the best manner), and another set of frames that cover those ordered steps that are required for assembling the bottom half of the stabilizer (also preferably in the best manner). Then, using the Configurator tool, the user could make an assembly process that is for the top of the vertical stabilizer only, or make an assembly process that is for the bottom of the vertical stabilizer only, or make an assembly process that is for both the top and the bottom of the vertical stabilizer. All of this could be achieved by the user using only the two sets of frames that were originally created in the Authoring tool. In this manner, a user can make an assembly process for any object, any part thereof, or any portion or area of such object or part (top portion, bottom portion, side (left or right) portion, center portion and/or the like).

Configurator Assembly Software Tool

FIG. 13 is an illustration of a User Interface for a Configurator Assembly Software Tool ("Configurator Tool") that may be employed in the systems and methods of the invention. This User Interface can be employed by a user to create all of the process steps that may be required to perform a particular object assembly, manufacture or other operation, for example, to partially or fully assemble an entire object, or a part thereof, and preferably uses the process frames that are created by the user using the Authoring Tool.

To start, the user launches the Configurator Tool by selecting on the main computer screen "Start," and then "All Programs," and then "Configurator Tool" (or by using a desktop short cut).

The User Interface for the Configurator Tool show in FIG. 13 contains only one menu option along the top of the screen, which is "File." When the user selects "File," the user will be provided with four choices by this menu option:
1. Open Process Group
2. Publish Process
3. Edit Published File
4. Exit The Open Process Group choice allows a user to open a Process Group file that has been created and exported using the Authoring Tool.

The Publish Process Group choice allows a user to "Publish" a completed assembly or other process (in the form of a file). The resulting published file contains all of the necessary ordered steps that are required to assemble an object (or part), and can be used by the Operator Tool (as is discussed hereinbelow).

The Edit Published File choice provides a user with an option to edit a previously published Process. Changes made to the processed file typically do not get migrated back into the original file that was exported by the Authoring Tool. In order for changes to be included in this original file, the user should edit the original exported file using the User Interface of the Configurator and re-publish the completed process.

The Exit choice performs a normal Windows style of software exit, and terminates the User Interface of the Configurator.

As is shown in FIG. 13, four of the main frames that are present on the User Interface of the Configurator are:
1. Processes
2. Gages
3. Views
4. Properties Other frames include "Process Elements" and "Operator Process Steps."

Processes

The Processes frame, located in the upper left area of the User Interface, is used to build an assembly or other manufacturing or other process for a particular assembly, manufacture or other processing of a particular object (or part) using the Process Frames created in the Authoring Tool. When the user clicks on "File" and then "Open Process Group," the file exported by the Authoring Tool is then read into the Configurator Tool. All of the frames that were added in the Authoring Tool will typically then be displayed in the Processes frame.

The user should now decide: (i) what order the assembly or other process steps for the object being assembled or processed should follow (see "Operator Process Steps"); and (ii) the particular information that it should contain (see "Process Elements"). Typically, an assembly or manufacturing process (a sequence of steps in order) contains, at a minimum, the following information: Calibration, Tweak, Measure and Install steps. (There are 5 types of steps that can be added in the Authoring Tool: Information, Calibration, Tweak, Measurement, and Install. These steps are created inside the Authoring Tool. A user can add as many of these steps as is desired in the Authoring Tool, and then only select, and use, the ones that the user wants when building the Assembly Process in the Configuration Tool.)

To begin to construct the particular assembly or other process (series of steps in order), the user should select the "Add Step" button along the bottom of the "Operator Process Steps" frame on the User Interface of the Configurator Tool. This should result in a "step" being added to the "Operator Process Steps" frame. The user should now select, for example, using a mouse, the first frame (step) to use in the assembly or other process. This frame is then assigned to a step by selecting the desired step in the "Operator Process Steps" frame and clicking the "Copy to Step" button between the "Process Elements" and "Operator Process Steps" frames. This should copy this process frame to the selected step. If one or a plurality of additional steps are needed or desired, the "Add Step" button should be used to add the next step (or the user can right click on "Add Step"). The user should continue to add steps and assign "Process Element" frames to these steps until the full assembly or other process (all steps in order) is complete. The final assembly or other process, when executed using the Operator Tool, will then execute the steps in the order that they are in on the "Operator Process Steps" frame.

If needed, the user can delete one or a plurality of steps by clicking on the step to be deleted, and then selecting the "Delete" button under the "Operator Process Steps" frame (or by right clicking on "Delete"). This will remove the step from the Operator Process Steps frame.

Gages

Once all of the assembly, manufacturing or other process steps have been created and ordered in the "Operator Process Steps" frame, if one or more measurement devices, such as a grip gage, is going to be employed during the object assembly, manufacturing or other process, the user should now create one or a plurality of measurement gages in the "Gages" frame of the User Interface of the Configurator Tool. This can generally be accomplished by selecting the "Add" button on the "Gages" frame. The user will then generally be presented with a window used to select a type of gage to add, such as a "Serial Port" gage, a "USB" gage, or some other type of a gage. The type of gage selected by the user should match the physical gage that is to be used with the system (if one will be used). Further, the number of gauges created using the "Add" button must generally also match the total number of gages that will be used with the system.

Views and Properties

Once gages have been added, the user should configure the "Views" that will be used for the particular assembly, manufacturing or other process being employed (define which graphics output (or other) port(s) present on the computer monitor(s) that the Work Instructions, Videos, User Interface, optical projector(s) and/or the like will be assigned to and/or displayed). (The graphics output ports may include video card outputs, USB ports for video output, or the like.) This will depend upon the number of optical projectors and computer monitors that are being employed in a particular assembly, manufacturing or other process, and can be accomplished using the "Views" frame located in the lower middle area of the User Interface of the Configurator Tool. On the "Views" frame, the user will typically be presented with four items:
1. Work Instructions
2. Video Screen
3. User Interface Screen
4. Projector 1.

To configure which graphics output ports that each of the four above items is assigned to, the user should select each one, one at a time, and then use the "Display" property located to the right on the "Properties" frame. This "Display" property will typically show all of the available graphics output port numbers that can be used in connection with a particular assembly, manufacturing or other system (depending upon the number of computer monitors and optical projectors that are being employed). Typically, for a system using one computer monitor and one optical projector, the Work Instructions. Videos and User Interface will be assigned to display number 0, and the Projector will be assigned to display number 1. If more than one projector is needed on the system, for each additional projector, the user should select "Add Projector," which will add a projector to the "Views" list. The user should then select this newly added projector and assign it to one of the unused "Displays." For example, for a computer that is configured to have up to eight graphics output ports, a total of eight optical projectors and monitors may be employed with the computer, as follows:

| Monitors | Projectors |
|---|---|
| 1 | 7 |
| 2 | 6 |
| 3 | 5 |
| 4 | 4 |
| 5 | 3 |
| 6 | 2 |
| 7 | 1 |

However, depending upon the number of graphics card slots that are available inside of the computer, additional graphics cards could be added, with the upper limit presently only resulting from a Microsoft Windows limitation.

Each time a user assigns a "Display" value to a "View," the monitor(s) and projector(s) 1 will have their graphics port value(s) displayed on the "Control Panel" screen present on the monitor(s) or projector(s), for example, as a giant "1," "2," "3" or the like, across the entire screen, so that the user can verify that the "Display" value that they assigned is indeed the correct one. If the Projector is set to display 0 and the number "0" gets displayed on the computer monitor(s), then the user should change the Projector to display 1. If set incorrectly, the images that should be sent to the optical projector for projection onto the assembly object will be displayed on the computer monitor instead.

After the user is satisfied that all of the required assembly, manufacturing or other steps have been created, and created in the correct order, all required gages have been added, and the necessary "Views" have been properly assigned, the user can now "Publish" this process by selecting "File" at the top of the User Interface of the Configurator Tool, and then "Publish Process." This will typically create the file that will be used by the Operator Tool to guide the particular assembly process. The user can now exit the User Interface by selecting "File" and then "Exit."

Operator Assembly Software Tool

FIG. 14 is an illustration of a User Interface screen of an Operator Assembly Software Tool ("Operator Tool") that is used to run the actual assembly, manufacturing or other sequence (series of ordered steps) created using the Authoring Tool and Configurator Tool for an object to be assembled.

The User Interface of the Operator Tool shown in FIG. 14 contains five main features:
1. The standard Windows program "File" menu, which gives the user two options:
    a. "Select Process"—This option allows the user to open a previously created process that was "published" using the Configurator tool when selected.
    b. "Exit"—This option performs a standard Windows program exit when selected.
2. The "Process List" frame, located along the left hand side of the User Interface screen, shows all of the process steps in order that are included in the current assembly process.
3. The current process step frame, which in FIG. 14 is titled "Info Frame." The title of this frame changes to reflect the current step of the assembly process. This frame title will be the same as the ones shown in the "Process List" frame for each step.

Control Buttons along the bottom of the User interface screen allow the user to display work instructions and videos, print the measured fastener information, or proceed to the next step by selecting "Instructions," "Print," "Video" or "Next," respectively.

To start, the user launches the Operator Tool by selecting on the main computer screen "Start," and then "All Programs," and then "Operator Tool" (or by using a desktop short cut). Once the User Interface appears on the computer screen, the user will use the menu option "File" and then "Select Process" to open the desired assembly, manufacturing or other process file (out of the typically more than one, or many, process files present) that was published in the Configurator Tool. Once the file has been opened, a screen similar to the one shown in FIG. 14 will be displayed on the main computer monitor.

At this point, the user should enter the information being displayed on the "Info Frame" in the User Interface (FIG. 14). For example, the tail number for the aircraft, and the serial number for the part being assembled (part of the aircraft tail), are entered in the text fields shown in FIG. 14. Once entered, the user should select the "Next" button to proceed to the next step.

Figure 15:
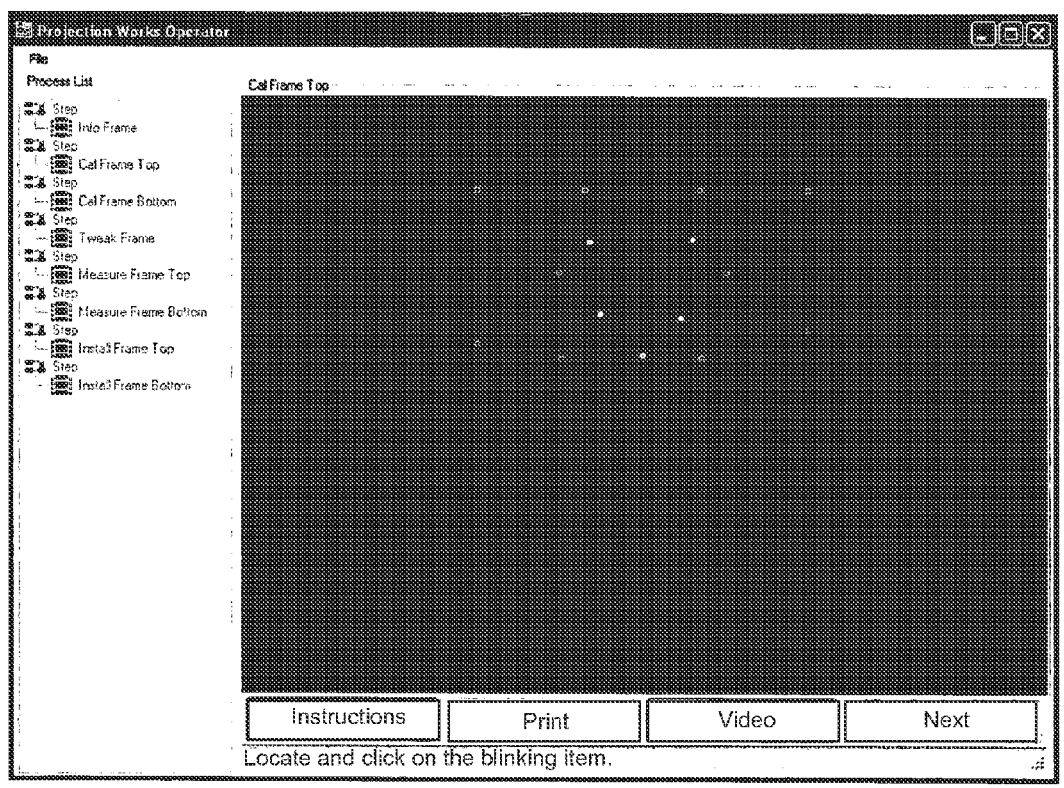
FIG. 15 is an illustration of a Cal Frame of an Operator Assembly Software Tool ("Operator Tool") that may be used in the systems and methods of the invention for a calibration, and that shows a series of calibration points and a series of non-calibration points that may be employed in the calibration.
Figure 16:
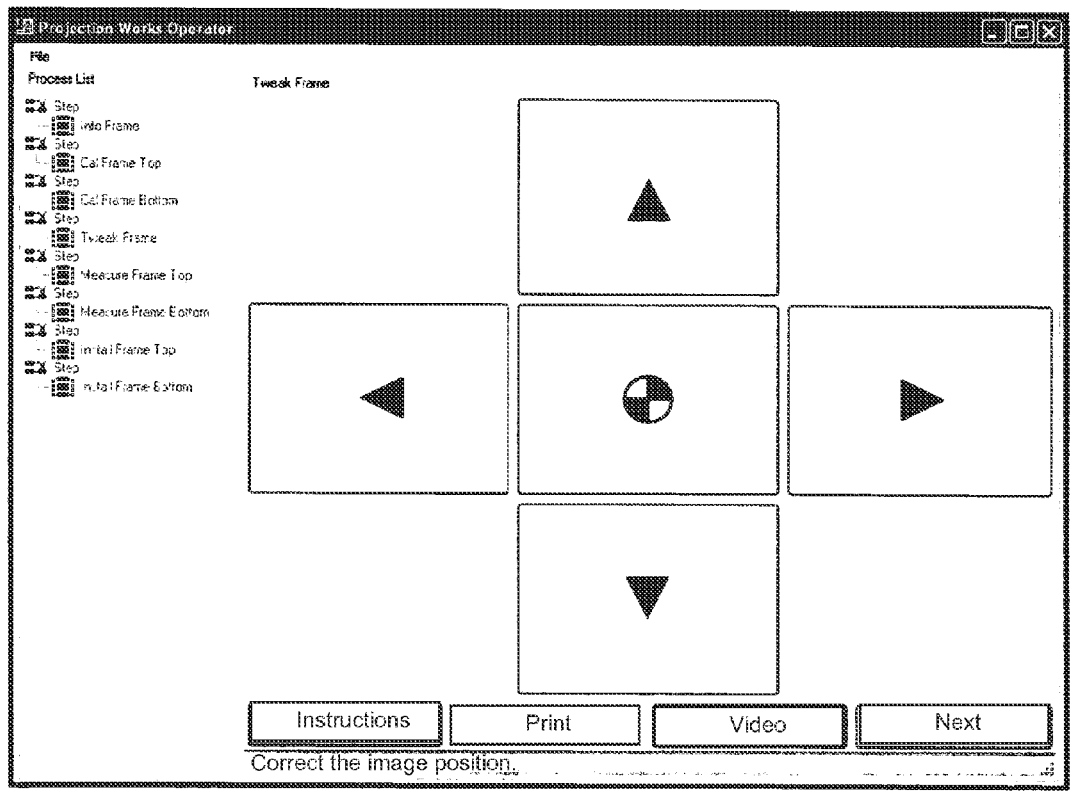
FIG. 16 is an illustration of a Tweak Screen of an Operator Assembly Software Tool ("Operator Tool") used for a calibration of datasets of pre-drilled hole locations for fasteners.

The user will now be presented with a Cal Frame, as is shown in FIG. 15, which will show all of the points (calibration points and non-calibration points) that will be projected onto the object (or part) being assembled, manufactured or otherwise processed as is also shown in FIG. 15. In FIG. 15, the red points indicate calibration points and the yellow points indicate non-calibration points. One of the calibration points will generally be flashing on/off about once each second. The user will now guide the mouse crosshair (plus sign, +) over the object (or part thereof) being assembled, manufactured or processed until the crosshair is directly over the pre-drilled hole in the object that corresponds to the flashing point on the screen. At this point, the user will click the left mouse button and the next calibration point will begin flashing on the screen. The user will align the crosshair over the next hole in the object (or part thereof) being assembled, manufactured or processed and depress the left mouse button again. These steps will be repeated until there are no longer any flashing red calibration points being displayed on the computer screen. The "Next" button will then become enabled, and the user will select it. This will bring up the Tweak screen shown in FIG. 16.

The system software will use the data collected in the calibration step to calibrate the Annotated Geometry, and then display it onto the projected surface. By calibrating the Annotated Geometry using this data, the system software adjusts the original Annotated Geometry to compensate for distortions caused by imperfections in the projector lens, and the location of the part relative to the projector. The system takes into account the particular orientation of the object being assembled, manufactured or processed which is determined by the calibration point mouse clicks that are described in the preceding paragraph, and "adjusts" the internal datasets to compensate for how the object is oriented with respect to the optical projector(s). The orientation of the object (or part) being assembled, manufactured or processed versus the optical projector needs to be quantified so that the three-dimensional image can be adjusted in the system software to compensate for the fact that the optical projector(s) may not be pointing directly at the object. An example is the projectors that are typically employed in conference rooms. These projectors only project a proper image when pointed normal (perpendicular) to a surface. If they are off to one side, the image on the screen becomes distorted. The system software of the present invention determines where the projector is with respect to the screen during the calibration step, and adjusts the image. Thus, the system software distorts the image in a manner that, when it is projected by the projector, it appears in an undistorted manner on the object (or part) being assembled or otherwise manufactured.

In addition, the system calibrates out the effects of any distortions in the projector lens at this time. The distortions are caused by imperfections in the projector lens which occur during the manufacturing process. Examples of imperfections would be the shape of the lens, which may vary from lens to lens, misalignments between the lens and the area in the projector generating the image, "swirling" or "bubbles" in the glass used to make the lens, scratches, and the like.

Figure 17:
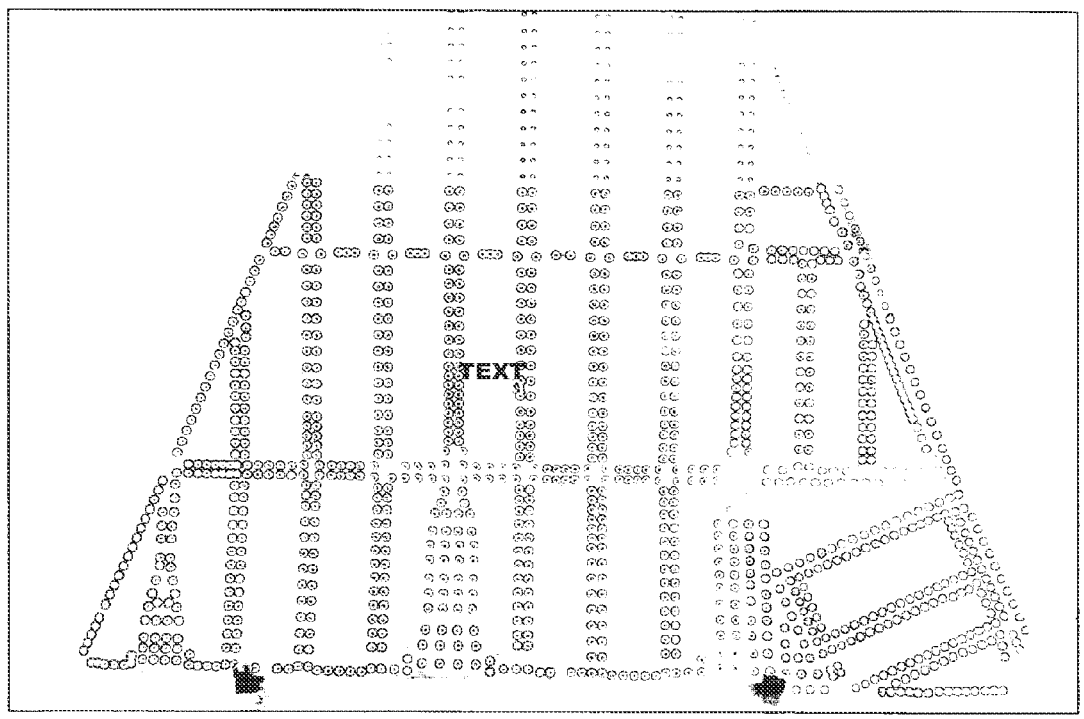
FIG. 17 is an illustration of a projection of calibrated data sets from the Tweak Screen of the Operator Assembly Software Tool ("Operator Tool") onto the three-dimensional object being manufactured (a vertical stabilizer (tail) of an F22 aircraft).

The calibrated data sets of all of the fastener hole locations will now be projected as yellow circles onto the object being assembled or manufactured (or part thereof), as is shown in FIG. 17. (When the user is finished calibrating and proceeds to the next step, these points will be displayed. So, it is a result of the user leaving the calibration step that causes this to occur.) If a sufficient number of calibration points were chosen using the Authoring Tool, the projected yellow circles should line up directly over the pre-drilled (or other) holes in the object (or part thereof) being assembled, as is shown in FIG. 17 (a vertical stabilizer (tail) of an F22 aircraft). If, on the other hand, the alignment is not sufficient (i.e., the projected yellow circles and the holes do not line up closely or exactly), the calibration step in the Operator Tool should be re-run. If the alignment is still not sufficient, then the user should go back to the Authoring Tool and add additional calibration points to the calibration step.

Once the calibrated points (data sets) are projected onto, and displayed, on the object (or part thereof) being assembled or otherwise manufactured, as shown in FIG. 17, minor adjustments can be made to the left/right and up/down location of the points. These adjustments are made to ALL the points by selecting the appropriate button on the screen in FIG. 16, which corresponds to the direction the points need to be moved (left, right, up or down). The center button in FIG. 16 removes any manual adjustments that have been made, and places all of the projected points back to the original calibrated position. Once the user is satisfied with the alignment of the calibrated points and the actual fastener holes in the object (or part thereof) being assembled, the "Next" button should be selected to proceed to the next step.

Figure 18:
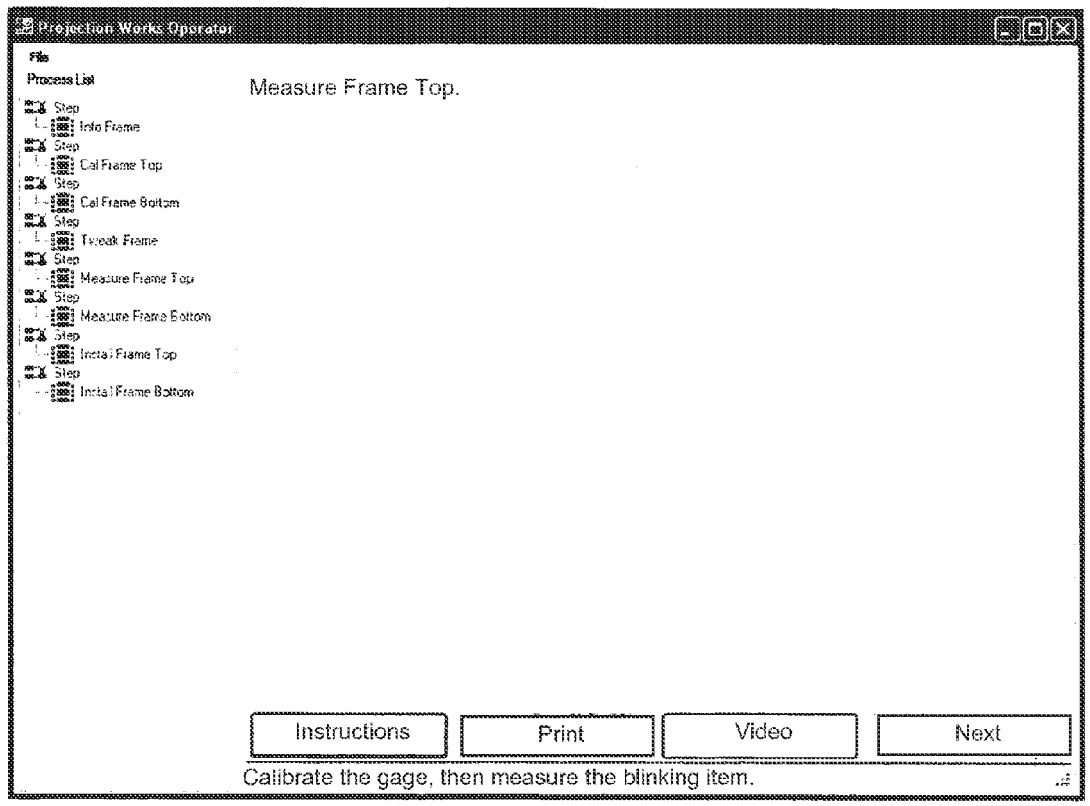
FIG. 18 is an illustration of a Measure Frame (which is empty) of a User Interface of an Operator Assembly Software Tool ("Operator Tool").

At this point in the process, the "Measure Frame" screen will be displayed in the User Interface. Since all of the data required by the user will be projected onto the object being assembled, this frame on the User Interface screen will have no information displayed thereon, as shown in FIG. 18. However, there will be a starburst pattern (as is shown in FIG. 3) displayed on the object in the location of the first hole that needs to be measured using an input or measurement device, such as a grip gage (as is shown in FIG. 4). The user will take the grip gage and place it into the hole that is illuminated by the starburst pattern as shown in FIG. 4, so that the 3 "feet" are in contact with the objects surface. (There are three blunt "points" that are located near the tip of the grip gage. The feet are equal distance apart around the grip gun's tip.) There is a long probe about 1.5" inches long with a blunt hook on the end that goes through the hole and out the back of the hole. The user squeezes the handle of the gun until the hook on the probe is pulled inward and contacts the back of the object Once the handle "clicks," the computer reads the circuitry inside the gun to get a thickness reading. If the thickness reading is within the tolerance band, the starburst patter advances to the next hole, and the gun is moved to that location to measure the skin thickness (fastener length). If the measurement was out of tolerance, the starburst turns red and does not advance. The user can then push the yellow button on the gun to repeat the measurement or can press the red button (not visible, but just like the yellow one on the other side of the gun) to advance to the next hole. If the user chooses this, the hole that was out of tolerance it kept track of by the system, so the user can view all out of tolerance holes at a subsequent time when the user goes to insert fasteners into the object being assembled. This happens automatically when the user selects the red button on the grip gage, and this data is stored internally by the system software.

Figure 19:
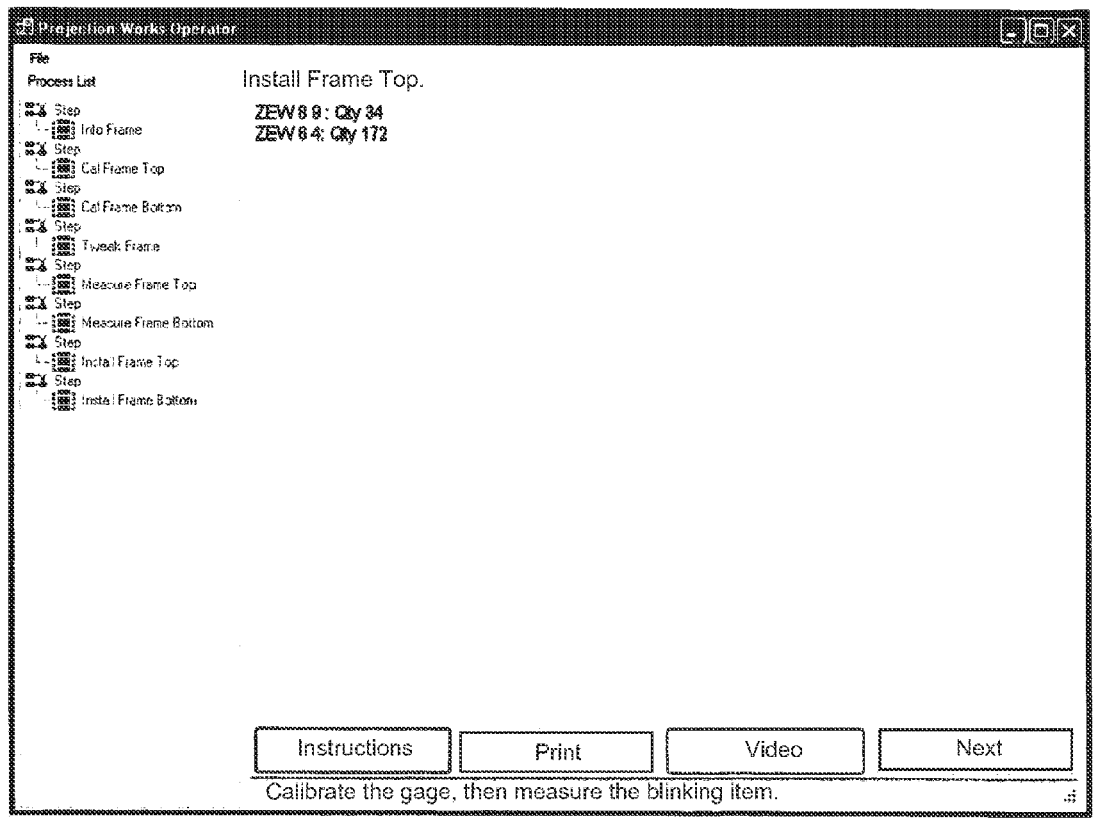
FIG. 19 is an illustration of an Install Frame of a User Interface of an Operator Assembly Software Tool ("Operator Tool"), which lists the part numbers, and quantities, for each type of fastener that needs to be installed into the three-dimensional object, or part, being manufactured.

Once the last hole in the object being assembled (or part thereof) has been measured using the grip gun (or other measurement or input device), the "Next" button on the User Interface of the Operator Tool will become enabled. The user will then select the "Next" button, and the User Interface will now display the "Install Frame" screen, as is shown in FIG. 19.

Listed in the "Install Frame" screen are the part numbers and quantities for each type of fastener that needs to be installed into the object being assembled or otherwise manufactured (or part thereof). The part number for the first type of fastener that needs to be installed into the object will also be projected onto the object. In addition, each hole currently being displayed that requires one of these fasteners will be illuminated with a yellow circle. The user (or another user or worker) will now retrieve the required fasteners, for example, from a parts bin, along with their corresponding nuts, and manually install these fasteners into all the illuminated holes. Once all of the illuminated holes have fasteners installed in them, the user will select, using the mouse, the next fastener on the list shown on the User Interface screen in FIG. 19. The user will now repeat the installation process for all these fasteners, and so forth.

When all of the fasteners have been installed into the object, or part, the assembly is complete. The user can now exit the Operator Tool by using the "File" and "Exit" menu option on the User Interface. The assembled object can be removed from an assembly jig and replaced with the next object needing fasteners to be installed therein (the same type of object), and the user can simply re-run the "Operator Tool" using the corresponding process file. For the next object being assembled, and all subsequent objects of the same type, none of the steps prior to the use of the Operator Tool need to be performed, as the computer is already all set up, and has all required data for the assembly entered therein. As a result, and very advantageously, the time and labor that are required to perform a second, third, fourth, fifth and subsequent assembly processes of the same object becomes greatly reduced (typically by at least about 10%, and often by at least about 20%, and sometimes by at least about 30%), whether being performed by the same user or a new user.

Preferred computer software programs for use in the systems and methods of the invention are described below along with their function and source, many of which are related to each other. While it is preferred that all of the computer software programs that are described below are employed in the systems and methods of the invention, some of these programs are optional, as is indicated. Commencing on the filing date of this U.S. patent application, a computer having one or more, or all, of these software programs installed thereon, and the various "Projection Works" computer software programs, are commercially available from Delta Sigma Corp. (2100 Barrett Park Drive, Suite 508, Kennesaw, Ga., 30144). While it is preferable that all of the different types of computer software discussed below, which have different functions, are employed in the systems and methods of the invention, it is not necessary to employ all of them. For example, while antivirus and identity protection programs provide advantageous protection for a computer, a computer may be employed without such programs. Those having ordinary skill in the art may readily determine which computer programs are needed to employ the systems and methods of the present invention to assemble a particular 3-dimensional object. Many of the computer software programs that are described below may be downloaded from the various web sites that are described herein. Further, many of those computer software programs that that are described below as being required are required for writing a software program that functions in the same manner as does the source code that is described herein, not for having the systems and the methods of the invention properly operate.

Software (Per Computer)

Computer Operating System
Windows Vista Business Service Pack 1 (32 Bit OS) (Microsoft Corporation, Redmond, Wash.)
(Required; Operating System Related)
Viewer Used to Read Files in PDF Format
Adobe Reader 9.1 (Adobe Systems Incorporated, San Jose, Calif.)
(Required; Document Display Software; Software Application)
Anti Virus Software
AVG 8.5 (AVG Technologies USA, Inc., Chelmsford, Mass.)
(Optional; Any Anti-Virus Software should Work; Security Software)
Identity Protection Sits on Top of Installed Anti-Virus, Shielding Passwords, Credit Card Numbers and Other Digital Information
AVG Identity Protection (AVG Technologies USA, Inc., Chelmsford, Mass.)
(Optional; Any Input Shielding Software should Work; Security Software)
Driver File for Enabling a Belkin Wireless G Adapter to Function Properly
Belkin Wireless G USB Adapter Driver (Belkin, Compton, Calif.)
(Optional; Any Wireless Device and Software Supported by Windows should work; Networking Software)
Utility Used to Configure and Provide Drivers for the Belkin USB Wireless Adapter Dock
Belkin Wireless USB Utility (Belkin. Compton, Calif.)
(Optional; Any Wireless Device and Software Supported by Windows should work; Networking Software)
Software Application Used to Design, Manage and Deliver Data Reports Via the Web or Enterprise Applications
Crystal Reports Basic for Visual Studio 2008 (Business Objects, SAP America, Inc., Newtown Square, Pa.)
(Required; Used for Writing Software; Database Software Development Software)
Utility Used to Manage all Driver Files
Driver Download Manager (Dell Inc., Round Rock, Tex.)
(Required; Computer Manufacturer Dependent; Computer Configuration Software)
Device Drivers, Diagnostics and Technical Information
Dell Resource CD (Dell Inc., Round Rock, Tex.)
(Required; Computer Manufacturer Dependent; Computer Configuration Software)
Software Development Kit (SDK) Used with Cameras
FlyCapture 2.0 Beta 06 (Point Grey Research, Richmond, BC, Canada)
(Required; Used for Writing Software for Cameras: Software Development Software)
Service Pack for the .NET Compact Framework
.NET Compact Framework 2.0 SP2 (Microsoft Corporation, Redmond, Wash.)
(Required; Used for Writing Software; Software Development Software)
A Hardware-Independent Environment that Supports Building and Running Managed Applications on Resource-Constrained Computing Devices
.NET Compact Framework 3.5 (Microsoft Corporation, Redmond, Wash.)
(Required: Used for Writing Software; Software Development Software)
Redistributable Package which Installs the .NET Framework Runtime and Associated Files Required or Desired to Run Applications Developed to Target the .NET Framework v3.5
.NET Framework 3.5 (Microsoft Corporation, Redmond, Wash.)
(Required; Used for Writing Software; Software Development Software)
Device Emulator for ARM-Based Devices
Device Emulator version 3.0 ENU (Microsoft Corporation, Redmond, Wash.)
(Required; Used for Writing Software; Software Development Software)
Help Viewer for Visual Studio Documentation.
Document Explorer 2008 (Microsoft Corporation. Redmond, Wash.)
(Required; Used for Writing Software; Software Development Software)
A Computer Application Used to Create Desktop, Enterprise, and Web-Based Database Systems
SQL Server 2005 (Microsoft Corporation, Redmond, Wash.)

(Required; Database Software that Stores Projection Works Data; Database Software Development Software)

The SQL Server Compact Design—Time Components used with Visual Studio

SQL Server Compact 3.5 Design Tools ENU (Microsoft Corporation, Redmond, Wash.)

(Required; Used for Writing Software; Database Software Development Software)

Used to Create Compact Databases that can be Deployed on Desktop Computers, Smart Devices and Tablet PCs.

SQL Server Compact 3.5 ENU (Microsoft Corporation, Redmond, Wash.)

(Required; Used for Writing Software; Database Software Development Software)

A Preferably Lightweight, Relational Database Engine Used in Device Applications SQL Server Compact 3.5 for Devices ENU (Microsoft Corporation, Redmond, Wash.)

(Required: Used for Writing Software; Database Software Development Software)

Provides Way to Publish Databases to T-SQL Scripts or Directly to Supporting Hosting Service Providers SQL Server Database Publishing Wizard 1.2 (Microsoft Corporation, Redmond, Wash.)

(Required; Used for Writing Software; Database Software Development Software)

Contains an SQL OLE DB Provider and SQL ODBC Driver in One Native Dynamic Link Library (DLL) Supporting Applications Using Native-Code APIs (ODBC, OLE DB and ADO) to Microsoft SQL Server SQL Server Native Client (Microsoft Corporation, Redmond, Wash.)

(Required; Used for Writing Software; Database Software Development Software)

Contains Additional Files Used in SQL Server Setup

SQL Server Setup Support Files (English) (Microsoft Corporation, Redmond, Wash.)

(Required; Used for Writing Software; Database Software Development Software)

Provides Added Functionality for Backup and Restore of SQL Server Through the Volume Shadow Copy Service (VSS) Framework SQL Server VSS Writer (Microsoft Corporation, Redmond, Wash.)

(Required; Used for Writing Software; Database Software Development Software)

Installs Runtime Components of Visual C++ Libraries Required to Run Applications Developed with Visual C++ on a Computer that does not have Visual C++2005 Installed Visual C++2005 Redistributable (Microsoft Corporation, Redmond, Wash.)

(Required; Used for Writing Software; Database Software Development Software)

A Comprehensive Set of Tools That Accelerates the Process of Creating, Debugging and Deploying Software Development Projects that Target the Web (Including ASP.NET AJAX), Windows Vista, Windows Server 2008, the 2007 Microsoft Office System, SQL Server 2008 and Windows Mobile Devices Visual Studio 2008 Professional Edition ENU (Microsoft Corporation, Redmond, Wash.)

(Required; Used for Writing Software; Software Development Software)

An HTML/ASP.NET Design Surface that is Based on Former FrontPages Technologies

Visual Studio Web Authoring Component (Microsoft Corporation, Redmond, Wash.)

(Required; Used for Writing Software; Software Development Software)

Provides the Documentation, Samples, Header Files, Libraries and Tools (including C++ Compilers) that are Needed to Develop Applications to Run on Windows Server 2008 and the .NET Framework 3.5.

Windows SDK for Visual Studio 2008 .NET Framework Tools (Microsoft Corporation, Redmond, Wash.)

(Required; Used for Writing Software; Software Development Software)

Provides Additional Documentation, Samples, Header Files, Libraries and Tools (including C++ Compilers) that are Needed to Develop Applications to Run on Windows Server 2008 and the .NET Framework 3.5.

Windows SDK for Visual Studio 2008 Headers and Libraries (Microsoft Corporation, Redmond, Wash.)

(Required; Used for Writing Software; Software Development Software)

Assemblies and Documentation for DSL Runtime Tools

Windows SDK for Visual Studio 2008 SDK Reference Assemblies and IntelliSense (Microsoft Corporation, Redmond, Wash.)

(Required; Used for Writing Software; Software Development Software)

Includes Tools, Documentation and Samples for Developers to Design, Build, Test and Deploy Extensions for Visual Studio 2008.

Windows SDK for Visual Studio 2008 Tools (Microsoft Corporation, Redmond, Wash.)

(Required; Used for Writing Software; Software Development Software)

A Set of Tools, Code Samples, Documentation, Compilers, Headers and Libraries that Developers can use to Create Applications that run on Microsoft Windows Operating Systems using Native (Win32) or Managed (.NET Framework) Programming Models Windows SDK for Visual Studio 2008 Win32 Tools (Microsoft Corporation, Redmond, Wash.)

(Required; Used for Writing Software; Software Development Software)

Resource of Information for Developers using Microsoft Tools, Products and Technologies MSDN Library for Visual Studio 2008—ENU (Microsoft Corporation, Redmond, Wash.)

(Required; Used for Writing Software; Software Development Software)

Driver Files Used for the NVIDIA Graphics Card

NVIDIA Drivers (NVIDIA, Santa Clara, Calif.)

(Required; Video Graphics Card Dependent; Computer Configuration Software)

Opensource Computer Vision Software Development Kit (Contains Tools, Code Samples, Documentation, Headers and Libraries that Developers Can Use to Create Computer Vision Applications that Run on Microsoft Windows Operating Systems using Native (Win32) or Managed (.NET Framework) Programming Models)

OpenCV SDK-OpenCV project (SourceForge—see the web site sourceforge dot net)

(Required; Used for Writing Software for Cameras: Software Development Software)

Authoring Assembly Software Tool ("Authoring Tool")

(Windows Based Software Application that Allows the User to Create Assembly Processes that May be Projected onto a Complex 3D Object in 3D)

ProjectionWorks Author (Delta Sigma Corp., Kennesaw, Ga.)
(Required; Used to Create Projected Images; Software Application)
Configurator Assembly Software Tool ("Configurator Tool")
(Windows Based Software Application that Allows the User to Configure Assembly Processes that May be Projected onto a Complex 3D Object in 3D)
ProjectionWorks Configurator (Delta Sigma Corp., Kennesaw, Ga.)
(Required; Used to Configure Projected Images; Software Application)
Operator Assembly Software Tool ("Operator Tool")
(Windows Based Software Application that Allows the User to Run Assembly Processes that May be Projected onto a Complex 3D Object in 3D)
ProjectionWorks Operator (Delta Sigma Corp., Kennesaw, Ga.)
(Required; Used to Display Projected Images; Software Application)
A Collection of Bindings to Facilitate Cross-Platform Graphics-Related Development utilizing the .NET Platform
ToaFramework 2.1.0 (for .NET) (TaoFramework, open source—see the web site taoframework dot com)
(Required; Used for Writing Software; Software Development Software)
For Running Solutions Built Using VSTO 2005 or VSTO 2005 SE
Visual Studio 2005 Tools for Office Second Edition Runtime (Microsoft Corporation, Redmond, Wash.)
(Required; Used for Writing Software; Software Development Software)
A Set of Development Tools Available in the Form of a Visual Studio Add-in (Project Templates) and a Runtime that Allows Microsoft Office 2003 and Later Versions of Office Applications to Host the .NET Framework Common Language Runtime (CLR) to Expose their Functionality Via the .NET Type System
Visual Studio Tools for the Office System 3.0 Runtime (Microsoft Corporation, Redmond, Wash.) (Required; Used for Writing Software: Software Development Software)
Extends Visual Studio 2005 so that Managed and Native Application Software Targeting Windows Mobile 5.0 based Pocket PC Devices can be Written
Windows Mobile 5.0 SDK R2 for Pocket PC (Microsoft Corporation. Redmond, Wash.)
(Required; Used for Writing Software; Software Development Software)
Extends Visual Studio 2005 so that Managed and Native Application Software Targeting Smartphone Devices can be Written
Windows Mobile 5.0 SDK R2 for Smartphone (Microsoft Corporation. Redmond, Wash.)
A Library of Highly Optimized, Extensively Threaded Math Routines for Science, Engineering, and Financial Applications
Intel Math Kernel Library (Intel MKL) 10.2 (Intel Corporation, Santa Clara, Calif.)
(Required; Used for Writing Software; Software Development Software)
Additional information about computer software programs and computer programming is present in John Lewis et al., *Java Software Solutions* (2nd Edition, Pearson Education, Inc., 2007, ISBN 0-13-222251-5); Donald E. Knuth, *The Art of Computer Programming, Volumes* 1-4 (Addison-Wesley. ISBN 0-201-48541-9); O.-J. Dahl et al., *Structured Programming* (Academic Press, ISBN 0-12-200550-3); Wilkes, M. V. et al., *Preparation of Programs for an Electronic Digital Computer* (Addison-Wesley); and Alexander Stepanov et al., *Elements of Programming* (Pearson Education, Inc., ISBN 13-978-0-321-63537-2).

Using the detailed teachings, resources and other information that are provided herein, those of ordinary skill in the art may readily purchase and/or write various computer software programs that function in the manners that are described herein, and may properly install them in a computer to produce the systems of the present invention, and to carry out the methods of the present invention.

Set-Up and Operation of Systems

The systems of the invention may be operated by a user using the step-by-step process that is described below, which includes all of the steps that the user may need to take in order to create and run a project. (The user "creates" a project by using the Authoring Tool to create assembly, manufacturing or other frames by importing the Base Geometry and Annotated Geometry, as well as using the Configurator Tool, to place the assembly, manufacturing or other steps in order, as well as assign all the projectors and monitors employed to appropriate or desired graphics ports. The user "runs" a project by taking the output from the Configurator Tool, and using it generally over and over again in the Operator Tool to assemble object parts.)

System Set-Up

The following is a step-by-step description for the set-up process that is preferably employed in connection with the systems and methods of the invention. The steps that are described may be performed in any suitable order and/or manner, which may be determined by those having ordinary skill in the art. Steps that are optional are indicated.

Figure 8:
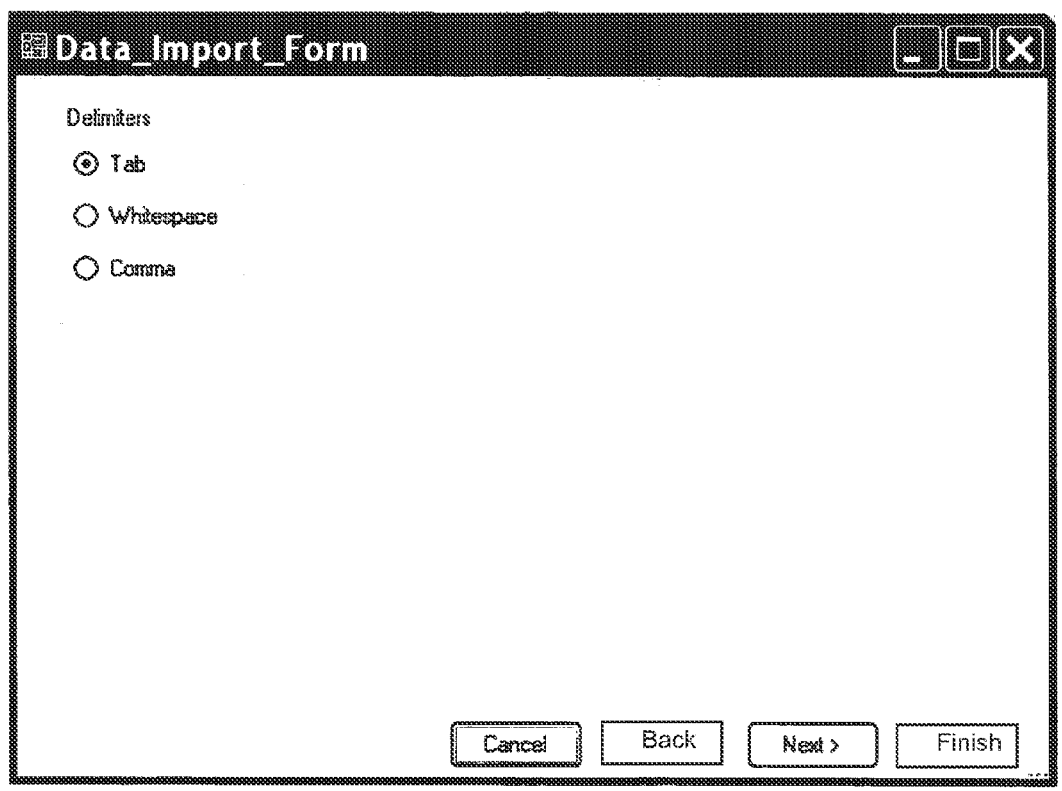
FIG. 8 is an illustration of a Data_Import_Form screen of an Authoring Assembly Software Tool ("Authoring Tool") in which a user may be prompted to enter a delimiter type (Tab. Whitespace or Comma) that may be used in an "Import" and "Annotated Geometry" file in the systems and methods of the invention.

1. Acquire components parts of the system (as is described herein).
2. Install software (described herein) onto a computer (or more than one computer).
3. Attach computer monitor(s) to computer(s) using included (or other) cables.
   (This step is optional if only a laptop computer(s) is being employed, and the only monitor(s) that is being employed is the one that is built into the laptop computer(s). If a desktop computer(s), or a laptop(s) using multiple monitors per laptop, is employed, this step generally is not optional.)
4. Attach keyboard(s) and mouse(s) to computer(s).
   (This step is generally required with a desktop computer(s), but optional with a laptop computer since an external mouse/keyboard can be used with a laptop computer if it is present in a docking station, or if the laptop is used as is.)
5. Mount a projector onto a tripod stand, or onto a ceiling, wall, table or other surface and/or object.
   (This step may be optional, depending upon the particular circumstances of a situation, but is very desirable, and it may be necessary to maintain a projector stationary and/or to properly position the projector in a work area for a proper operation of the system, which may readily be determined by those having ordinary skill in the art. It is preferable that the projector be mounted, such that it cannot easily be moved if it is accidentally bumped or a person mistakenly runs into it. What one would mount it on would be dependent upon where it is being used. Some locations lend themselves to using a ceiling mount. Sometimes it may be possible to attach a projector to a worktable, or to the underside of a support beam. However, if sufficient room for a tripod is present in a particular work area, it is preferred to mount the projector on a tripod.)
6. Power up the projector (i.e., turn it "on" with, for example, an electrical cord being plugged into an electrical outlet), and determine its optimal placement, given the configuration of a particular work area, such as a room). Also determine:
    a. Will one projector cover the entire work surface being employed?
        i. Lens requirements in order to achieve item "a".
        ii. If multiple projectors are needed or desired to cover the work surface, determine location and lens requirements for each projector.
    b. Is it required that workers (or others) do not obscure the projected data?
        i. Determine the location and lens requirements for each projector in order to preferably achieve unobstructed coverage.
7. Attach projector(s) to the computer(s) using connection cables that permit data and/or information to be transferred between the projector(s) and the computer(s);
8. If the number of monitors and projectors exceeds the number of video card outputs currently installed (or otherwise present) in the computer, install one or more additional video cards.
9. If a grip gage is to be used, optionally, to perform thickness measurements, it should be attached to the computer, preferably at this time.
10. Generate a stereo lithography format (STL) file that represents the base geometry that is to be used as the projection surface. (In other words, if the surface being projected upon is an aircraft tail section, such tail section should be modeled in 3D in any CADAM/Catia modeling code that is capable of exporting the file into .STL format.) This Base Geometry file should then be placed into the project directory on the computer containing the Authoring Tool, Configurator Tool and/or Operator Tool software.
11. The file that contains the information that will be projected onto the projection surface should be created, as well, and placed in a Comma, Tab or Whitespace delimited forma. This Annotated Geometry file should also be placed in the project directory on the computer containing the Authoring Tool. Configurator Tool and/or Operator Tool software. For example, for an object that is an airplane door, the Annotated Geometry file for the door skin would contain the fastener hole location in 3D for all the fasteners to be installed in the door skin. The contents of an example file are shown in FIG. 7. In this example file shown, each row represents a hole on the Base Geometries surface. The individual columns are defined as follows from left to right:
    a. Hole ID
    b. Part # for fastener for this hole
    c. X-Location of hole center in space
    d. Y-Location of hole center in space
    e. Z-Location of hole center in space
    f. I component of normal vector for the hole center
    g. J component of normal vector for the hole center
    h. K component of normal vector for the hole center
    i. Diameter of hole
12. The Authoring Tool should now be launched by selecting Start "All Programs" and "Projection Works Author," The screen shown in FIG. 5 will be displayed.
13. The Base Geometry file described in step 10 above should now be imported into the Authoring Tool (FIG. 5). This is done by selecting "Import-Base Geometry" using the drop down menu along the top frame. The user should select the Base Geometry .STL file to import it.
14. The Annotated Geometry file that is described in step 11 above should now be imported into the Author Software Tool (FIG. 5). Again, the user should use "Import-Annotated Geometry" to import this file into the Authoring Tool.
15. After selecting the Annotated Geometry file and clicking "Open", the delimiter type used by the file should be selected, as shown in FIG. 8.
16. The details of the file layout should be specified next in order to ensure that the data is read into the Authoring Tool correctly. In this step, the user should identify what each column of data contains. After the delimiter type is selected, the screen shown in FIG. 9 should be used to identify what column a part ID and part # are located in.
17. The user should then identify how the data should be displayed. In this example, the data is for fastener holes on a 3D surface. The screen in FIG. 10 may be employed to indicate the display shape that is used for these holes. In this example, the shape selected is a circle using a fill color of yellow.
18. A screen that may be used to define the Annotated Geometry file data is shown in FIG. 11. This screen is used to identify the columns in which the x, y and z hole location data is present, and the columns in which the i, j and k normal vector data is located.
19. After selecting "Finish" on the screen in FIG. 11, a view of the annotated data overlayed onto the Base Geometry should be displayed, as shown in FIG. 12.
20. Define the process elements which should be included into the particular project. These include, for example, Calibration, Information, Tweaking, Measuring and/or Installing.
21. Identify a plurality (preferably at least 8) of calibration points to be used in a calibration step.
22. Using the menu of the User Interface screen of the Authoring Tool (FIG. 12), the project can now be saved in typical Microsoft fashion (i.e., by clicking on the save floppy disc icon, by selecting from the top level menu "File" and "Save," or the like). The project is preferably saved using the .pxp save type, which creates a private project that can be modified at a subsequent date and/or time. Once the project is ready for use, it can be published for use, preserving the private project for later modification.
23. Using the Configurator Tool that is shown in FIG. 13, the process elements defined in step 20 above should be put together to form the process steps that are to be employed for the project. In the Operator Process Steps frame shown in FIG. 13, the steps required or desired to perform the process should be added, for example, using the Add Step button or right clicking the mouse in the frame and choosing the desired step. Process elements should be added to each step as needed or desired by selecting the step using the mouse (or otherwise), then selecting the Process Element, then clicking the Copy to Step button between the Process Elements and Process Steps frames.
24. Once all of the necessary or desired process elements have been assigned to the required or desired process steps, grip gages should be assigned to the project using the Gages frame (FIG. 13). This is accomplished using the Add button on the Gages frame and selecting the appropriate gage type.
25. Adding the required or desired number of projectors should be completed using the Views frame and the Add/Delete projector buttons (FIG. 13). The number of projectors visible in the Views frame should match the number of projectors in actual use. The number of projectors in this list should be the same as the number of projectors that will be in the work area, as determined by step 6 above.

26. Configure the views shown in the Views frames. Each view should be assigned a display screen that it should be using. For example, if there are four video ports in the computer that is being used, then each monitor/projector should be assigned to display the appropriate display value from 1-4. The display value selected should be shown on the display screen.

(The user should select the view (i.e. one of the items listed in the "Views" frame, such as "Projector 1." "Video Screen," or the like, to configure. Then, there are several properties shown just to the right of the Views" frame. To configure the "View," the user should assign a screen number to that view, so that the computer places that view onto the correct video port. The screen number field is a drop list, and the user clicks that list, and selects the correct screen number. By correct is meant that if the user selects "User Interface Screen," the screen number that the user picks should result in the User Interface screen being shown on the computer monitor in front of the user. If it shows up on the object to be assembled, then the user has selected the wrong screen. The Configurator Tool software detects the number of graphics ports that are available on the computer and populates the Screen drop list with the numbers that are available. The user just has to select the "View" with the mouse, and then pick the Screen number from the drop list. When the user does this, a large green number representing the graphics port number will be displayed on each projector and monitor, so that the user can see what graphics port is attached to what "View.")

27. Publish the project using the File-Publish selection from the menu on the User Interface of the Configurator Tool (FIG. 13).

(Publish means to create a file that can be used by the Operator Tool. This published file has all unnecessary information that is used by the Authoring Tool and the Configurator Tools stripped out of it. This beneficially reduces or eliminate unnecessary data from the file and renders the file so that the end user cannot modify it. Also, this permits the main file used by the Configurator Tool to contain numerous pieces of information that can be put together to create different "published files." The user can then create a number of different published files from one main file used by the Configurator Tool. An example of this is airplane tails that are made for F-22 aircrafts using the systems and methods of the invention. The F-22s have two vertical tails. The tail on a pilot's left hand side has an outboard and inboard surface skin, and the tail on the pilot's right hand side has an outboard and inboard surface skin, as well. The outboard skins for the left and right hand tail are mirror images of each other. The same is true for the inboard skins. So, what a user can do is put all of the information for all four of these skins into one main file used by the Authoring and Configurator Tools, and then "Publish" the file for each skin that gets used by the Operator Tool from this one main file. The advantage of this is that it keeps all of the data for all the skins in one place, which makes it easier to track, or makes changes to it if something in the Base Geometry or Annotated Geometry should change.)

28. Run the published project by launching the Operator Tool from "Start-All Programs" and "Projection-Works-Operator." (The user would click the Windows "Start" button, then select the "All Programs" option from that list, then select the "Projection Works Operator" option from the next list that pops up. Alternatively, the user could click the desktop shortcut if one exists.)

29. Select "File" and "Open" on the User Interface of the Operator Tool to open the publish project file described in step 27 above.

30. Once the project is opened, calibrate the project using the calibration step defined. (There is typically a calibration step defined in the Authoring and Configurator Tools. The user would have added one of the five available frames called "Calibrate" in the Authoring Tool, and then assigned this frame to a "Step" in the Configurator tool. When the Operator Tool is run using the published file, the Operator Tool will generally present each step to the user for the user to execute, and when the user is finished, the user would select the "next" button). After calibration is completed, all of the projected holes should be projected onto the object. Verify that the hole alignment is correct. (The user would look at the projected circles (or whatever shape was chosen in the Authoring Tool and see if they are lined up over the holes in the projected object. If the calibration is performed correctly, each projected shape would be located directly over an actual hole in the object). If needed, re-run the calibration step. (This would be required if the projected shapes do not line up over an actual hole in the object, as described above. If this were to be the case, then the user should re-run the calibration step because the user may have clicked the mouse at a location on the object that did not correspond to the image shown on the computer screen that was instructing the user where to click. If several re-calibration attempts still do not yield a good alignment between the projected shape and the actual hole, the user may need to go all the way back to the Authoring Tool and add more calibration points.)

31. Once calibration is complete, continue to run the project steps that are defined in the Configuration software tool.

32. When all of the project steps have been run, exit from the Operator software tool and repeat running the Operator tool on all subsequent parts which use this project.

Operation

Detailed instructions regarding the operation of the systems of the invention, which preferably include a use of three different assembly software tools (Authoring Tool, Configurator Tool and Operator Tool) have already been described hereinabove. However, a specific example of operation is described below in connection with taking grip measurements in pre-drilled holes present in the skin of a vertical stabilizer, a part of an aircraft.

Figure 20:
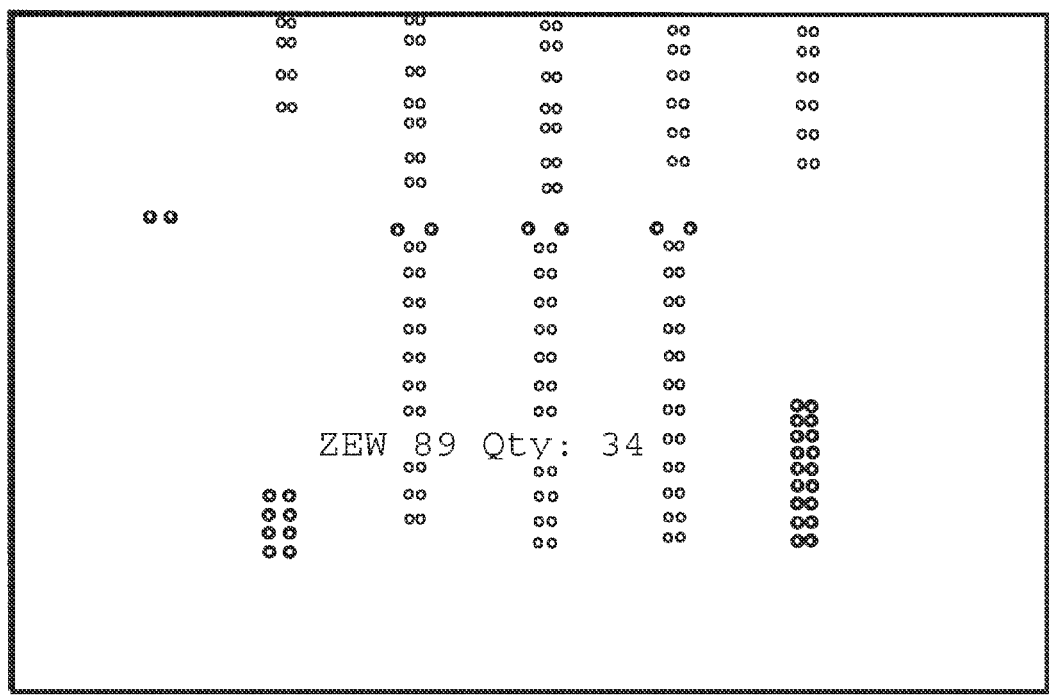
FIG. 20 is an illustration of a three-dimensional object being assembled having a fastener number (ZEW 8 9), and quantity of fasteners (34), required for illuminated holes being projected onto the three-dimensional object.
Figure 21:
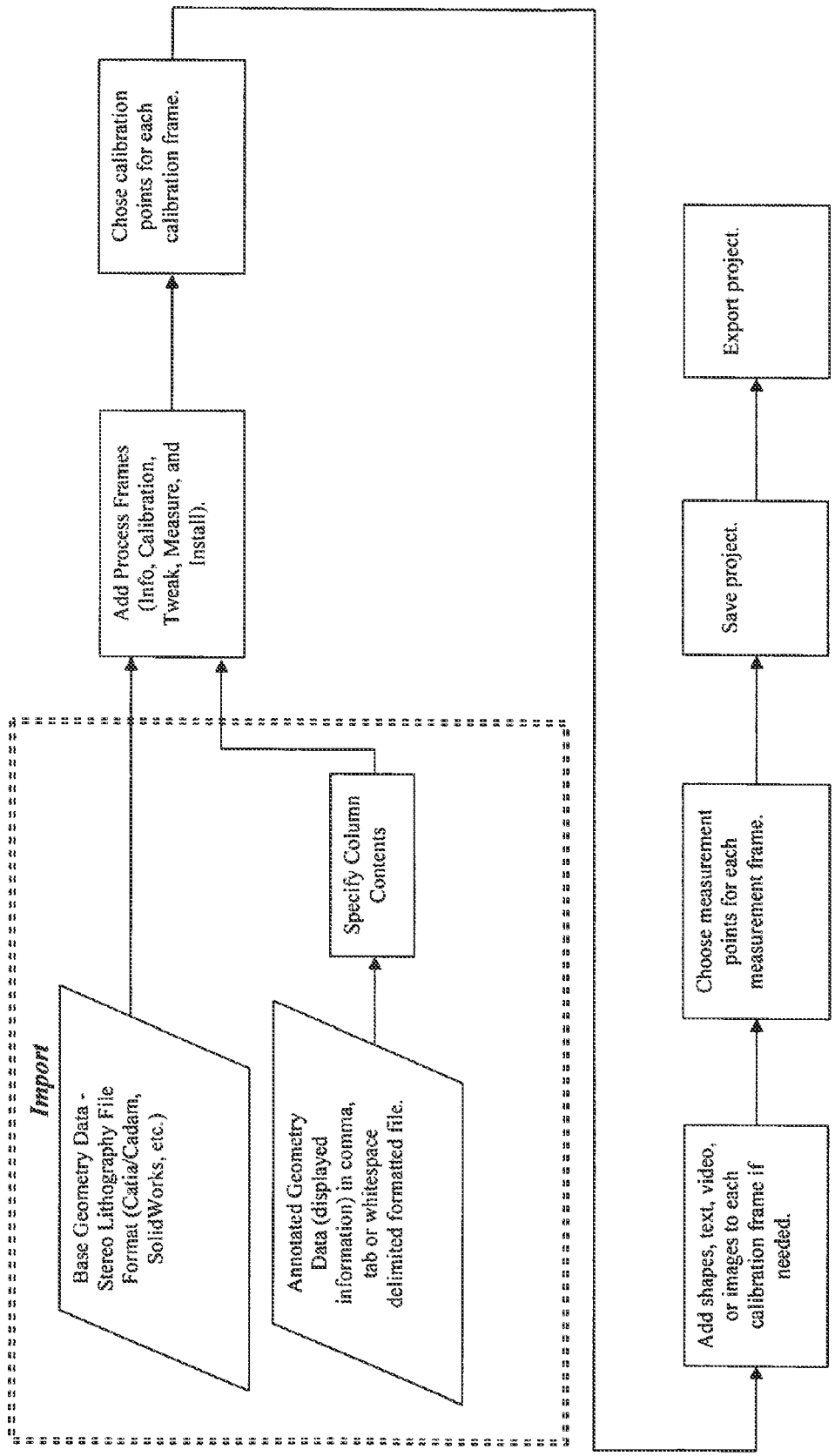
FIG. 21 is a flowchart illustrating the functions of the Authoring Assembly Software Tool ("Authoring Tool").
Figure 22:
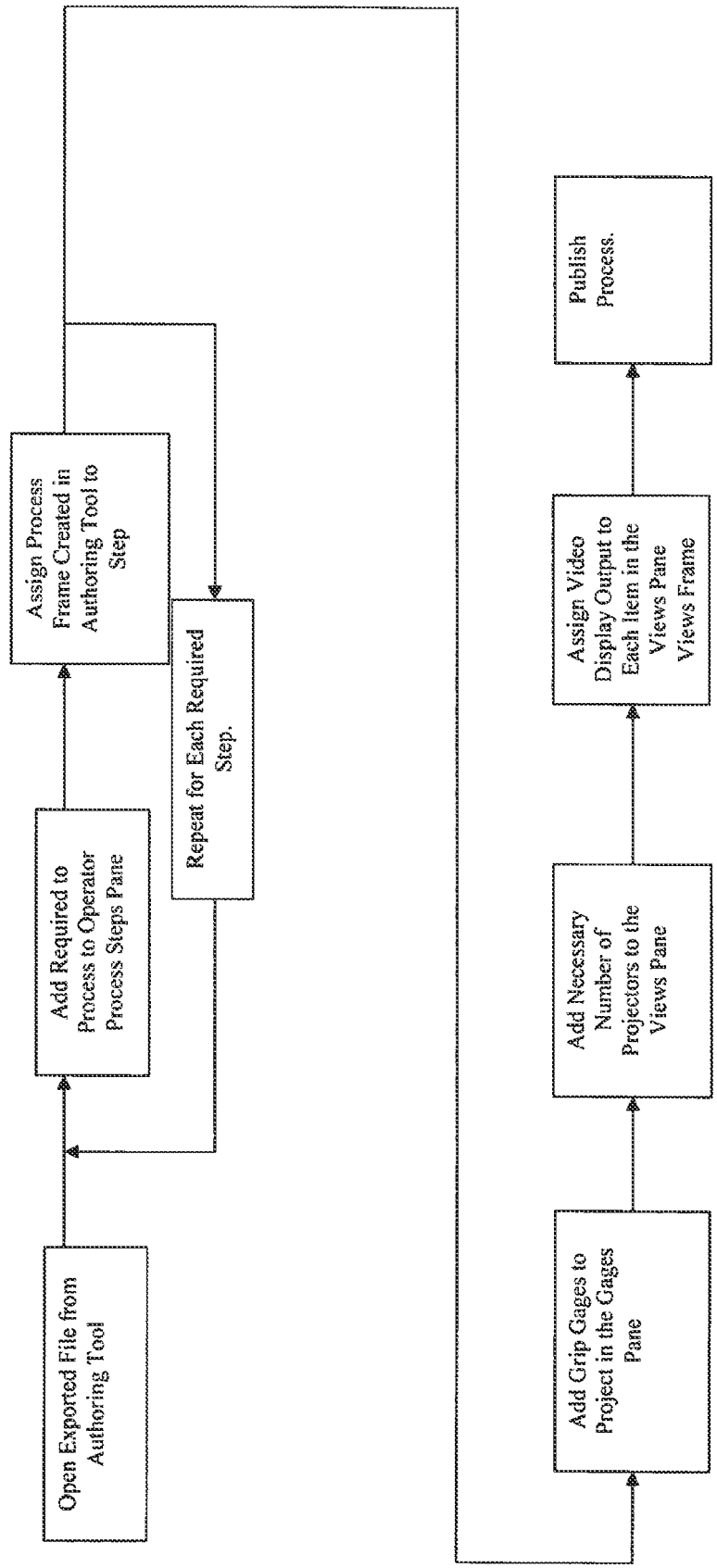
FIG. 22 is a flowchart illustrating the functions of the Configurator Assembly Software Tool ("Configurator Tool").
Figure 23:
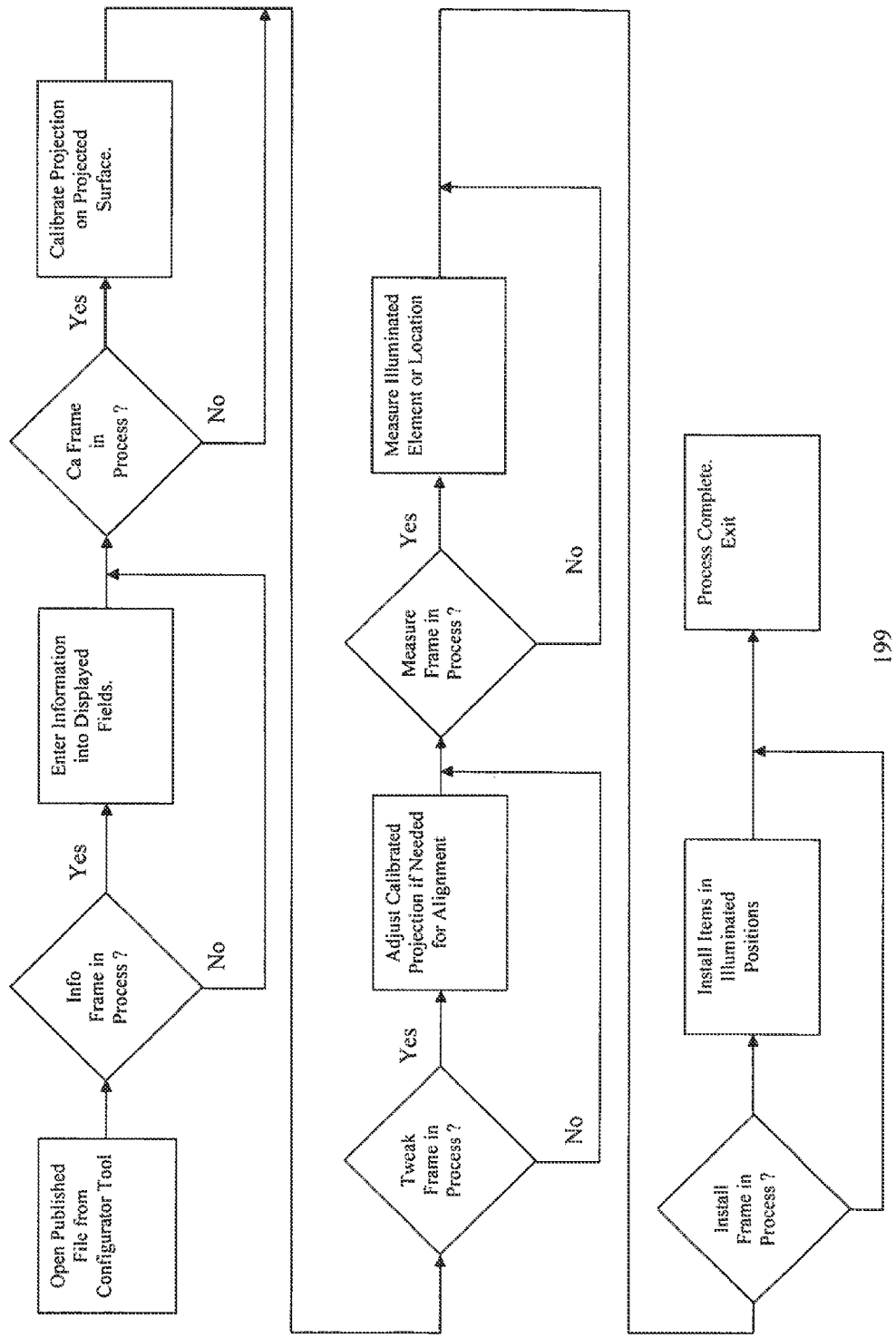
FIG. 23 is a flowchart illustrating the functions of the Operator Assembly Software Tool ("Operator Tool").

Grip measurements may be made, for example, in thousands of pre-drilled holes that are present in the skin of a vertical stabilizer, and then the correct size fasteners, out of thousands of different sizes and types, may be inserted therein to properly attach the skin to one or more different components of the vertical stabilizer, using the systems and methods of the invention in the following manner. After the system is properly set up (using the Authoring Tool, Configurator Tool and Operator Tool) in the manner described herein for this particular manufacturing process of producing aircraft vertical stabilizers, including having a plurality of assembly steps properly ordered for such process, an operator clicks a button on the User Interface of the Operator Tool and begins the assembly process created in the Configuration Tool (ordered step-by-step instructions). The operator will first calibrate the system. To do this, the individual calibration points are shown as a flashing red dot, one at a time, on the main computer monitor screen. At this point the user uses his mouse, or some other calibration method, to place the mouse cursor (crosshair) over the actual hole in the vertical stabilizer skin. He then clicks the mouse to record the location of this point. The operator proceeds in the same manner for all the calibration points. Once all points are completed, the annotated geometry is calibrated using all the data collected from each calibration point. All of the information that is required to perform a first assembly step of the vertical stabilizer, taking grip measurements in pre-drilled holes of its skin in this example, is then rapidly (virtually immediately) projected as text, image and/or symbol data sets onto the surface(s) of the three-dimensional vertical stabilizer, such as a starburst yellow pattern projected onto a first pre-drilled hole to be measured, as is shown in FIG. 3. An assembly technician can then insert a grip gun into this first pre-drilled hole, as is shown in FIG. 4, and the hole depth data is then transmitted back to, and recorded by, a computer that is operably connected with the grip gun, and with one or more optical projectors. After the first pre-drilled hole is measured, a yellow starburst pattern will automatically then be projected onto the next pre-drilled hole to be measured. This process is continued until all of the pre-drilled holes on the vertical stabilizer skin are measured, at which time, the system provides a complete parts list, such as a list of a variety of different fasteners that should be inserted into the pre-drilled holes (possibly out of thousands of different fasteners) to properly fasten the vertical stabilizer skin to another component of the vertical stabilizer. The system then displays (via optical projection) a symbol on all of those pre-drilled holes in the vertical stabilizer skin that require the same type and length of fastener (i.e., the same fastener part number), as is shown in FIG. 20, or a plurality of such symbols for different required types and lengths of fasteners. The system may, for example, display 2, 3, 4 or more such symbols for 2, 3, 4 or more different types and lengths of fasteners (i.e. three other fastener part numbers), preferably all in different colors, permitting 2, 3, 4, or more different assembly technicians to work at the same time on the vertical stabilizer skin, but at different locations on the skin, and with different sized holes and different fasteners. For example, one technician could work with a series of holes that all required fastener #1, and all such holes could be illuminated on the vertical stabilizer skin in the color blue along with that fastener part number. A second technician could work with a series of holes that all required fastener #2, and all such holes could be illuminated on the vertical stabilizer skin in the color red along with that fastener part number. A third technician could work with a series of holes that all required fastener #3, and all such holes could be illuminated on the vertical stabilizer in the color yellow along with the fastener part number. A fourth technician could work with a series of holes that all required fastener #4, and all such holes could be illuminated on the vertical stabilizer skin in the color green along with the fastener part number. The various assembly technicians could then proceed to insert the correct fasteners into the series of pre-drilled holes that they are working with to attach the vertical stabilizer skin to one or more other parts of the vertical stabilizer being manufactured. Once this step of the assembly process is completed, all of the information that is required to perform a second assembly step for a manufacture of the vertical stabilizer could then be projected onto the vertical stabilizer skin, or onto some other part thereof. Then, at some subsequent step in the manufacturing process, a completed vertical stabilizer could be attached to the rest of the aircraft being manufactured.

The following example describes and illustrates the systems and methods of the present invention. This example is intended to be merely illustrative of the present invention, and not limiting thereof in either scope or spirit. Those of ordinary skill in the art will readily understand that many variations of certain of the devices, components, materials, ingredients, computer software, conditions and/or steps employed in the systems and procedures described in the example, and otherwise described herein, can be employed.

Example

Production of Wire Harness

In order to test the invention in an actual assembly environment, rather than in a laboratory environment, which is not employed for assembly operations, an experiment was performed at an aircraft manufacturer facility (under the terms of a confidentiality agreement, and under the control of the inventors) to test the theory that optically projected work instructions would be helpful to assembly technicians (in terms of saving time, labor, blueprints, plans, instruction manuals, computer screens, and the like).

A particular wire harness was selected for this experiment. Abundant data from many years of cost tracking for this particular assembly was available to the inventors. A person that was skilled at making this particular wire harness averaged making it in 21 hours, whereas a person skilled at making wire harnesses in general, but not this particular wire harness, averaged making it in 28 hours.

Assembly data was input into a programmable computer as it was gathered from a technician who had built this particular assembly (wire harness) dozens of times, taking him 21 hours to construct the wire harness in his usual manual manner of construction.

About a month later, the same technician built the same wire harness using the assembly data that was input into the programmable computer and optically projected assembly instructions (projected onto the wire harness). He was able to build the wire harness this time in 19 hours, which was his personal record for that harness, and a savings of 2 hours of time for just this one wire harness, and an increase of efficiency of the assembly of about 10%. (If he were to construct several of these wire harnesses, the time savings would be even greater (i.e., two hours times the number of wire harnesses being constructed.)

The next month, a technician that had never built this particular wire harness built it using the same optically projected assembly instructions, and also built the wire harness in 19 hours (even though she had never built it before).

Comments received from both technicians were very favorable, reporting that the optically projected assembly instructions had a definite positive impact on their assembly work or relatively complex objects. Further, both wire harness assemblies were completed with no errors.

In addition to demonstrating the time reduction in assembly that results from optically projected assembly instructions onto an object being assembled, this test also demonstrates how the knowledge from the most experienced technicians may easily be transferred to lesser experienced or inexperienced workers when using optically projected assembly instructions, resulting in a higher throughput with fewer errors. This, in turn, results in significantly lower production costs.

The knowledge transfer using three-dimensional optical projection technology is vastly more efficient than traditional methods of training because the exact information that is needed for the single step that is presently being worked on in a particular assembly is displayed precisely where it is needed in full-scale, three-dimensional, color text, pictures and/or symbols directly on the assembly in an undistorted manner, at the precise moment that it is needed. Three-dimensional optical projection technology allows an assembly, manufacturing (or other) business to record its "best" practices (i.e., the best ordered sequence of assembly, manufacturing or other steps), so that there is an assurance that every worker knows the "best" way to perform any task, assembly, manufacture or other process, any time that task is being done, even if the worker has never done this task before.

While the test above showed cost savings of about 10% and 30% for experienced and inexperienced assemblers, a wire harness is not a very complex assembly. The more complexity there is in an assembly process, the greater the savings will typically be. Cost savings well in excess of about 50% will not be rare, and from about 30% to about 50% will be very common. Savings of this magnitude will take millions of dollars out of the cost of assembling each very complex object, such as an airplane. Other applications of the technology will have proportional effects.

While the systems and methods of the present invention have been described herein with specificity, and with reference to certain preferred embodiments thereof, those of ordinary skill in the an will recognize numerous variations, modifications and substitutions of that which has been described which can be made, and which are within the scope and spirit of the invention, which is pioneering. It is intended that all of these modifications and variations be within the scope of the present invention as it is described and claimed herein, and that the invention be limited only by the scope of the claims which follow, and that such claims be interpreted as broadly as is reasonable for a pioneering invention.

Throughout this document, various books, catalogs, manuals, patents, journal articles, web sites and other publications have been cited. The entireties of each of these books, catalogs, manuals, patents, journal articles, web sites and other publications are hereby incorporated by reference herein.

What is claimed is:

1. A computerized method comprising:
    creating or importing, into a computer, three-dimensional surface data that defines a geometric configuration of one or more surfaces of one or more three-dimensional objects to be optically projected upon;
    creating or importing, into the computer, three-dimensional data that defines a geometric configuration of text, images, or symbols to be optically projected upon the one or more surfaces of the one or more three-dimensional objects;
    identifying at least three correlation points from the three-dimensional surface data within the three-dimensional data and correlating the correlation points between the three-dimensional surface data of and the three-dimensional data; and
    optically projecting an image of the three-dimensional data onto the one or more surfaces of the one or more three-dimensional objects using the correlation points between the three-dimensional surface data and the three-dimensional data.

2. The computerized method of claim 1, wherein the one or more surfaces of the one or more three-dimensional objects that are projected upon and modeled as three-dimensional surface data include curved surfaces.

3. The computerized method of claim 1, wherein the one or more surfaces of the one or more three-dimensional objects that are projected upon and modeled as three-dimensional surface data include raised surfaces.

4. The computerized method of claim 1, wherein a full image is optically projected all at one time onto the one or more surfaces of the one or more three-dimensional objects.

5. The computerized method of claim 1, wherein the correlation points are correlated between the three-dimensional surface data of and the three-dimensional data without use of a fiducial marker fixed to the one or more surfaces of the one or more three-dimensional objects.

6. A computerized optical system for a projection of three-dimensional text, images, or symbols onto a surface of a three-dimensional object, comprising:
    a computer configured to:
        create or import three-dimensional surface data that defines a geometric configuration of the surface of the three-dimensional object to be projected upon;
        create or import three-dimensional data that defines a geometric configuration of text, images, or symbols to be projected upon the surface of the three-dimensional object;
        correlate positioning of an optical projector, the surface of the three-dimensional object being projected upon, and the three-dimensional data into a coordinate system;
        calibrate optics of the optical projector concurrently with correlating the coordinate system, wherein the optics being calibrated comprises at least one of focal length, lens distortion, optical center, or scaling; and
        render for display the three-dimensional data using the determined correlation onto the surface of the three-dimensional object; and
    the optical projector operably connected with the computer, wherein the optical projector functions to project the correlated three-dimensional text, images, or symbols originating from the computer onto the surface of the three-dimensional object.

7. The computerized optical system of claim 6, wherein the three-dimensional data is organized into ordered steps.

8. The computerized optical system of claim 6, wherein the surface of the three-dimensional object that is projected upon includes curved surfaces.

9. The computerized optical system of claim 6, wherein the surface of the three-dimensional object that is projected upon includes raised surfaces.

10. The computerized optical system of claim 6, wherein the optical projector projects a full image all at one time onto the surface of the three-dimensional object.

11. The computerized optical system of claim 6, wherein the text, images, or symbols projected by the optical projector wrap around the surface of the three-dimensional object.

12. The computerized optical system of claim 6, wherein the three-dimensional object that the optical projector projects upon is not positioned directly in front of the optical projector.

13. The computerized optical system of claim 6, comprising a measurement device that is operably connected with the computer.

14. The computerized optical system of claim 13, wherein the measurement device measures weight, depth, angles, size, shape, or width.

15. The computerized optical system of claim 13, wherein the measurement device is a grip gage.

16. The computerized optical system of claim 6, wherein the optical projector functions properly regardless of a type of lens that is present, and regardless of a distance between the three-dimensional object to be projected upon by the optical projector.

17. The computerized optical system of claim 6, wherein positioning of the optical projector, the surface of the three-dimensional object being projected upon, and the three-dimensional data is correlated without use of a fiducial marker fixed to the surface of the three-dimensional object being projected upon.

18. A non-transitory computer readable medium having executable instructions a computerized optical system that when executed by a hardware processor cause the processor to:
  create or import three-dimensional surface data that defines a geometric configuration of one or more surfaces of one or more three-dimensional objects to be optically projected upon;
  create or import three-dimensional data that defines a geometric configuration of one or more text, images, or symbols to be optically projected upon the one or more surfaces of the one or more three-dimensional objects;
  correlate one or more optical projectors, the one or more surfaces of the one or more three-dimensional objects being optically projected upon, and the three-dimensional into one coordinate system;
  calibrate optics of the one or more optical projectors concurrently with correlating the coordinate system, wherein the optics being calibrated comprises at least one of focal length, lens distortion, optical center, or scaling; and
  presenting for display the three-dimensional data using the determined correlation onto the one or more surfaces of the one or more three-dimensional objects.

19. The non-transitory computer readable medium of claim 18, wherein the executable instructions further cause the one or more optical projectors to project a full image all at one time onto the one or more surfaces of the one or more three-dimensional objects.

20. The non-transitory computer readable medium of claim 18, wherein the text, images, or symbols projected by the one or more optical projectors wrap around the one or more surfaces of the one or more three-dimensional objects.

* * * * *